US 6,596,106 B2

(12) United States Patent
Akashi et al.

(10) Patent No.: US 6,596,106 B2
(45) Date of Patent: Jul. 22, 2003

(54) FASTENING DEVICE WITH TAPE, METHOD OF MANUFACTURING THE SAME AND PRODUCT TO WHICH THE FASTENING DEVICE IS ATTACHED

(75) Inventors: Shunji Akashi, Toyama-ken (JP); Kiyomasa Segawa, Toyama-ken (JP)

(73) Assignee: YKK Corporation, Tokyo (JP)

( * ) Notice: Subject to any disclaimer, the term of this patent is extended or adjusted under 35 U.S.C. 154(b) by 206 days.

(21) Appl. No.: 09/752,457

(22) Filed: Jan. 3, 2001

(65) Prior Publication Data

US 2001/0001181 A1 May 17, 2001

Related U.S. Application Data

(62) Division of application No. 09/306,168, filed on May 6, 1999, now Pat. No. 6,199,248.

(30) Foreign Application Priority Data

May 20, 1998 (JP) .......................................... 10-138722
Jul. 28, 1998 (JP) .......................................... 10-213113

(51) Int. Cl.[7] .............................................. A41H 37/04
(52) U.S. Cl. .......................... 156/66; 156/91; 156/245; 156/293
(58) Field of Search ................................ 156/242, 245, 156/293, 303.1, 66, 91; 264/257, 252, 275, 279, 273, 231.1; 24/693

(56) References Cited

U.S. PATENT DOCUMENTS

| | | | | |
|---|---|---|---|---|
| 2,821,764 A | * | 2/1958 | Leahy et al. | 264/257 |
| 3,243,858 A | * | 4/1966 | Melanson | 24/693 |
| 3,769,661 A | * | 11/1973 | Bengtsson | |
| 4,805,272 A | * | 2/1989 | Yamaguchi | 24/693 |
| 4,818,205 A | * | 4/1989 | Burke et al. | 264/257 |

* cited by examiner

Primary Examiner—Geoffrey L. Knable
(74) Attorney, Agent, or Firm—Finnegan, Henderson, Farabow, Garrett & Dunner, L.L.P.

(57) ABSTRACT

In a fastening device with tape, a synthetic resin first member is integrally molded on front and back surfaces of a tape having at least one attachment hole in such a manner as to hold an entire peripheral edge portion of the attachment hole of the tape and has an opening portion at a center thereof, and then a synthetic resin second member is attached, by molding or the like, to the first member along an inner peripheral surface of at least the opening portion of the first member and has an engaging portion to be engaged with an opposing fastener. By differentiating a material and a color of the first member from that of the second member, various kinds of fastening devices can be efficiently obtained such as a snap fastener, a male and female button, an eyelet, a fastening band which can be freely adjusted to be various kinds of lengths, a hanging device for curtains or the like which can be applied various kinds of functions and colors in comparison with the conventional art and which can be firmly adhered to the tape.

18 Claims, 33 Drawing Sheets

FIG. 24
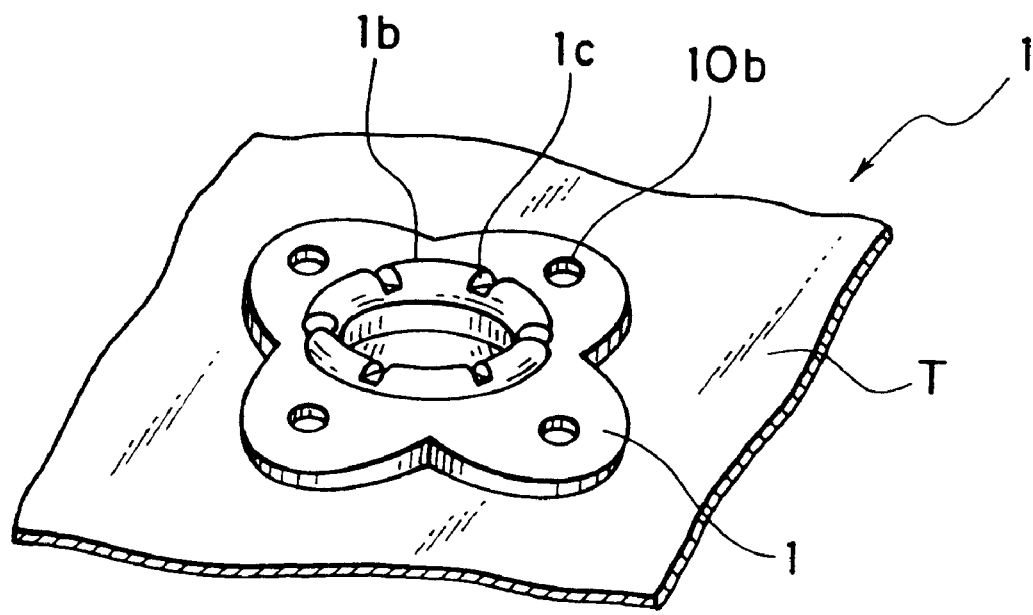
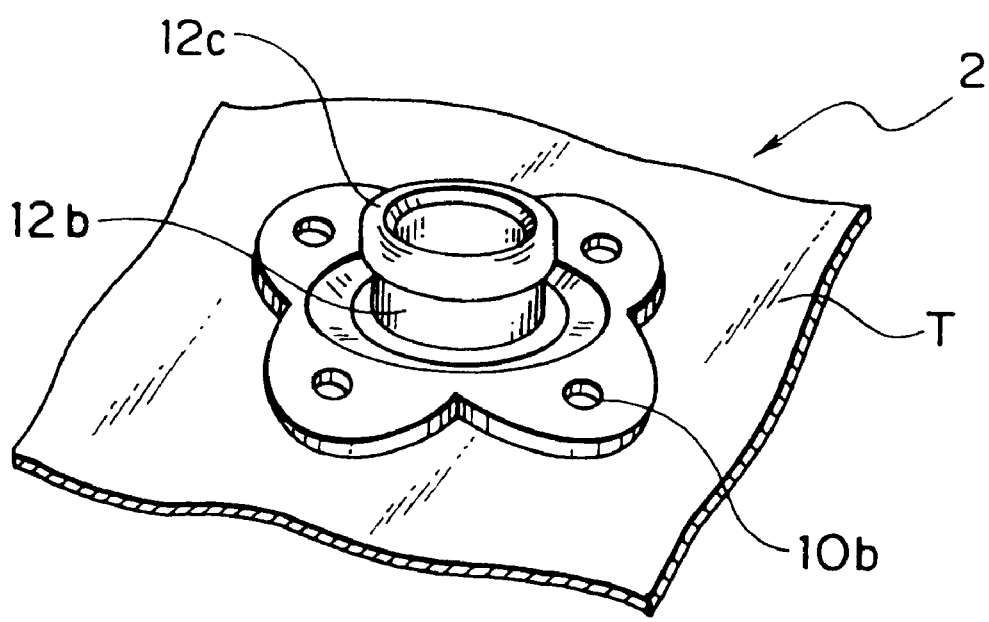

FIG. 39
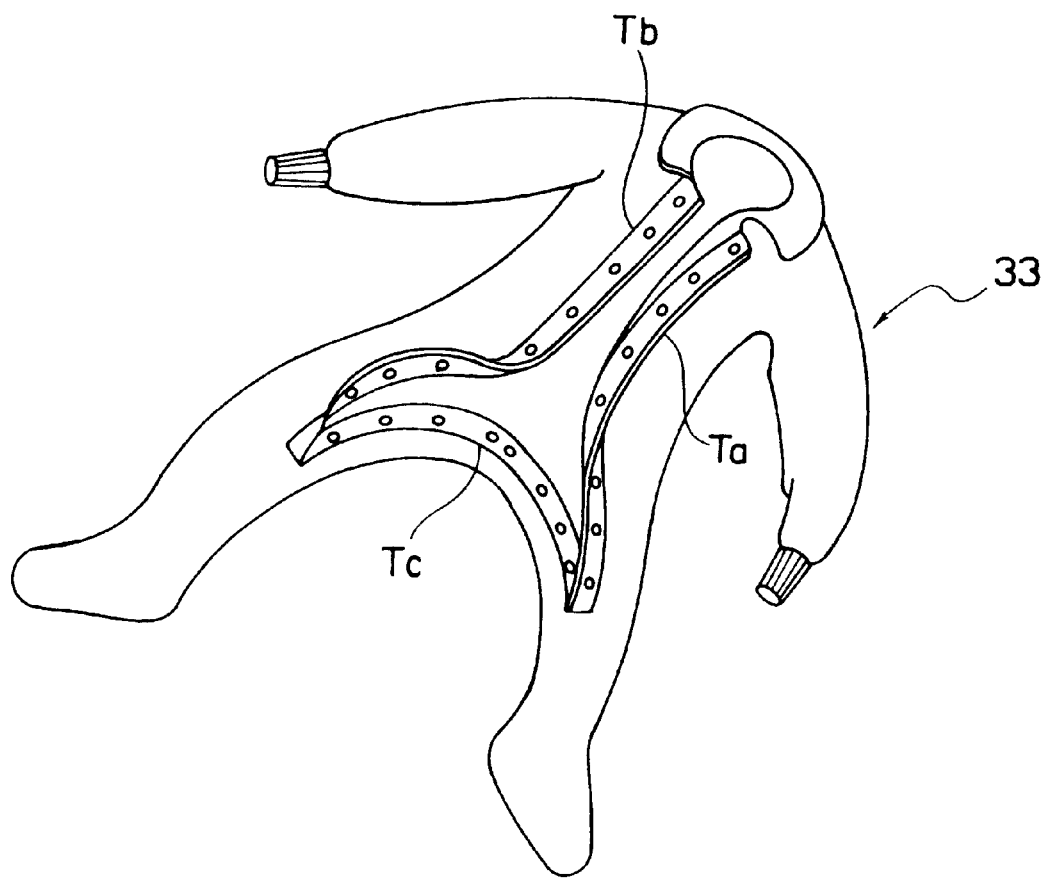
FIG. 40A
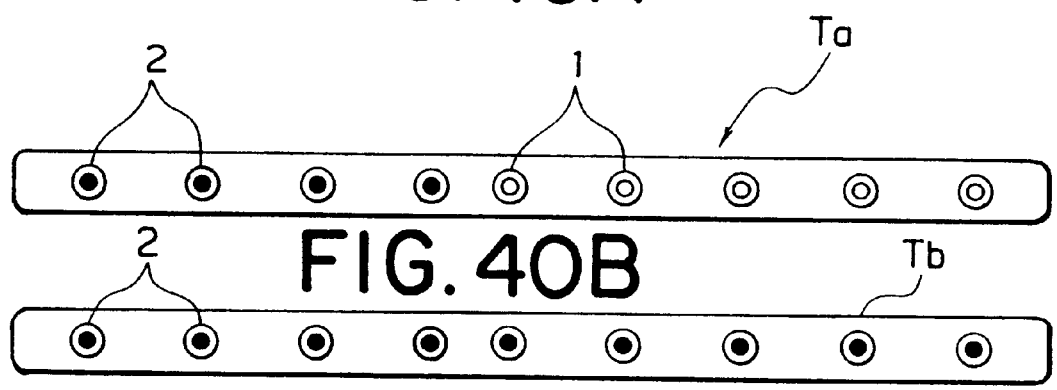
FIG. 40B
FIG. 40C
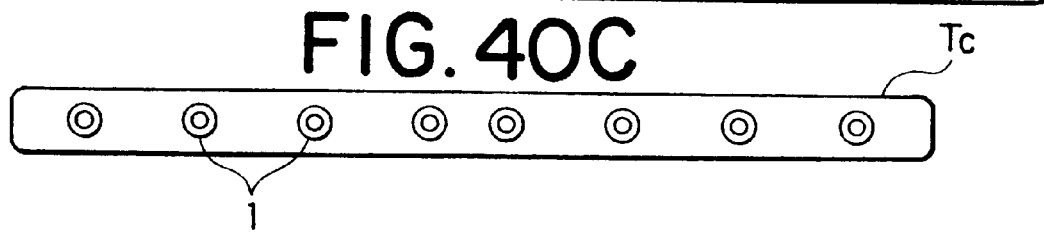

FASTENING DEVICE WITH TAPE, METHOD OF MANUFACTURING THE SAME AND PRODUCT TO WHICH THE FASTENING DEVICE IS ATTACHED

This is a division of application Ser. No. 09/306,168, filed May 6, 1999, now U.S. Pat. No. 6,199,248, which is incorporated herein by reference.

BACKGROUND OF THE INVENTION

1. Field of the Invention

The present invention relates to a fastening device with tape and a method of manufacturing the same. More particularly, it relates to a fastening device with tape in which an fastening device comprising either of a male member or a female member or both of the male and female members is integrally adhered on the same tape, and a method of manufacturing the same.

2. Description of the Related Art

It has been known for a long time to form at least one attachment hole in a single tape, and integrally mold an eyelet or a similar article made of synthetic resin with a desired shape onto front and back faces of the tape such that the eyelet or the article holds a peripheral edge of the attachment hole. As disclosed in U.S. Pat. No. 2,821,764, for example, an attachment hole is formed in a sheet material, and an eyelet made of synthetic resin with a desired shape is integrally molded on front and back faces of the sheet material so as to hold a peripheral edge of the attachment hole. The eyelet is molded as such by clamping the sheet material extending in an annular cavity for molding the eyelet, at a plurality positions at the peripheral edge portion of the attachment hole as a center, by using a plurality of pairs of pin members projecting in the cavity so as to face each other, and by introducing molten resin into the cavity.

In general, if the pin members do not exist in the above-described molding, the peripheral edge of the attachment hole of the sheet material extending in the cavity largely corrugates in a peripheral direction due to an introducing pressure of the molten resin. At worst, a portion of the peripheral edge may be deflected so as to abut on an inner face of the cavity, so that the sheet material may be exposed at a portion of a surface of the eyelet as a molded product. The invention disclosed in the above U.S. patent has been accomplished by taking notice of that a proper degree of corrugation of the peripheral edge of the attachment hole in the sheet material increases a strength of securing of the eyelet to the sheet material. In order to obtain the proper degree of corrugating state, the peripheral edge portion of the attachment hole of the sheet material is clamped by the pin members in the cavity, thereby controlling a degree of the corrugation.

In the above U.S. patent, an inlet for introducing the molten resin into the cavity is formed so as to face the peripheral edge of the attachment hole so that the molten resin introduced into the cavity by injection can smoothly flow to the front and back faces of the attachment hole of the sheet material. In other words, the molten resin introduced from a center of the annular cavity is guided toward an outer diameter in a plane including the attachment hole. The molten resin supplied from the inlet is forwarded respectively to the front and back faces of the sheet material at the peripheral edge of the attachment hole. With this structure, because the sheet material is incorporated with the eyelet at the peripheral edge of the attachment hole in a proper degree of corrugating state, the securing strength increases.

According to the above invention, however, a thin disk-shaped plate made of synthetic resin is integrally molded at a central opening portion of the molded eyelet, so that a peripheral face of the opening portion of the molded eyelet must be trimmed after removing the thin plate after molding as described in the specification.

There is a similar invention that follows the above technical idea of preventing excessive corrugation, which is as disclosed in European Patent No. 0228293. In the European patent, a fastener member of a snap fastener, not limited to a male fastener or a female fastener and including the above-described eyelet, is integrally molded on a tape by a method similar to that in the above U.S. patent.

In the European patent, because a specific molding method which is different from the above-described U.S. Patent, is not disclosed, it is unclear how the molten resin is introduced into the cavity. However, according to FIG. 4 showing its representative embodiment, it is apparent that the molten resin is not introduced into the cavity from a inner peripheral portion of the engaging opening of a female member, because upper and lower molds for forming the engaging opening contact with each other at a parting line thereof. Therefore, the European patent is considered to be different from the U.S. patent in this point. However, if an inlet for introducing molten resin communicating with the cavity is formed at a position other than an inner peripheral engaging face of the opening, e.g., a portion adjacent to the pin member on a side for forming the opening, an resin introducing pressure is locally and directly applied to one side of the peripheral edge of the attachment hole of the tape at the beginning of introduction of the molten resin, and thus, a corrugating phenomenon is very much liable to be generated.

In order to prevent this moving phenomenon, as many pin members as possible need to be provided for clamping the tape at positions very close to the peripheral edge portion of the attachment hole. Because of this structure, the molds would be complicated. Further, it is necessary to make a setting of various and strict molding conditions for avoiding an influence of the flowing of the resin from one face of the tape to the other face.

Further, in accordance with the invention of the EP patent, as is different from the female fastener and the eyelet, the male fastener is of course a solid molded product due to the structure thereof, and further, it is necessary to mold the male fastener a column-like projection, which is an engaging portion of the male fastener, protruding from a main body of the male fastener. In order to form the male fastener having the structure mentioned above, as is different from the U.S. patent mentioned above, it is necessary to necessarily set a gate portion, which corresponds to a guide passage for introducing the molten resin into the cavity, on either one of an upper surface and a lower surface of the cavity. In the structure mentioned above, as already mentioned, in order to restrict a generation of the corrugation in the tape within the cavity, it is desired to securely nip the peripheral edge portion of the attachment hole in the tape by the pin members.

Further, in order to form the male fastener and the female fastener on the same tape, it is necessary to form cavities having different configurations in the mold. Further, in the case of changing an order of an arrangement of the male fastener and the female fastener, it is necessary to independently manufacture a mold corresponding the arrangement. This results in a complication of the mold, thus a manufacturing cost therefor is of course increased. When it is desired to avoid this, then it would be impossible to simultaneously form the male fastener and the female fastener on the same tape.

Further, as is the same as the U.S. patent mentioned above, in the fasteners with the tape mentioned above, it is unavoidable to use a single synthetic resin material for each fastener. Therefore, taking into consideration a strength of adhesion onto the tape and a strength of engagement and disengagement with respect to an opposing fastener, in order to satisfy the both, it is impossible to change a material of the adhesion portion to the tape and the fastener engaging portion. Furthermore, though it is sufficient to change a shape of the cavity in view of a shape from a viewpoint of its configuration, it is impossible to apply various colors to the same fastener.

On the contrary, as a thermoplastic resin used for this kind of snap fasteners in accordance with the conventional art, in general, a polyacetal resin is frequently used because a change of viscosity is low due to a low hygroscopic of raw material chips, a large amount of raw material chips having various colors can be stored due to little change of the material, a suitable elasticity and a suitable rigidity are provided, and it can be obtained by relatively low cost. However, since this kind of snap fasteners in accordance with the conventional art is structured such that all of the fastening members are made of a single kind of resin material as mentioned above, each of the fastening devices is unavoidably formed by a single color, so that it is too simple in color.

Further, the polyacetal resin has a relatively low melting point, each of the engaging and disengaging devices is significantly fine. For example, in the case of the male fastener, an engaging head portion which is engaged and disengaged with the female fastener protrudes outward from the surface of the fastener, the fastening device is easily melted, for example, if an iron heated to a temperature equal to or more than a melting point is accidentally brought into contact therewith when ironing, so that the engaging head portion is largely deformed or pressed and broken. Accordingly, a function as the male fastener is lost. This tends to be generated at a time of ironing at a general home where it is unavoidable to simultaneously iron various kinds of products made of various materials and it is hard to keep an ironing temperature determined in correspondence to the material.

SUMMARY OF THE INVENTION

The present invention is made so as to solve the problems as mentioned above. In particular, the present invention has an object to provide a fastening device with tape which employs a molding principle of the U.S. patent as mentioned above, remarkably improves the invention of the U.S. patent, can securely integrate a male fastening device to the tape, can optionally arrange different male and female fasteners on the same tape, and can apply various colors to the fastening device itself. Further, the device keeps its shape so as not to lose its engaging and disengaging function without readily melting its engaging head portion of the male fastener even at a time of awkward ironing. The present invention also has an object to provide a method of manufacturing the same.

As mentioned above, in order to integrally mold a synthetic resin product on a tape, it is necessary that molten resin be cooled and solidified in a desired shape after expanding to the front and the back of the tape. Accordingly, as is disclosed in the U.S. patent mentioned above, an attachment hole is previously formed in the tape and the molten resin is introduced to the front and the back of the tape via the hole, so that the product is molded and integrated thereto. An excellent point of the U.S. patent exists in that a suitable corrugation is generated at a peripheral edge portion of the attachment hole in the tape as mentioned above so as to secure a strength of adhesion and in that the molten resin is smoothly flown onto the front and the back of the tape. Then, in order to generate a suitable corrugation in the peripheral edge portion of the attachment hole, the peripheral edge portion of the attachment hole is vertically nipped at their front back side within a cavity of the mold at a desired interval by pin members. In order that the molten resin is smoothly flown onto the front and the back of the tape, the molten resin at an injection time is introduced into the cavity directing to the peripheral edge of the attachment hole of the tape.

The inventors of the present invention paid attention to these excellent points obtained by the invention of the U.S. patent as mentioned above and repeatedly performed various studies and trials. As a result, they could succeed in not only a simple improvement of the invention of the U.S. patent as mentioned above, but also in an invention of a fastening device with tape having a novel and excellent function which could not be even imaged at all including the EP patent as mentioned above, and of a method of manufacturing the same.

The present invention relates to such a fastening device with tape as mentioned above.

In accordance with a first aspect of the present invention, which is a basic structure, there is provided a fastening device with tape comprising: a synthetic resin first member integrally molded on front and back surfaces of a tape having at least one attachment hole in such a manner as to hold an entire peripheral edge portion of the attachment hole of the tape and has an opening portion at a center thereof; and a synthetic resin second member attached to the first member along an inner peripheral surface of at least the opening portion of the first member and having an engaging portion to be engaged with an opposing fastener. In accordance with a second aspect of the present invention, which is a basic method of manufacturing the fastening device with tape, there is provided a method of manufacturing a fastening device with tape for fixing an fastener to an attachment hole of the tape having at least one attachment hole, comprising steps of: holding an entire the peripheral edge portion of the attachment hole and integrally molding a synthetic resin first member having an opening portion at a center thereof on front and back surfaces of the tape; and integrally attaching a synthetic resin second member to an opening portion of the first member, the second member having an engaging portion to be engaged with and disengaged from an opposing fastening device. In this case, an attachment of the second member is not limited to an integral molding as mentioned later.

In the present invention, in order to mold and integrate the first member with a portion of forming the attachment hole in the tape, if the peripheral edge portion of the attachment hole in the tape does not become corrugated as mentioned above, the molding can be sufficiently performed only by closing a mold and injecting the molten resin in accordance with a normal method after positioning the attachment hole at a predetermined position of a first-member-molding cavity. However, as mentioned above, if the corrugation of the peripheral edge portion of the attachment hole is too large due to the pressure of the introduced resin within the cavity, for example, an intermediate member having an opening portion at a center thereof may be further interposed between the first member and the second member, and the second member may be integrally mounted along an inner peripheral surface of the opening portion of the opening portion of the intermediate member. In manufacturing the device with a structure as mentioned above, the intermediate member having an opening portion at a center portion thereof is preferably integrally molded along the opening portion of the first member, prior to molding the second member. In this case, the intermediate member may be constituted of two or more layers.

In the case of interposing the intermediate member, since a rigidity of the peripheral edge of the opening portion of the first member is increased after molded, even when the tape is exposed on a surface of the first member, the peripheral edge of the attachment hole does not become corrugated when the intermediate member is molded. Further, since the exposed portion of the tape is coated by the intermediate member, the tape is not exposed on a surface of the fastening device as a final product, so that no trouble occurs in an outer appearance and a function as the fastening device. Accordingly, in the case of interposing the intermediate member between the first member and the second member, it is preferable that the first member is molded thin at a predetermined area extending in a diametrical direction along the peripheral edge portion of the attachment hole of the tape to form a thin portion, and is molded thick at a thick portion continuous to an outer periphery of the thin portion. Thus, the tape is allowed to be exposed on the thin portion.

Accordingly, in general, in order to mold and integrate the first member with the peripheral edge portion of the attachment hole in the tape, it is preferable that the peripheral edge portion of the attachment hole in the tape is suitably corrugated as described in the specification of the U.S. patent mentioned above, in order to improve a strength of adhesion between the tape and the first member.

Then, in accordance with the present invention, in the same manner as that of the U.S. patent as mentioned above, it is preferable that the attachment hole of the tape is positioned within a first-member-molding cavity having a plurality of nipping members which nip the peripheral edge portion of the attachment hole of the tape from front and back side thereof, and the peripheral edge portion of the attachment hole is nipped by the nipping members, and molten resin is introduced within the cavity.

Further preferably, the molten resin may be introduced to a center portion of the attachment hole, and then introduced to a guide passage extending in a radial manner or a straight manner and introduced the peripheral edge portion of the attachment hole of the tape, substantially parallel to the tape. The guide passage comprises a so-called gate, and directs the introduced the molten resin in substantially parallel to the tape nipped by the nipping members within the cavity and to the peripheral edge of the attachment hole. Accordingly, the molten resin introduced into the cavity can flow onto the front and back surfaces of the tape while generating a proper corrugation in the peripheral edge portion of the attachment hole in the tape.

Further, in accordance with the present invention, in order to properly control the corrugation of the peripheral edge of the attachment hole in the tape, the shape and the arrangement of the nipping members may be decided. Specifically, each of the nipping members may have a front end nipping portion and a corrugation control portion, and the front end nipping portion is positioned at an intermediate position between a peripheral edge of the attachment hole of the tape and an outer peripheral edge of the first member after molded or at a position toward the outer peripheral edge from the intermediate position, nipping the tape, the corrugation control portions are opposed to each other and are tapered in such a manner as to gradually increase a gap with respect to the tape toward a center of the attachment hole from the front end nipping portion. The corrugation control portion is preferably a taper surface. A magnitude of the gap is suitably changed in accordance with the material of the tape.

In the case of disposing the nipping members in the first-member-molding cavity with the structure and the arrangement as mentioned above, the corrugated deformation amount can be controlled at a portion near the peripheral edge portion of the attachment hole in the tape, by changing a taper angle of the corrugation control portion in accordance with the material of the tape as well as restricting movement and deformation of the tape between the respective front end nipping portions by the front end nipping portions arranged at the intermediate position between the peripheral edge of the attachment hole in the tape and the outer periphery of the first member after molded or toward the outer periphery from the intermediate position.

The most remarkable point of the present invention exists in a that the first member and the second member are separately structured. The first member is, as mentioned above, directly formed in the tape in an integral manner, while the second member is integrally attached to the opening portion of the first member or the opening portion of the intermediate member molded on the tape in accordance with the properly required shape. The first member can be freely molded without being restricted by the shape and the material of the second member as far as it has the opening portion. The basic shape of the first member can commonly correspond to the second member having various shapes. Accordingly, it is possible to previously manufacture a lot of tapes having a multiplicity of first members with the same shapes integrally molded therewith and integrally molde the second members in necessary shapes and numbers to the first members serving as bases, simultaneously or independently.

In this case, the tape in accordance with the present invention employs all the tapes formed by all kinds of textile, knit or non woven fabric or various kinds of synthetic resin film or sheet and natural or synthetic leather. The materials may be either natural or synthetic. Further, for the synthetic resin material to be used for the first member, the intermediate member and the second member, constituting the engaging and disengaging device mentioned above, any thermoplastic synthetic resin used for a general molded product may be employed. For example, it may be polyethylene, polyester, polyamide, polypropylene, polystyrene, polyurethane, polyvinyl, polyacetal or the like. However, it is desirable that the first member, the second member and the intermediate member have an affinity with respect to each other.

According to the first aspect of the present invention, the second members can be attached to he first member in various manners.

The attachment of the second member to the first member in accordance with the present invention is not limited to fixing. The first member and the second member may be attached to each other in a relatively rotatable manner. In this case, for example, the first member and the second member can be achieved by molding synthetic resin materials having no affinity with each other.

The attachment method may include preliminarily molding the second member independently; inserting a preliminarily molded product into the opening portion of the first member; and pressing and heating the preliminarily molded product by a heating body so as to deform a part of the second member and to be rotatably engaged with the opening portion. For example, if the second member is a fastening member of the male fastener, after the second member is inserted into a central opening portion of the ring-like first member, the inserted end portion of the second member is pressed so as to be plastically deformed due to heating, and then the second member is engaged with the opening portion of the first member so that a slide rotation can be performed. The fastening device thus manufactured can be easily adjusted after finishing all the engagements, even in a case that a direction of one engaged fastener is different from that of the other opposing engaged fastener when the two fasteners are engaged with each other.

Further, the second member may be integrally attached to the first member by molding. This molding can be achieved by a normal insert molding for molding the second member by injection molding after the first member with the tape is set in the mold for the second member. In the molding of the second member, it is desirable to mold and integrate the second member along the peripheral edge of the opening portion of the first member, after the molded passage, which is molded a time of molding the first member by the guide passage guiding the molten resin into the cavity in a radial or straight manner, is broken and removed, or with the molded passage being remained. As mentioned above, in the case of breaking and removing the molded passage, a breakage burr is left on an inner peripheral surface of the opening portion of the first member. Accordingly, since the breakage burr exists on a boundary surface with respect to the second member which covers the burr, or since the molded passage is buried in the inner portion of the second member, a strength of adhesion between the first member and the second member is significantly increased.

Alternatively, the second member may be integrally attached to the first member by welding. The manufacturing method for the device with such structure may include steps of preliminarily molding the second member, inserting the preliminarily molded product into the opening portion of the first member, and integrally welding the preliminarily formed product and the opening portion of the first member. In this case, the preliminarily molded product means a molded product preliminarily molded in a shape of the second member with a deforming portion added thereto.

Alternatively, the manufacturing method may include steps of: preliminarily molding the second member independently; inserting the preliminarily molded product into the opening portion of the first member; pressing a high-temperature member to the preliminarily molded product; and welding and deforming a part of the preliminarily molded product by the pressing so as to integrally weld to the opening portion. Or, the method may include steps of: preliminarily molding the second member independently; inserting the preliminarily molded product into the opening portion of the first member; and pressing, melting and deforming a part of the preliminarily molded product by ultrasonic or high-frequency heating means so as to integrally weld to the opening portion.

The second member may be integrally attached to the first member by an adhesive. The manufacturing method for the device with such structure includes a step of: molding the second member independently; inserting the second member into the opening portion of the first member; and integrally bonding the second member and the opening portion by an adhesive.

For securing a strength of adhesion between the first member and the second member as mentioned above, it is preferable that the first member has a certain shape of the opening portion. Specifically, the inner peripheral surface of the opening of the first member may preferably have a recessed notch portion, an uneven portion or a protruding portion. When the recessed notch portion, the uneven portion or the protruding portion is integrated with the second member, an excellent anchor function can be obtained so that a desired strength of adhesion can be secured.

That is, the first member and the second member may be made of equivalent materials or different materials. Further preferably, the first member and the second member may be in different colors, and have different hardness, in which case it is preferable that the second member is softer than the first member.

The structures of the device as mentioned above have been achieved by the present invention for the first time. That is, in the same manner as that in the inventions of the U.S. patents and of the EP patents as mentioned above, various shapes could be selected of the fastening devices with tapes at the stage of designing the cavity. However, for a single fastening device for example, it is general to mix a pigment or the like in the resin material to be a single color, so, in order to apply a plurality of colors thereto, it is necessary to apply a printing or a coloring so that it is nearly impossible to execute such multicolored device in view of productivity and economical performance.

On the contrary, in accordance with the present invention, the fastening device is not limited to two kinds of members comprising the first and second members. The manufacturing method may include a step of integrally molding an intermediate member having an opening portion at a center portion thereof along the opening portion of the first member, prior to molding the second member, and further may include a step of integrally molding an intermediate member constituted of two or more layers and having an opening portion at a center portion thereof, between the first member and the second member. Thus, a plurality of materials and colors can be selected in a single fastening device.

For example, it is possible to set the material of at least the second member softer than the material of any other member, and further, it is possible to apply various colors to the first member, the second member and at least one intermediate layer. In this case, an optional color can be generally obtained by mixing a pigment to a raw material resin in order to apply such colors, but it is also possible to apply dyeing after molding.

The coloring can be performed by using dyes. For example, it is possible to dye each of the tape, the first member, the second member and the intermediate member in an optional color with dyes, by making at least one of the tape, the first member, the second member and the intermediate member of materials having different dyeing property. As mentioned above, when the first member is dyed by dyes after molded, it is possible to previously manufacture a large amount of tapes with first members by using colorless raw material resin in which no pigment or the like is mixed, and then to dye a predetermined number of the tapes with first members among them by the dyes as required, so that productivity is improved and its production control can be easily performed.

The second member may be a male fastening member protruding from a surface of the tape and having an engaging head portion to be engaged with and disengaged from a female engaging and disengaging portion of a female fastening member of a snap fastener. Or, the second member may be a female fastening member of the snap fastener having a female engaging portion to be engaged with and disengaged from a male fastening member of the snap fastener. Of course, the male fastener and the female fastener of the snap fastener are not to be used independently, however, the male fastener or the female fastener of the snap fastener are not always used in combination with the opposing female fastener or and the male fastener. It is of course possible that the male fastener and the female fastener in accordance with the present invention can be used in combination with the other general opposing fastener.

It is further preferable that the base member and the male fastening member as first and second members as mentioned above may be made of independent resin materials and the material constituting the male fastening member may have a melting point higher than the material constituting the base member. In accordance with the structure as mentioned above, for example, even when the iron having a high temperature is accidentally brought into contact with the male fastener, the male fastener is prevented from melting, and being deformed or pressed to breakage since its engaging head portion outwardly protruding from the base member of the male fastener has a melting point higher than that of the base member.

In the normal ironing, since the high temperature range is about 185° C., as the material for constituting the fastening member, it is preferable that the melting point is more than 185° C. As a most typical example, polyamide resin can be used as a material constituting the male fastening member, and a generally used polyacetal resin is used for a material constituting the base member. However, the melting point of the male fastening member should of course be changed in accordance with the material of the tape and the other members to which the male fastener is attached. Further, when the resin material having a low melting point is used for the base material and an affinity with respect to the male fastening member is required, it is necessary to select the material of the male fastener in relation to the base member. Accordingly, in such a case, it is possible to set the melting point of the male fastening member to be equal to or less than 185° C. In such a special product, no problem arise when a proper iron temperature is selected without performing a careless iron operation.

In a basic method for manufacturing the fastening device with tape as mentioned above includes steps of holding an entire peripheral edge portion of the attachment hole and integrally molding a synthetic resin base member having an opening portion at a center thereof on front and back surfaces of the tape, integrally molding a synthetic resin male fastening member having an engaging portion which is engaged with and disengaged from an opposing fastener to an opening portion of the base member, and making the male fastening member of a material having a melting point higher than the base member.

The intermediate member having the opening portion at the center thereof may be further interposed between the first member and the second member, and the second member is integrally attached along the inner peripheral surface of the opening portion. The method of attaching the second member to the intermediate member is the same as the method of attaching the second member to the first member, as mentioned above.

In accordance with the present invention, at least one fastening device is attached to a single tape in the manner mentioned above. Since it is possible to optionally arrange the fasteners of the fastening device on the tape and it is possible to optionally mix the male and female fasteners, it is possible to use the device in a wide range of field. The typical arrangement is that a plurality of second members are arranged in a longitudinal direction of the tape at an equal interval. At this time, the second members may be either a male fastening member or a female fastening member. In a case of the fastening device with tape in which the same kinds of fasteners are attached at the same pitch, it can be applied to articles of clothing and bags as a normal snap fastener, and further can be applied to a header tape attached along an upper end edge of a curtain by sewing or the like.

Further, it can be applied to a hanging device for curtains, to which an attaching member to be attached to and detached from a curtain runner is attached in a longitudinal direction thereof at a predetermined interval along a side edge of the fastening device with tape as mentioned above. In the case of using the header tape with the fastening device mentioned above in combination with the handing device for the curtains with the fastening device, since it is necessary that the header tape and the fastening device attached to the hanging device be mutually engaged and disengaged, one should become a male fastener, while the other is a female fastener.

In accordance with the present invention, in the case that the fasteners are arranged at the same pitch, it is possible to mix a plurality of second members having male or female engaging portions. As a typical use example for such mixed arrangement, there is a clothing for a baby in which a plurality of second members each having a male engaging portion are arranged at a half portion of the same tape in a longitudinal direction thereof and the same number of second members each having the same number of a female engaging portion are arranged at the other half portion.

On the other hand, it is possible that at least the second members arranged at the endmost portion of the tape have male engaging portions among a plurality of second members arranged on the same tape. That is, most of the second members arranged at the other portions than the portion of the second members having the male engaging portions have female engaging portions, so that the fastening device with tape having such as structure can function as an independent product by itself. As a typical example, it can be a pull of a slider or a longitudinally-adjustable band or a slide fastener. It can be realized only by the present invention to mount the male fasteners and the female fasteners on the same tape.

In accordance with the present invention, each first members integrally molded on the tape is not always molded in correspondence to a single attachment hole formed in the tape. For example, it is possible to mold a single first member in two or more adjacent attachment holes on the tape. Further, the adjacent two or more attachment holes may be arranged in a widthwise direction of the tape. In accordance with such a structure as mentioned above, since it is possible to obtain various shapes such as large-patterned designs and shapes having various kinds of designs such as animals, automotive vehicles or the like, so that a fastening device rich in a design as well as a strength of adhesion can be obtained.

Further, in accordance with the present invention, a plurality of second members may be arranged in a longitudinal direction of the tape at a selected desired interval, in which a second member having a male engaging portion is arranged in at least one end of the tape, and a plurality of second members comprising male or female fastening members are arranged in a mixed manner, and in which at least one engaging portion other than that of the second member having the male engaging portion at the end of the tape is protruded on the tape surface in an opposite direction to the protruding of the engaging portion of the male second member at the end of the tape. As a particular use thereof, the fastening device with the tape can be adhered to the clothes by inserting the male fastening member attached the tape end of the fastening device with tape to an opening joining portion of the clothes or the like, and the tape is folded back to engaging the male fastening member with the opposing female fastening member. At this time, the other male fastening members protrude on the opposite surface of the tape. These male fastening members are engaged with and disengaged from the female fastening members attached to the other opening joining portion of the clothes, so that the fastening device with tape can be used as a fastener button.

It is possible to manufacture an fastening device with tape having a second member comprising a base portion to be integrally adhered to the opening portion of the first member, and a ring-like string-passing portion standing from a surface of the base portion. In this case, the fastening device is attached to a back surface a curtain in a vertical direction, and a string having a stopper member at its one end is inserted into a plurality of ring-like string-passing holes. The curtain can be opened and closed by pulling or releasing the other end of the string member. Further, in the case of attaching the fastening device with tape along the opening portion of a saccate-like bag, together with a string, it can be used as an opening and closing device for the opening portion of the bag.

Further, it is possible to manufacture a fastening device with tape in which the second member comprises a base portion integrally adhered to the opening portion of the first member, and a hook portion standing on a surface of the base portion. In this case, if a female fastener is prepared in which the second member separately manufactured is adhered to the opening portion of the first member in fitted state, and a ring portion stands on a surface of the base portion, by combining the both male and female fasteners, it can be used as a hooking device for, for example, a brassiere, baby clothes or the like.

BRIEF DESCRIPTION OF THE DRAWINGS

FIG. 24 is a fragmentary perspective view of the female and male fasteners;

FIG. 39 is a perspective view of rompers to which the fastening device in accordance with the present invention is applied;

FIGS. 40A through 40C are plan views showing examples of the fastening device with tape in accordance with the present invention when applied to the rompers;

DESCRIPTION OF THE PREFERRED EMBODIMENTS

It is one of the most characteristic point of a fastening device with tape in accordance with this invention that each of female and male fasteners of the device has at least a first member and a second member. According to a manufacturing method of the present invention, the first member is previously molded integrally to an attachment hole in the tape, and then the second member is attached to an opening portion of the first member. Further, the first member can be molded in various shapes as far as it is provided with an opening portion at its center. Furthermore, a shape of the second member does not affect the shape of the first member, so that one type of the first members can be commonly applied if the second members are altered with their shapes or materials. With such structure, it is possible to integrally attach a required number of second members in a required arrangement to a single tape simultaneously or independently, whether it is different from another such as a male fastening member or a female fastening member. Furthermore, the second member can be made of material or can be in a color different from that of the first member. These could not be achieved by a conventional fastening device with tape of this kind, as already mentioned above.

These characteristic features of this invention will be manifested by description on the embodiments as below.

Figure 1:
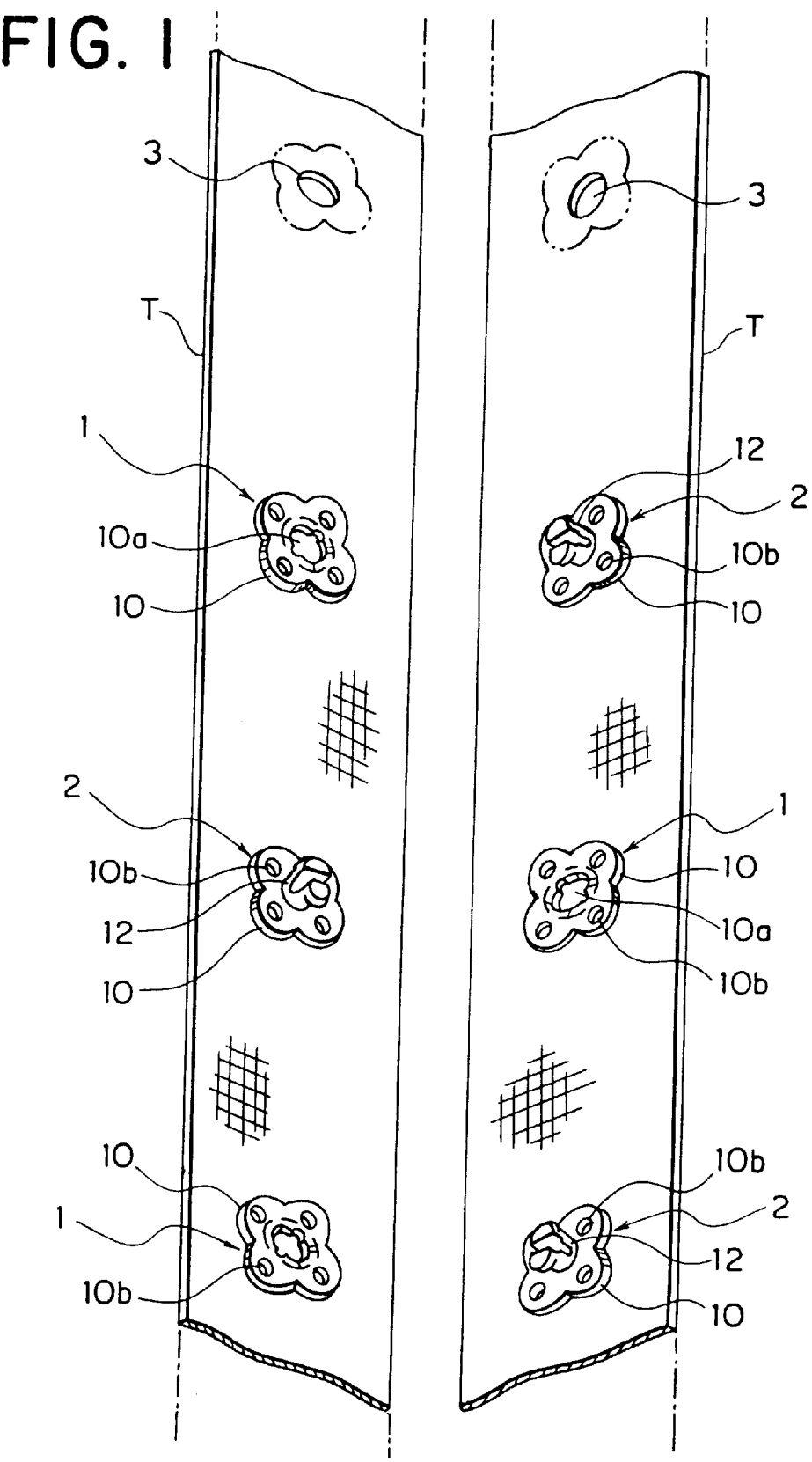
FIG. 1 is a fragmentary perspective view showing an embodiment of a fastening device with tape in which female and male fasteners in accordance with the present invention are alternately arranged and adhered on a single tape.

Hereinafter, embodiments of a fastening device with tape in accordance with the present invention and a method of manufacturing the fastening device will be described in detail with reference to the accompanying drawings. FIG. 1 is a perspective view of a first embodiment showing a male fastener and a female fastener of an fastening device with tape in accordance with the present invention being integrally mounted on a tape in a parallel manner.

As shown in FIG. 1, as a typical embodiment of the fasteners mounted to the fastening device with tape in accordance with the present invention, there are a female fastener 1 and a male fastener 2. Further, as another example there can be an eyelet, a string-passing device for opening and closing a curtain which will be described later, or the like. Though a basic principle of a method of manufacturing this device is based on a manufacturing method as disclosed in the specification of U.S. Pat. No. 2,821,764, various shapes and materials can be selected to and various colors can applied to the respective fasteners 1 and 2 each having a characteristic feature according to the present invention, which could not obtained by the invention of the above U.S. patent, while they can be integrally mounted on the tape.

That is, as is described in detail later, a plurality of attachment holes 3 are previously formed on a long tape T at a predetermined interval, then the tape T is supplied to a mold. Thereafter, a ring-like base member 10, which is one of constituting members of the female fastener 1 and/or the male fastener 2, is integrally molded on front and back surfaces of the tape T in such a manner as to hold a peripheral edge of the attachment hole 3 by injection molding. Here, the base member 10 constitutes a first member in the present invention. In molding the base member 10, likewise a molding technique disclosed in the specification of the U.S. patent as mentioned above, tape-supporting members (pins) are provided to project in such a manner as to oppose to each other in a cavity for molding the base member in the mold. In a state that the mold is closed and the peripheral edge portion of the attachment hole 3 in the tape T is nipped at its front and back sides by the tape-supporting members, molten resin is introduced to the peripheral edge of the attachment hole 3 substantially in such a manner as to be parallel to the tape T. At this time, pressure of introducing the resin is uniformly distributed to the front and the back of the tape T, and the synthetic resin base member 10 is firmly adhered to and integrally molded with the peripheral edge portion of the attachment hole 3 in the tape T while generating a suitable corrugation phenomenon at the peripheral edge portion of the attachment hole 3.

Next, the female or male fastening member 11 or 12 as a second member is integrally molded to the each of the base members 10 integrally molded with the tape T, on the basis of the molding technique described in the U.S. patent as mentioned above. In the illustrated embodiment of FIG. 1, an inner peripheral surface of a central opening portion 10a of the base member 10 is formed in a shape as a normal female engaging and disengaging surface, in which case the base member 10 can be used as the female fastener as it is without newly attaching a female fastening member 11. Then, the male engaging members 12 are integrally molded on an alternate one of a plurality of base members 10 integrally molded in a longitudinal direction on the same tape T at the same pitch and having a common shape. Thus, the female fastener 1 and the male fastener 2 are alternately mounted to the same tape T. Such arrangement as mentioned above cannot be efficiently manufactured by the conventional technique, and it is apparent that the present invention can manufacture a male fastener 2 by utilizing the conventional general female fastener with tape.

Figure 2:
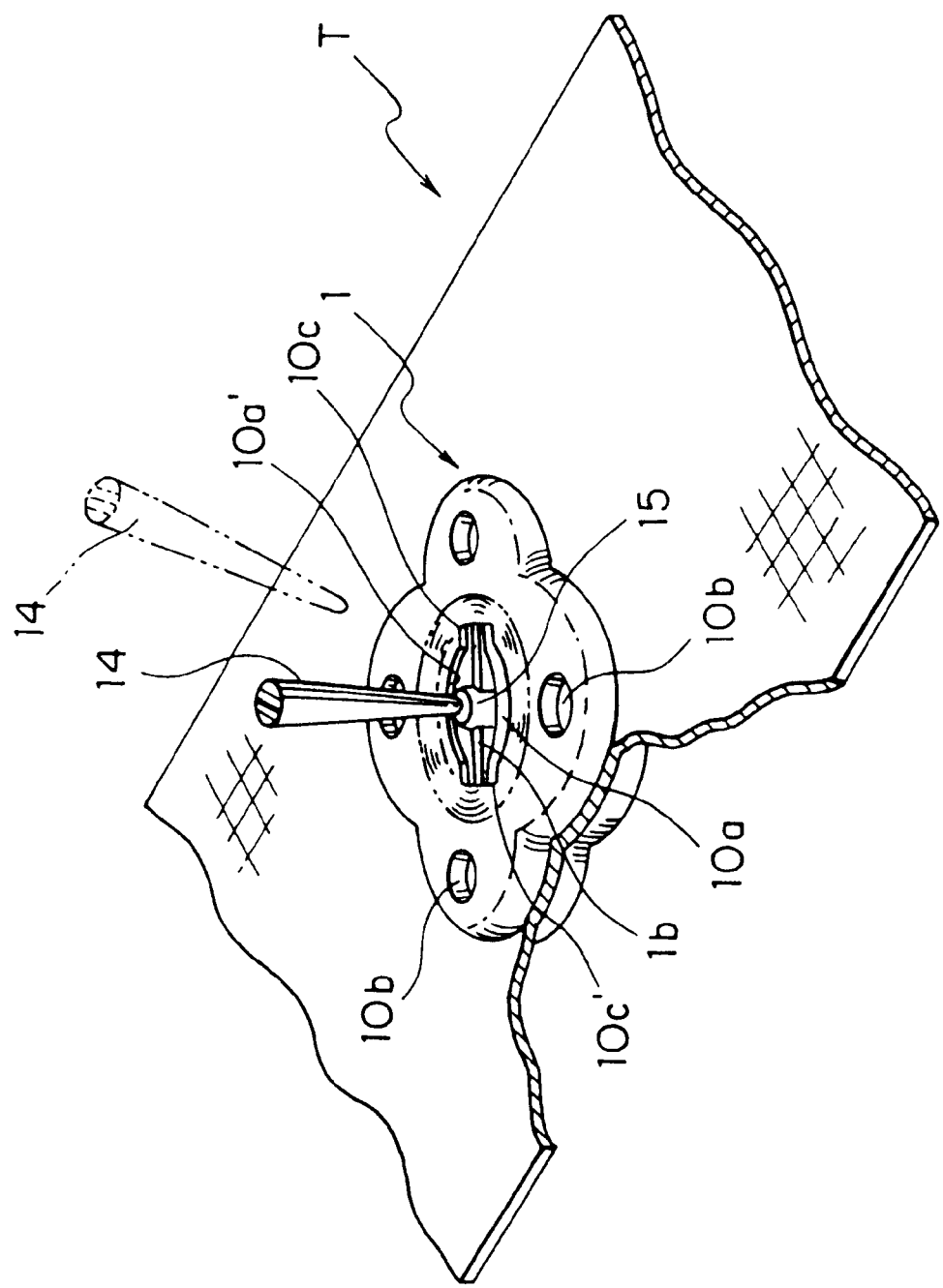
FIG. 2 is a fragmentary perspective view showing an example of a product shape when the female fastener as a base member in the embodiment mentioned above is within a forming metal mold.

FIG. 2 shows a representative shape of a base member on a tape in accordance with the present embodiment of this invention immediately after the base member 10 is integrally molded to the peripheral edge portion of the front and the back of the attachment hole 3 in the tape T. As shown in FIG. 2, the opening portion 10a of the base member 10 is not completely formed at the center portion thereof. In its molding, an outer shape of the base member 10 wholly shows a flower-like shape in which four arch-like portions are connected at their outer periphery. The opening portion 10a is arranged at the center portion, and in an intermediate portion in a direction of the thickness, the attachment hole 3 of the tape T extends near the peripheral edge portion of the opening portion 10a, so that the base member 10 is integrally adhered to the tape T so as to hold the attachment hole 3 of the tape T. Further, also in the present embodiment, in the same manner as that of the invention of the above-mentioned U.S. patent, four molding holes 10b which extend in the direction of the front and the back thereof and are formed on the front and back surfaces of substantially the center portion of the arch-like area of the base member 10 by the tape-supporting members, which will be described later, projecting into the cavity. The molding holes 10b are formed in such a manner that the tape T crosses the middle thereof.

In the base member 10 at the molding time in accordance with the present embodiment, a molded runner 14 molded by a molten resin passage of the mold comprising a runner 103a, a sub runner 103b and a gate 106 (see FIG. 6), and a molded gate 16 are simultaneously molded. An end of the molded gate 14 is connected to substantially a center of a bottom surface 10c' of a recessed notch portion 10c formed on an inner peripheral surface of the central opening portion 10a of the base member 10. The molded runner 14 is automatically broken and separated from the molded gate 16 at a time of opening the mold as mentioned below, and further, the molded gate 16 connected to the base member 10 is automatically broken and removed when engaged with the male fastener 2 as mentioned below, so that the opening portion 10a having a complete shape is formed.

Figure 3:
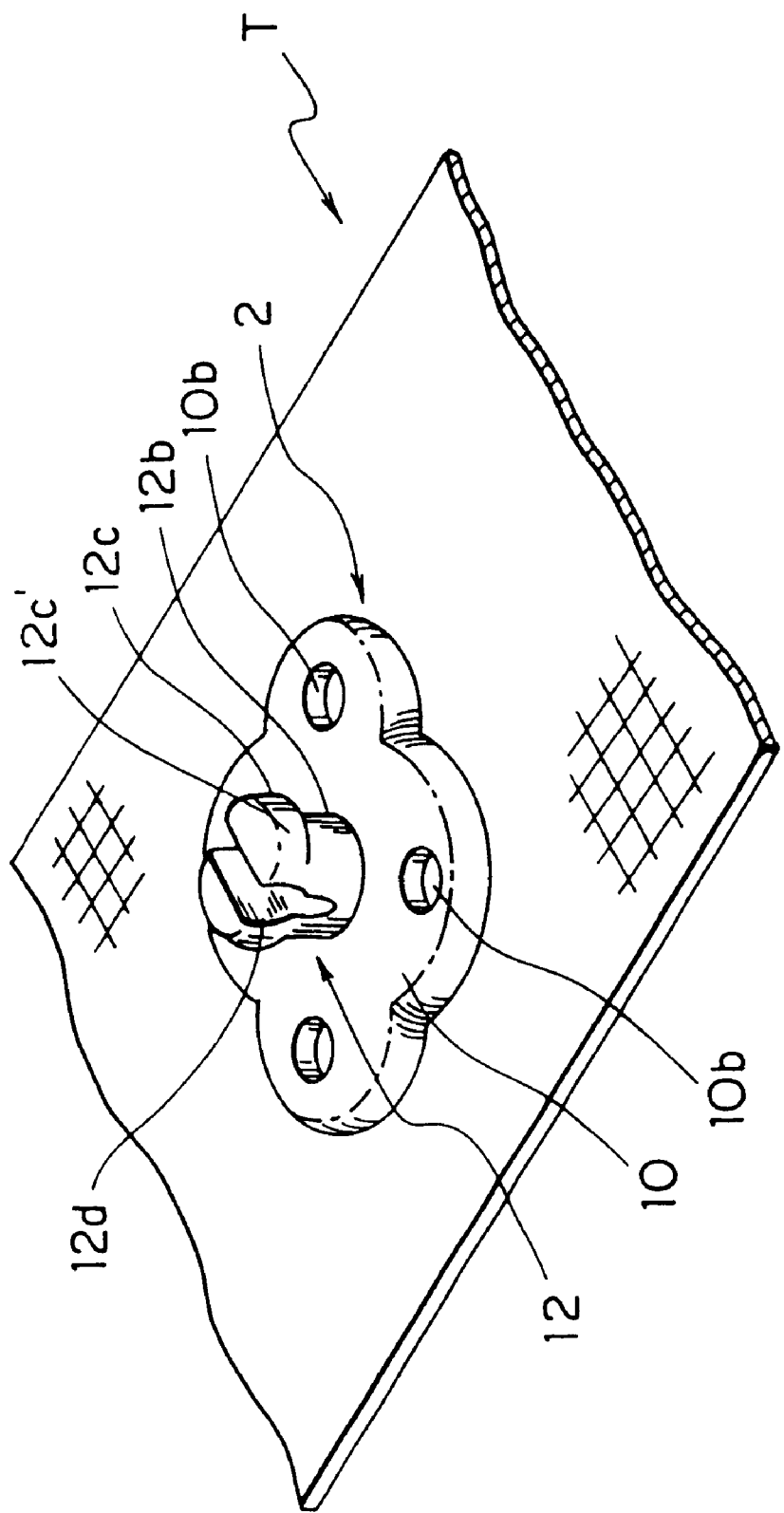
FIG. 3 is a fragmentary perspective view of the male fastener on the tape in which a second member consituting a male fastening member is integrally molded to the first member constituting a female fastening member.
Figure 4:
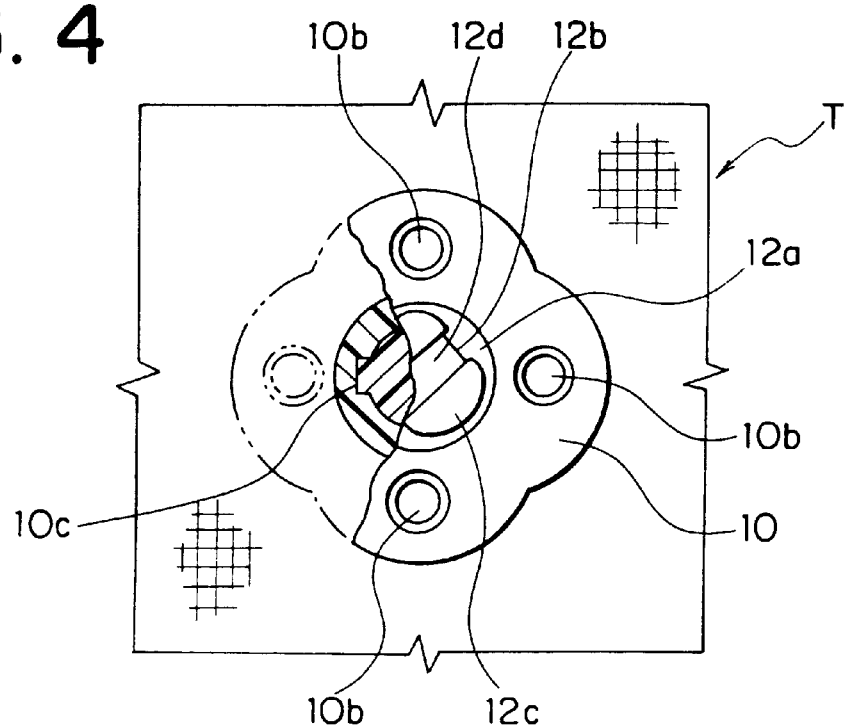
FIG. 4 is a plan view of FIG. 3.

FIGS. 3 and 4 show a structure of the male fastener 2 with tape which is integrally mounted to the tape T and is provided with all of the characteristic portions of the present invention. As is understood from the drawings, the male fastener 2 mentioned above is composed of a base member 10 as a first member of the present invention and a male fastening member 12 as a second member. In the embodiment as illustrated, the male fastening member 12 is composed of a base portion 12a fitted to and integrated with the opening portion 10a of the base member 10, a column portion 12b standing from the base portion 12a and an engaging head portion 12c comprising an engaging and disengaging portion formed in a front end of the column portion 12b. In accordance with the present embodiment, the column portion 12b and the engaging head portion 12c are separated into right and left portions by a split groove 12d extending from a middle of the column portion 12b to a front end of the engaging head portion 12c in an axial direction. Further, when the engaging head portion 12c is viewed from its upper surface, a whole shape of the head portion 12c including the split groove 12d assumes an oval shape having a shorter diameter portion in a longitudinal direction of the split groove 12d, and is formed in a shape expanding to a lateral direction of the column portion 12d. In accordance with the present embodiment, the male fastening member 12 having such a shape as mentioned above is integrally molded so as to be inserted into the opening portion 10a of the base member 10.

In the base member 10 as a first member in the present embodiment, various improvements which could not be expected in the invention of the U.S. patent are added.

Figure 5:
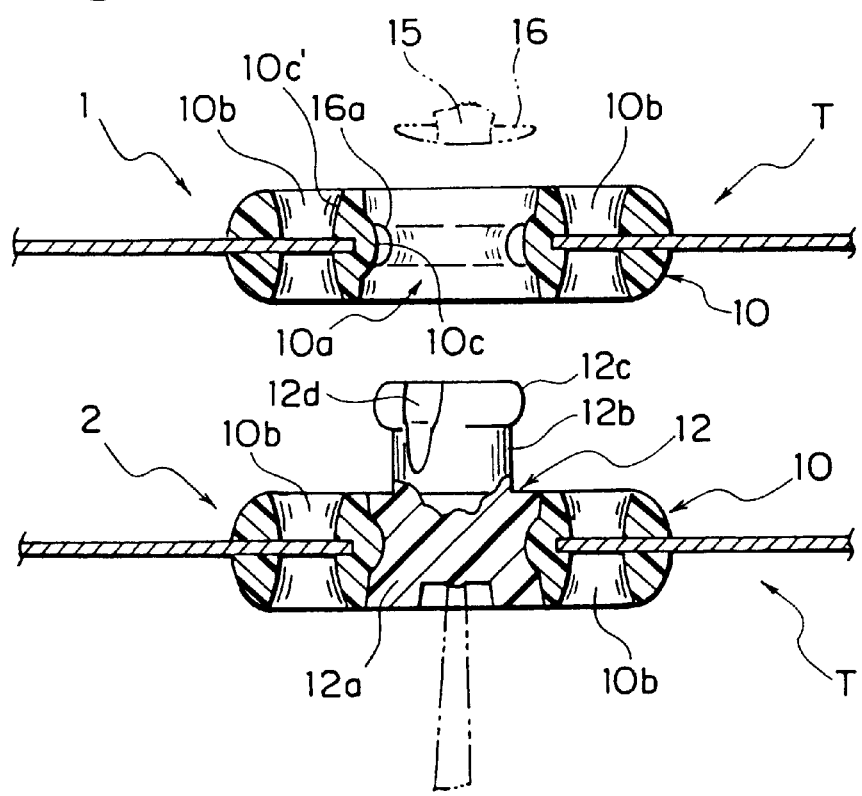
FIG. 5 is a schematic view of a mechanism for removing a molded gate when the male fastener engages with the molded female fastener.

As is apparent from FIG. 2, in accordance with the present embodiment, in order to make a cross sectional area of its connecting portion with the base member 10 as small as possible, the shape of the molded gate 16 is formed to be a wedge shape as a whole. Accordingly, when inserting the engaging head portion 12c of the male fastening member 12 into the opening portion 10a of the base member 10, as shown in FIG. 5, the molded gate 16 connected and integrated with the opening portion 10a can be simply broken and removed due to an inserting force of the male fastening member 12. By employing the gate shape as mentioned above, when sending the male and female fasteners with tapes in an engaged state at a time of their shipping, not only it is possible to omit a trimming process at a later process which was necessary in the invention of the U.S. patent, but also the molded gate 16 can be automatically removed at the same time of engaging the male and female fasteners with tapes.

Further, in the present embodiment, the recessed notch portion 10c formed on a part of the inner peripheral surface of the opening portion 10a is formed so as to be recessed toward two opposing molding holes 10b among four molding holes 10b formed by the tape-supporting members, so that the molded gate 16 and the two molded holes 10b are on the same straight line.

In a case that the base member 10 is used as a female fastener 1 as it is in the present embodiment, a burr made by breaking and removing the molded gate 16 (a gate burr 16a) is formed on the bottom surface 10c' of the recessed notch portion 10c as mentioned above, so that no burrs do not remain in the peripheral surface 10a' of the opening portion which directly contact with the engaging head portion 12c at a time of engaging and disengaging between the peripheral surface 10a' of the base member 10 as a female fastening member and the engaging head-portion 12c of the male fastening member 12. Further, a trimming as in the invention of the U.S. patent at the later process can be omitted. Furthermore, the gate burr 16a can hardly be seen in appearance. Still further, due to an existence of the recessed notch portion 10c, a connection of the inner peripheral surface 10a' of the opening portion 10a in a ring shape is partly broken, so that an engaging and disengaging operation of the male fastener 2 can be smoothly performed.

Further, by setting the connecting portion of the molded gate 16 with the bottom surface 10c' of the recessed notch portion 10c substantially at a center of the bottom surface 10c' as well as forming the molded gate 16 on the same straight line connecting between a center of the opening portion 10a and the molded holes 10b, pressure of introducing the molten resin into the mold cavity is positively directed to the peripheral edge portion of the attachment hole 3 in the tape T and also positively directed to the front and the back surfaces of the tape T and the tape-supporting members (pins) projecting into the cavity. Thus, it becomes possible to quickly expand a fluidization of the molten resin to a whole of the periphery of the attachment hole 3 in the tape T, so that it is possible to realize a proper corrugation shape in the peripheral edge portion of the attachment hole in the tape T in the same manner as the invention of the U.S. patent as mentioned above.

Figure 8:
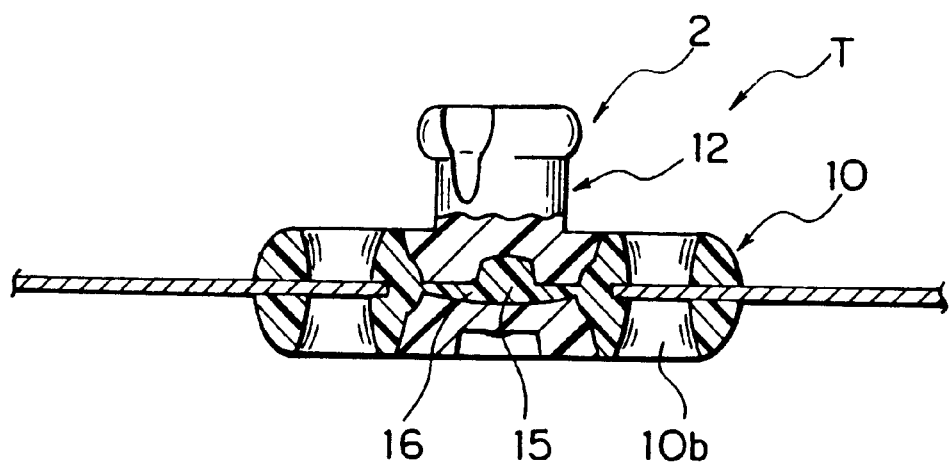
FIG. 8 is a cross sectional view showing an example of a male fastener in accordance with the present invention in which a molded gate is buried in and integrated with an inner portion thereof.

Also, in a case that the base member 10 is used as a first member of the present invention for manufacturing the male fastener 2, the recessed notch portion 10c is significantly effective. In the male fastener 2 as shown in FIGS. 3 and 4, attachment of the male fastening member 12 to the base member 10 is performed by integral molding. However, at a time of molding the male fastening member 12, since a part of the male fastening member 12 fills the recessed notch portion 10c, a locking function between the base member 10 and the male fastening member 12 is additionally achieved, so that a strength of its adhesion is further improved. Further, even when the molded gate 16 is left at the opening portion 10a of the base member 10, the male fastening member 12 can be molded in the opening portion 10a. Since the molded gate 16 is buried within the male fastening member 12 as a frame member as shown in FIG. 8, it is possible to improve the strength of adhesion. In this case, since the shape of the molded gate 16 is not broken and removed from the opening portion 10a, it may not be limited to the wedge shape as mentioned above.

Figure 6:
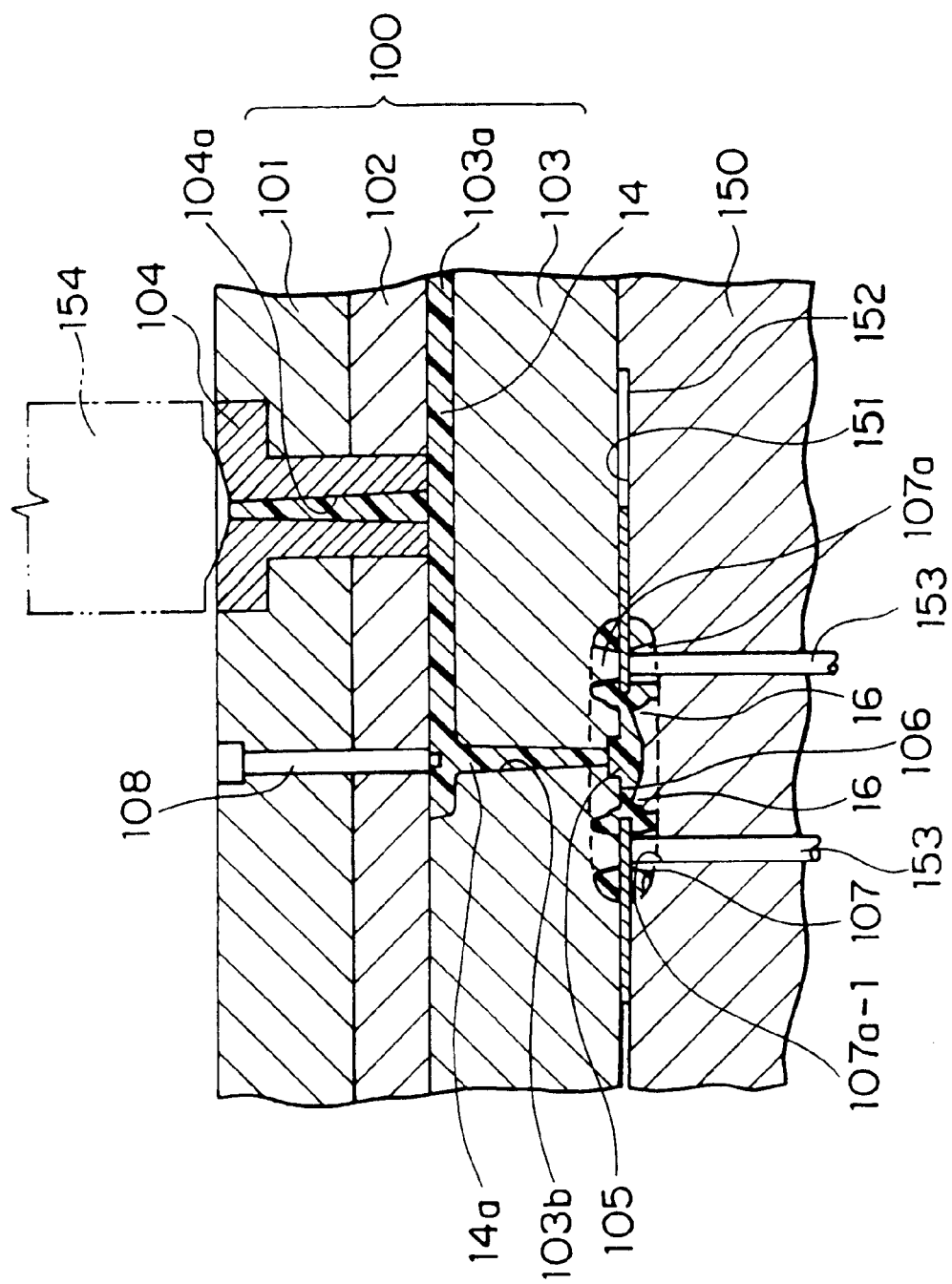
FIG. 6 is a fragmentary cross sectional view showing an example of an inner structure and an example of a molding mechanism of a mold for the first member in accordance with the present invention.

FIG. 6 shows an example of a mold for integrally molding the base member 10 on the tape T. In this example, the mold comprises a first mold (a movable mold) 100 and a second mold (a fixed mold) 150, and the first mold 100 is further composed of three-layered plates 101 to 103 relatively movable in a vertical direction. The upper plate 101 is a movable side mounting plate provided in a base frame so as to be movable in a vertical direction by a ascending and descending means (not shown) such as a hydraulic pressure cylinder or the like, and the intermediate plate 102 and the lower plate 103 independently move in a vertical direction with respect to the upper plate as a movable side mounting plate 101 in the same manner. On the contrary, the second mold 150 is composed of an independent plate fixed to a machine table.

A substantially upper half of a sprue bush 104 in which a sprue 104a is formed is fitted and fixed to the movable side mounting plate 101 in accordance with a normal method, and a substantially lower half of the sprue bush 104 is slidablly attached inn a fitting hole of a stripper plate 102 as an intermediate plate. A runner 103a communicated with the sprue 104a is formed in the lower plate 103 so as to be perpendicular to a moving direction of the tape T, and a sub runner 103b extending to a vertical downward direction is formed at an end of the runner 103a. In this case, a runner lock pin 108 is mounted in the movable side mounting plate 101 and the stripper plate 102 on a line extending from the sub runner 103b.

At the lower end of the sub runner 103b, a gate 106 horizontally extending via a resin storage portion 105 in a straight manner is formed on a parting surface 151 of the fixed mold 150 as a second mold. In accordance with this embodiment, as shown in FIG. 6, the gate 106 comprises two right and left portions extending in a straight manner with the resin storage portion 105 being as a center, a shape of each of the gate 106 is formed in a wedge shape. Thus, the gate 16 is a so-called pin point gate formed such that its cross section becomes smaller from the resin storage portion 105 to its front end. The resin storage portion 105 in the present embodiment is a portion of introducing the molten resin, and the gate 106 is a molten resin guiding passage in accordance with the present invention. Accordingly, the molten resin introducing portion to the base-member-molding cavity 107 in accordance with the present invention is a front end portion of the gate 106.

The front end portion of the gate 106 is connected to the cavity 107 for forming the base member 10 also serving as the female fastener 1. In accordance with the present embodiment, the molding cavity 107 is formed in the lower plate 103 and in the fixed mold 150 as a second mold with the parting surface therebetween, and the resin storage portion 105 is partly formed in the fixed mold 150. Further, a tape inserting passage 152 extending in a moving direction of the tape T (a direction perpendicular to a sheet surface of FIG. 6) is formed near the cavity 107 of the fixed mold 150.

The base-member-molding cavity 107 comprises a molding space having a flower-like shape having the gate 106 including a resin storage portion 105 formed in its center, i.e. a solid portion having a substantially circular shape, as shown in FIGS. 4 and 5. Within the ring-like space of the base-member molding cavity 107, four sets of pins 107a as tape-supporting members are arranged so as to project into the cavity 107 from upper and lower sides thereof at a phase difference of 90 degrees. A gap between each set of the upper and lower pins 107a is set to be sufficient for nipping the tape T. Further, in accordance with the present embodiment, an inserting hole for an eject pin 153 is formed along an axis of each pin 107a opposing to the gate 106 of the fixed mold 150 in such as manner as to pass the pin 107a through, and the eject pin 153 moves within the pin 107a by an eject-pin-ascending-and-descending means (not shown) in such a manner as to freely slide in a vertical direction.

Further, in accordance with the present embodiment, a connection portion between the gate 106 and the cavity 107 is disposed on a straight line connecting the gap between each set of the upper and lower pins 107a and the center of the resin storage portion 105, so that the gate 106 is directed to the peripheral edge of the attachment hole 3 in the tape T and the connection portion is formed so as to project into the inner portion of the cavity 107 so that the recessed notch portion 10c locally recessed in the outer diameter direction in a circular shape of the opening portion 10a of the base member 10 is formed.

Now, the description will be given of a procedure of manufacturing the base member 10 by the molding apparatus having the mold as structured above in accordance with the present embodiment. At first, as shown in FIG. 6, an injection nozzle 154 (not shown) of the injection apparatus is brought into contact with a sprue bush 104 in a state that a whole of the mold is closed, adn then an injection is performed. The molten resin is introduced into the base-member-molding cavity 107 through the sprue 104a, the runner 103a, the sub runner 103b, the resin storage portion 105 and the gate 106.

At a time of injection, the molten resin introduced into the cavity 107 flows to the peripheral edge of the attachment hole 3 in the tape T from the front end of the gate 106, and fills the whole of the cavity while circulating around the periphery of the pins 107a arranged in such a manner as to oppose in a vertical direction after flowing onto the respective front and the back of the tape T. At this time, the portion of the peripheral edge portion of the attachment hole 3 on the tape T other than the portions nipped by the pins 107a is buried in and integrated with the molten resin while being slightly corrugated by the fluidizing pressure of the resin.

When the injected resin is solidified by cooling, then the movable side mounting plate 101 and the stripper plate 102 together ascend so as to remove the molded runner 14 together with the molded sub runner 14a from the lower plate 103 while supporting it by the runner lock pin 108. At this time, a lower end of the molded sub runner 14a is broken and separated from an upper end of the molded resin storage portion 15 due to the separating force. Next, the stripper plate 102 slightly moves so as to release the support of the molded runner 14 by the runner lock pin 108, thereby separating it together with the molded sprue from the mold.

When finishing the separation, the lower plate 103 moves upward so as to open the mold, substantially at the same time, the eject pin 153 slightly moves upward so as to push up the tape T exposed at a middle of the molded hole 10b formed by each supporting pin 107a, thereby pushing out the base member 10 together with the molded gate 16 outside of the mold. The base member 10 at this time has such a shape as shown in FIG. 2, after the molded sub runner 14a is broken and separated as shown by an imaginary line in FIG. 2. Since the molded gate 16 left in the base member 10 is connected at a slight portion to the bottom surface 10c' of the recessed notch portion 10c formed in the opening portion 10a of the base member 10, it can be automatically broken and removed when engaged with the engaging head portion 12c of the male fastener 2 as mentioned above.

Since the breakage burr of the molded gate 16 (the gate burr 16a) formed at the this breaking is formed on the bottom surface 10c' of the recessed notch portion 10c, it can hardly be seen from outside. Further, since the burred surface is not formed on the inner peripheral surface 10a' of the opening portion 10a to be directly engaged with and disengaged from the engaging head portion 12c of the male fastener 12 and since a part of the circular inner peripheral surface 10a' is separated by the recessed notch portion 10c, its engagement and disengagement with respect to the male fastener 12 can be more smoothly performed.

In this case, in accordance with the present invention, it is possible to use a mold in which four gates 106 are formed crosswise with the resin storage portion 105 being as a center. In this case, four resin introducing portions to the base-member-molding cavity 107 are formed in such a manner as to direct to the peripheral edge of the attachment hole on the tape T. Accordingly, in comparison with the embodiment mentioned above, the resin can be smoothly fluidized and the base member 10 can be stably molded and integrated with the tape T. Further, since the inner peripheral surface 10a' of the opening portion 10a formed in a substantially circular shape is uniformly separated into four portions in a circumferential direction thereof, its engagement and disengagement with respect to the male fastener 12 can be more smoothly performed than the embodiment mentioned above.

Figure 7:
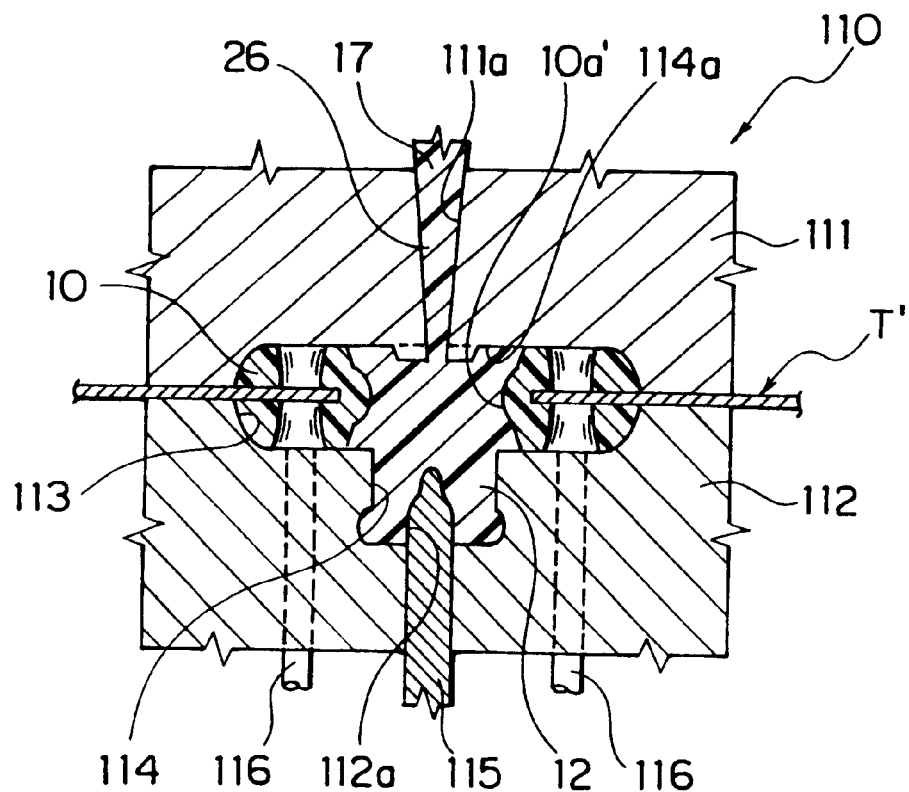
FIG. 7 is a fragmentary cross sectional view showing an example of a structure and an example of a molding mechanism of a mold when the second member is integrally molded with an opening portion of the first member.

FIG. 7 shows a main portion of a mold for integrally molding the male fastener 12 on a tape T' with a base member obtained by molding and integrating the base member 10 having a shape as mentioned above. In accordance with the embodiment, the base member 10 constitutes a first member in accordance with the present invention, and the male fastening member 12 integrally molded on the inner peripheral surface 10a' of the opening portion 10a in the base member 10 constitutes a second member.

Here, it is important to give a difference in a melting point between the base member 10 and the male fastener 12.

This kind of fastening device with tape is generally mounted along an opening and closing portion of each of various products comprising various fabrics, synthetic resin sheets, leather, non woven fabrics or the like. When a final product to which the fastening device with tape is mounted is shipped, a thermal set is performed by an expert at each of the products, so that a temperature of thermal set is strictly controlled and no special problem is generated. However, when the product is taken to a domestic place and it is ironed for example, many kinds of products tend to be simultaneously ironed, and some products are ironed at a temperature equal to or more than a proper ironing temperature.

On the other hand, since the fastener itself of the fastening device with tape is required to have less influence by environment, easy formability, a suitable rigidity and coefficient of friction, a relatively low cost and the like, polyacetal resin is generally is employed. However, the polyacetal resin has a low melting point which is 179° C. even in a homopolymer having a higher melting point than copolymer thereof. Thus, the ironing temperature for finishing the normal clothes or the like frequently becomes equal to or higher than the melting point, so that when the iron set at the temperature equal to or higher than the melting point of material of the clothes is erroneously brought into contact with the fastener, especially with the male fastener having an engaging head portion protruding from the tape surface, it is easily softened or melted and the engaging head portion is deformed or press broken. As a result, the engaging and disengaging function as well as the outer appearance is lost.

In general, the iron functions such that the finishing temperature can be altered at some steps in accordance with the material of the product to be finished. For example, in a case that the product is constituted of fiber material such as cotton, flax or the like, the ironing temperature is set to a high temperature of substantially 190° C. The ironing temperature is set to a medium temperature of substantially 160° C. in a case of animal fiber such as sheep wool, silk or the like, or synthetic fiber having relatively high finishing temperature such as nylon, polyester or the like, and it is set to a temperature of substantially 100° C. in a case of the fiber product made of acrylic resin, polyurethane and the like which is necessary to be finished at a low temperature.

Accordingly, in a case that the finishing temperature of the product by the iron is higher than the melting point of the fastener, when the iron is accidentally brought into contact with the fastener so as to be pressed, the fastener is melted or softened so as to be easily deformed. If the deformation is given only at the base material portion mentioned above, a damage is only on the outer appearance. However, when the deformation is given in the male fastening member 12, the basic engaging function as the male fastener is lost.

In this case, as mentioned above, since the base member 10 in accordance with the present invention can be also used as a female fastener 1, in manufacturing the fastening device with tape in accordance with the present invention, the base member 10 can be commonly molded with respect to all the male and female fasteners, so that it is preferable to use material which is not affected by environment as much as possible and is easily molded on the tape for the base member 10. Accordingly, in the present embodiment, polyacetal resin is used for the base member 10 and polyamide resin such as nylon 6, nylon 66 or the like is used for the male fastening member 12.

However, the material of the base member 10 is largely affected also by the material of the tape. For example, the tape can employ significantly various kinds of materials, for example, such as a fiber tape constituted by natural fiber such as cotton, sheep wool or the like or synthetic fiber such as polyamide, polyester, polypropylene or the like, and synthetic resin film made by polyamide, polyester, polyvinyl chloride, polyethylene or the like. Further, a tape strechable material, a very super thin tape or the like may be used in a structure of the product.

In order to secure a strength of adhesion of the base member 10 with respect to the male fastening member 12 in addition to a strength of adhesion with respect to the tape material, it is necessary to variously change the material of the base member 10. Accordingly, the present invention does not limit the material to those as mentioned above, and all thermal plastic synthetic resins can be employed.

The typical resin material to be applied to the base member 10 is exemplified by polyacetal resin, polyvinyl chloride, polyvinyl acetate, various kinds of polyamide, polyester or the like, while the typical resin material to be applied to the male fastening member 12 is exemplified by a polyamide resin, polyethylene terephthalate, polybutylene terephthalate, polymethyl pentene, polyphenylene oxide, polycarbonate, polypropylene or the like.

Further, inorganic additive such as fine particle of metal and ceramic, glass fiber, carbon fiber, aramide fiber or the like may be mixed in the thermoplastic resin material as mentioned above. In this case, when adding these inorganic additive, it is preferable to add a fine amount of, for example, 10 wt % or less without deteriorating an elasticity of the male fastening member.

The melting point of the resin material is as shown in TABLE 1.

TABLE 1

| RESIN MATERIAL | MELTING POINT (° C.) |
| --- | --- |
| nylon 6 | 215~225 |
| nylon 66 | 253~263 |
| nylon 6-12 | 210 |
| nylon 6-10 | 213 |
| nylon MXD 6 | 243 |
| polyethylene terephthalate | 256~265 |
| polybutylene terephthalate | 224~230 |
| polymethl pentene | 240 |
| polyphenylene oxide | 210 |
| polycarbonate | 145~150 |
| low density polyethylene | 108~122 |
| high density polyethylene | 127~134 |
| polyvinyl chloride | — |
| polyvinyl acetate | — |
| polyacetal | 165~179 |
| polypropylene | 160 |

As is understood from TABLE 1, taking into consideration the fact that an upper limit of the high temperature finishing by the iron is 190° C., it is possible to mold the male fastening member 12 of the above resin material, in the case of the resin material having a melting point of 200° C. or more. However, taking into consideration the fact that there is a case that a finishing is performed at a low temperature depending on the product to be ironed, as mentioned above, it is not necessary to set the melting point of the male fastening member 12 at a high temperature as mentioned above. On the other hand, taking into consideration a adhesion strength between the base member 10 and the tape T and the material of the male fastening member 12, and a formability of the base member 10 by molding, it is desirable to select the material having a melting point equal to or lower than the melting point of the male fastening member 12 for the base member 10.

FIG. 7 shows a manner in which the mold is closed when integrally molding the male fastening member 12 with the base member 10. In the drawing, reference numeral 110 denotes an injection mold for forming the male fastening member, and the mold 110 is provided with a movable mold 111 and a fixed mold 112 in the same manner as the injection mold for molding the base member as previously mentioned. On a parting surface between the movable mold 111 and the fixed mold 112, there is formed a tape-with-base-member-receiving space portion 113 which fittedly receives the base member 10 and the tape T integrally formed with the base member 10 as a center, and there is formed a male-fastening-member-molding cavity 114 which is connected to the tape-with-base-member-receiving space portion 113 so as to cover and fill a central opening portion 10*a* of the base member 10 with the base portion 12*a* of the male fastener 12, including the column portion 12*b* and the engaging head portion 12*c*.

Accordingly, a gate 111*a* communicated with a runner (not shown) is formed in the movable mold 111 in such a manner as to communicate with a center portion of a base-portion-forming portion 114*a* in the male-fastening-member-molding cavity 114, while a slide passage 112*a* of a slide core 115 for dividing the column portion 12*b* and the engaging head portion 12*c* of the male fastening member 12 into two portions is formed in the fixed mold 112. In the illustrated embodiment, the slide passage 112*a* is formed in such a manner that the slide core 115 can slide in acrossing direction of the fixed mold 112. In this case, in the illustrated embodiment, an eject pin 116 to be brought into contact with an outer surface of the base member 10 is provided in an inner portion of the tape-with-base-member-receiving space portion 113 of the fixed mold 112 and at a portion in which the base member 10 is received so that the eject pin 116 can freely ascend and descend.

The tape T' with base member integrally molded thereto at the peripheral edge portion of the attachment hole 3 in the tape T is inserted and set within the injection mold as structured in the manner mentioned above. In the male fastener 2 in FIG. 7, a basically different point of the structure from the base member 10 as a female fastener exists in that the male fastening member 12 as the second member of the present invention is molded and integrated with the opening portion 10*a* of the base member 10. That is, the opening portion 10*a* is closed by the base portion 12*a* of the male fastening member 12, and the column portion 12*b* and the engaging head portion 12*c* to be engaged with and disengaged from the opening portion 10*a* of the base member 10 as a female fastener are provided so as to project from one surface of the base portion 12*a*.

The fastening member 12 comprises the column portion 12*b* directly standing from the base portion 12*a* covering the opening portion 10*a* of the base member 10 and the engaging head portion 12*c* connected to the front end of the column portion 12*b*, as mentioned above, and is divided into two portions by a split groove 12*d* extending from a portion near a standing end portion of the column portion 12*b* to the engaging head portion 12*c*. A shape of the split groove 12*d* is determined in accordance with a vertical cross sectional shape of the slid core 115. As is apparent from FIG. 7, a bottom surface of the groove 12d is formed in a circular arc surface, a narrow groove portion and a wide groove portion are continuously formed via an arch-like step portion from the circular arc surface to the end portion of the engaging head portion 12c.

In accordance with the shape of the split groove 12d of the present embodiment, on the sake that a thickness of an bulging portion 12c' of the engaging head portion 12c in its bulging direction and a thickness of the groove bottom portion in its diametrical direction are substantially equal to each other and the groove bottom portion is narrow, there is a reduced influence by a shrinkage after molding, so that a part of the column portion 12b and the engaging head portion 12c which are divided into right and left portions stand substantially in a parallel manner even after the molding.

On the other hand, in a case that a cross section of a split groove is formed in a simple rectangular shape as in the conventional split groove, because a thickness of the bulging portion of the engaging head portion in its bulging direction is thicker than a thickness of a part of the other laterally divided column portion and the engaging head portion, and because a width of the groove bottom portion is relatively wider than the other portion, the laterally divided engaging head portion tends to be deformed in a direction approaching to each other due to the shrinkage after molding. This causes a reduction of the engaging force with respect to an opposing female fastener 1, that is, the engaging and disengaging force is easily weakened in comparison with the present embodiment.

Further, in accordance with the shape of the male fastening member of the present embodiment, its elastic deformation can be performed larger than that having the conventional split shape, so that an engaging and disengaging operation with respect to the female fastener 1 can be easily performed, and a desired engaging and disengaging force can be secured.

In order to integrally mold the male fastening member 12 provided with the structure mentioned above with the peripheral edge portion of the opening portion in the base member 10, after the tape T with base member is inserted into the tape-receiving space portion 113 formed in the movable mold 111 and the fixed mold and the mold is closed, the molten resin is injected at a desired injection amount, and is introduced into the cavity 114 for forming the male fastening member through the gate 111a. When the molten resin introduced into the cavity 114 for forming the male fastening member is cooled and solidified, the movable mold 111 ascends and the molded male fastening member 12 and the molded gate 26 are broken and separated.

Next, before the male fastener 2 is pushed out from the fixed mold 112 by the eject pins 116, that is, at the time when the movable mold 111 starts its mold opening operation, the slide core 115 is also operated. When the slide core 115 is taken out of the molding cavity portion of the male fastening member 12, the eject pin 116 is operated so as to push out the male fastener 2 comprising the base member 10 and the male fastening member 12 from the fixed mold 112. At the time of pushing out, the engaging head portion 12c is elastically deformed at a part of the column portion 12b and the engaging head portion 12c by the existence of the split groove 12d therebetween, so that the male fastener 2 can be easily pushed out to the outer portion of the mold.

Here, when the male fastener 2 is engaged with the base member 10 as the female fastener which leaves the molded gate 16 at the molding time as mentioned above, as shown by an imaginary line in FIG. 5, the molded gate 16 left in the opening portion 14a as mentioned above is automatically broken and removed together with the molded storage portion 15 due to the pushing force to the opening portion 10a by the engaging head portion 12c.

As mentioned above, in a case of molding the male fastening member 12 to the base member 10, it is possible to differentiate colors of the base member 10 and the male fastening member 12, so that it is possible to manufacture a male fastener with tape which is rich in a design property.

In the above description, the explanation was given of the embodiment in which the male fastening member 12 as the second member of the present invention is molded in and integrated with the base member 10 as the first member in accordance with the present invention. However, in accordance with the present invention, the second member integrally molded with the base member 10 may be a female fastening member 11. In the following description, the same reference numerals denote the members and elements corresponding to the embodiment mentioned above.

Figure 9:
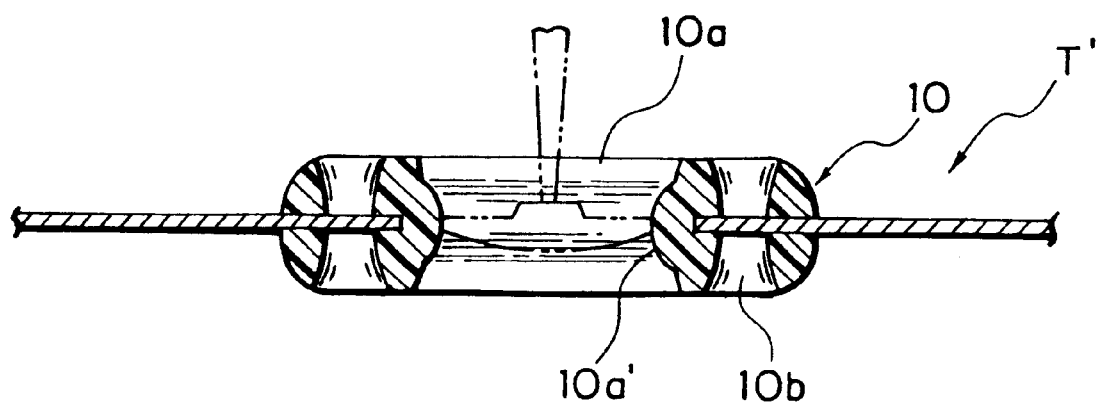
FIG. 9 is a cross sectional view showing an example of the first member in accordance with the present invention in which an unevenness is provided on an inner peripheral surface of an opening portion thereof.
Figure 10:
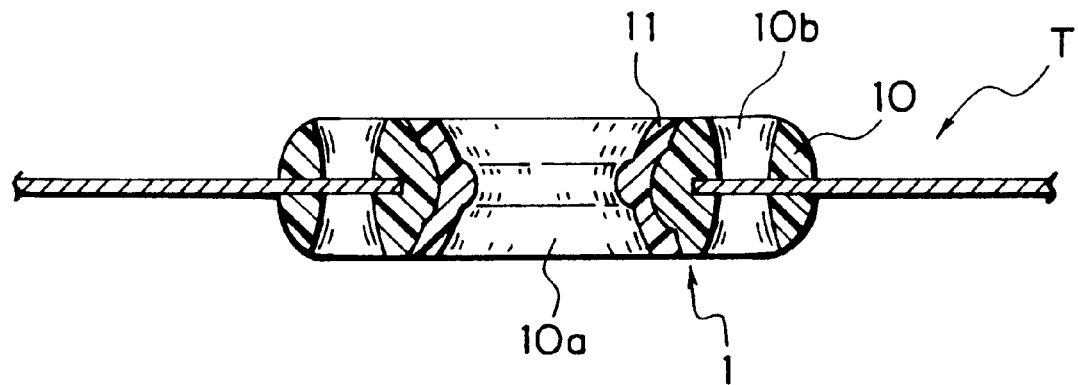
FIG. 10 is a cross sectional view of a fastener on a tape in which a female fastening member as a second member is integrally molded to an opening portion of the first member.

FIGS. 9 and 10 are schematic views showing a typical embodiment of a female fastener with a tape in which the female engaging member 11 as a second member is integrated and molded with the base member 10 as a first member in accordance with the present invention. FIG. 9 is a cross sectional view when the base member 10 is integrally molded with the peripheral edge portion of the attachment hole 3, and FIG. 10 is a cross sectional view of the female fastener with the tape obtained by molding and integrating the female fastening member 11 as a second member with the base member opening portion 10a of the tape T' with the base member.

As is understood from FIG. 9, the base member 10 in accordance with the present embodiment is different from the embodiment mentioned above, in that a multiplicity of concave and convex portions (uneven portion) are formed on the inner peripheral surface 10a' without forming the inner peripheral surface 10a' of the opening portion 10a to be an engaging surface with respect to the opposing male fastener 12. Due to the uneven surface, when the female fastening member 11 is molded as shown in FIG. 10, a part of the female fastening member 11 is molded along the uneven surface, which can thus form a firm adhesion surface. The embodiment is obtained by the molding method on a basis of the shape and the arrangement of the sprue and the gate substantially the same as in the embodiment for molding and integrating the male fastening member 12 as shown by an imaginary line in FIG. 9.

As is the same in the embodiment as previously mentioned above, in a case of mounting the female fastening member 11 as a second member to the first member as the base member 10, it is possible to mold the first member and the second member by the materials having different colors and by the materials having different natures, so that it is possible to meet various requirements by selecting colors and/or natures of materials.

For example, in a case of applying the male fastening member 12 as the second member as in the embodiment previously mentioned, the fastening device with tape which is rich in a design property can be manufactured by differentiating the colors of the base member 10 and the female fastening member 12. In a case of applying the female fastening member 11 as the second member as in the embodiment mentioned above, the base member 10 may be molded by hard material while the female fastening member 11 is molded of material softer and smaller in a coefficient of friction than those of the base member 10 as the first member, so that an adhesion portion between the tape T and the female fastener 1 is made firm and a desired engaging force can be obtained and a smooth engaging and disengaging operation can be performed with respect to the opposing male fastener 2. In this case, when the material of the first member and the second member of the opposing male fastener 2 are selected in the same manner as the above female fastener 1, the same function as that mentioned above can be obtained.

Further, in a case of intending to mold the base member 10 as the first member and the female fastening member 11 or the male fastening member 12 as the second member by the different colors in the present invention, the coloring is generally performed by mixing pigment with the respective resin material. In this case, for example, if the material which can be dyed by dyestuff is selected for the first member, it is possible to dye together with the tape T by the same dyestuff after molding the first member on the tape T. Or, if the dyestuff which can not be dyed on the tape but dyed on the first member is selected, it is possible to differentiate the color of the tape T and the color of the first member. Thus, when the first member can be dyed, for example, it is possible to apply dying to a desired amount of the first members on the tapes as demanded after manufacturing a large amount of tapes with the first members in which colorless first members are previously integrally molded on the respective tapes T, so that an efficient manufacturing and product control can be performed.

Figure 11:
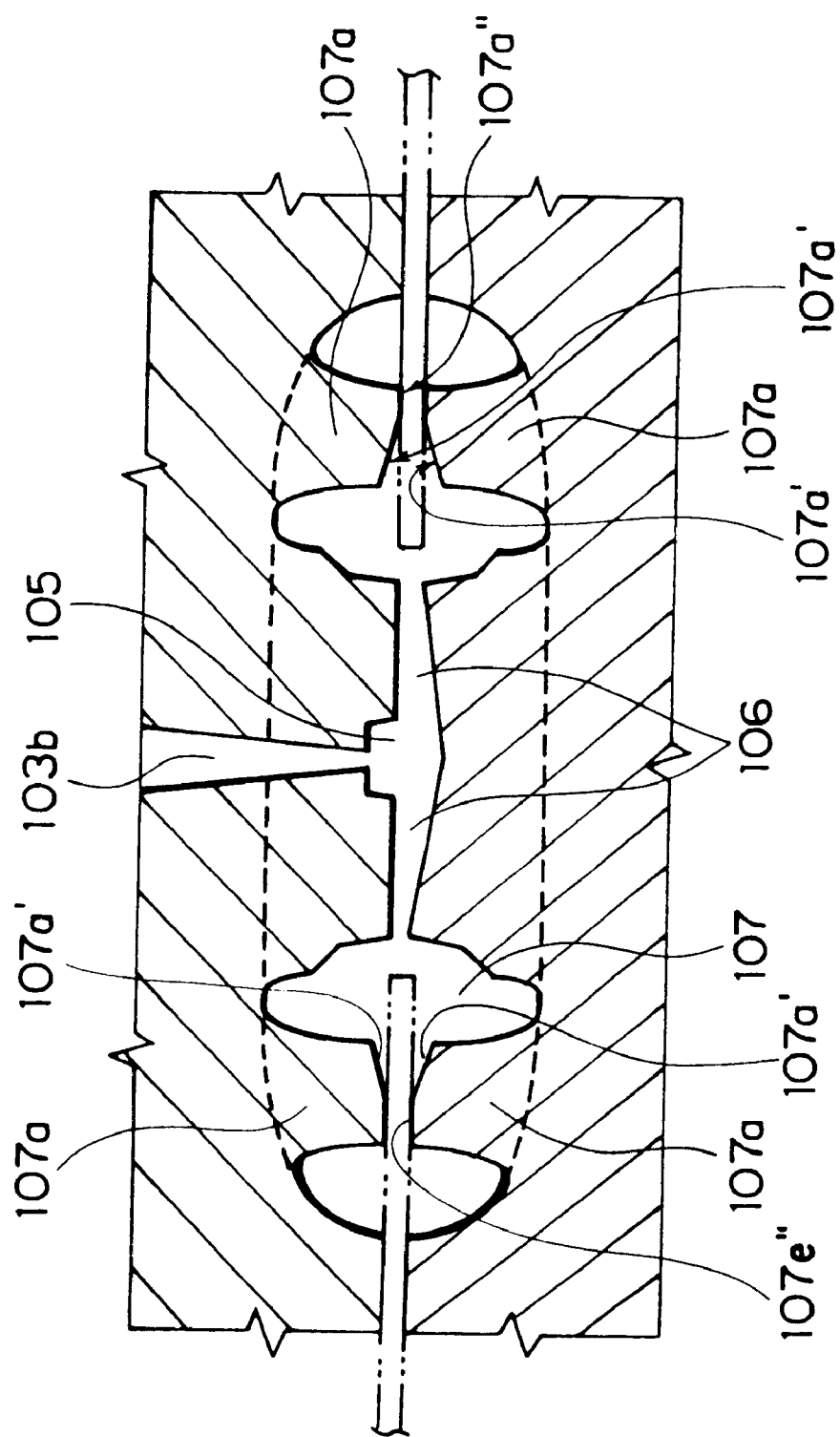
FIG. 11 is a cross sectional view showing a preferred example of a cavity of a mold for the first member in accordance with the present invention.
Figure 12:
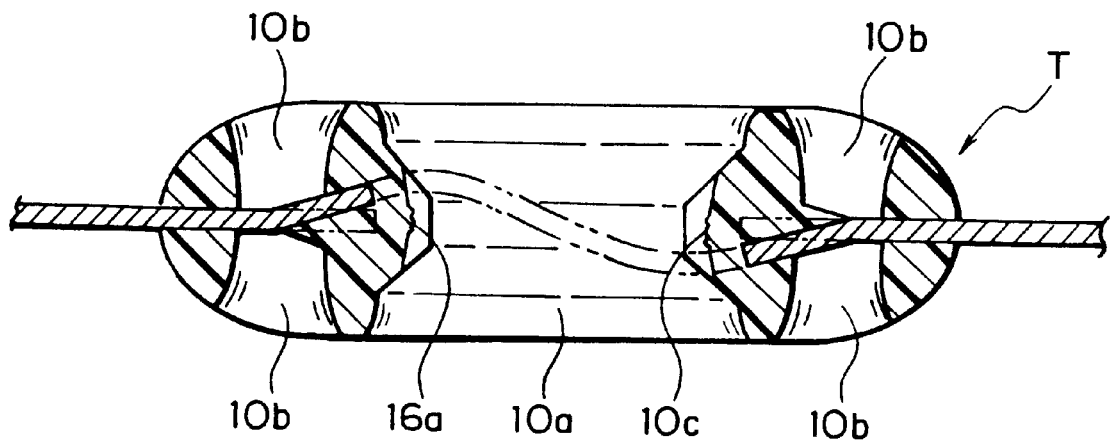
FIG. 12 is a cross sectional view showing a shape of the first member integrated on a tape by the mold.

FIGS. 11 and 12 respectively show a preferred embodiment of a shape of support pins protruding into the cavity for forming the base member in the mold from the upper and lower sides thereof in an opposing manner in the case of integrally molding the base member 10 with the attachment hole 3 of the tape T, and an example of a typical cross sectional shape of the base member 10 in use of the mold.

Since the shapes of the other molding members are the same as those of each of the embodiments as mentioned above, the description will be given to a shape of a support pin 107*a* within the cavity for forming the base member here. The support pin 107*a* is substantially formed in a conical trapezoidal shape protruding in a direction of approaching to each other, and arranged at a phase difference of 180 degrees or a phase difference of 90 degrees with each other on the same circumference of each of the bottom surfaces of the ring-like base-member-molding cavity 107. In the embodiment mentioned above, the pin is formed in a simple conical trapezoidal shape, however, in accordance with the present embodiment, a part of the front end portion of the support pin 107*a* is formed on the taper surface 107*a*' as shown in FIG. 11. Further, the taper surface 107*a*' is formed in such a manner that when the peripheral edge portion of the attachment hole 3 in the tape T is nipped by the support pin 107*a*, an interval between the peripheral edge portion of the attachment hole 3 and the front end portion of the support pin 107*a* becomes gradually greater toward a center of the attachment hole 3.

Then, in accordance with the present embodiment, in a plan view of each support pin 107*a*, a half of an end surface of the support pin 107*a* is made to be a flat surface 107*a*" to firmly nip the tape T, and the remaining end surface is formed to be a taper surface 107*a*'. This taper surface 107*a*' is a corrugation control portion in accordance with the present invention, and serves to suitably control the corrugation in the peripheral edge of the tape attachment hole 3. It is preferable that an taper angle of the taper surface 107*a* is about 5 to 45 degrees, and more preferably 10 to 25 degrees. Further, a portion of the flat surface 107*a*" as a front end nipping portion in accordance with the present invention is designed so as to be positioned in the outer peripheral edge side from a substantially center point on the straight line connecting the support pin 107*a* and the outer peripheral edge of the base-member-molding cavity 107 which nips the tape T with the attachment hole 3 being a center. The taper angle is determined depending on flexibility of the tape T.

As mentioned above, not only a suitable corrugation state is generated in the peripheral edge portion of the tape attachment hole 3 due to the pressure of the molten resin introduced to the cavity 107 by forming the taper surface 107*a*' on the support pin 107*a*, but also it is possible to control a magnitude of the corrugation shape by adjusting the taper angle, so that a proper strength of adhesion of the base member 10 (the first member) with respect to the tape T can be secured.

The molten resin introduced to the peripheral edge of the attachment hole 3 in the tape T, substantially in parallel to the tape T, branches and flows into the front and back surfaces of the tape T. Due to the introduced molten resin, the peripheral edge of the attachment hole 3 is going to largely corrugate at the periphery of the front end support portion 107*a*" of the support pin 107*a*, however, the corrugating amount is suitably controlled by the taper surface 107*a*' so that the peripheral edge of the attachment hole 3 is buried in the molten resin within the cavity in a suitable corrugating state as shown in FIG. 12, so that the base member 10 can be integrally molded with the strength of adhesion in the peripheral edge portion of the attachment hole 3 being secured.

In the mold as shown in FIG. 6, since the front end of the support pin 107*a* protruding into the base-member-molding cavity 107 has a certain level of thickness, as shown in FIG. 6, it is possible to inset the eject pin 153 in the pin hole 107*a*-1 formed in the axial core of the support pin 107*a*. However, in the case that the front end portion of the support pin 107 is narrow, or in the case that the taper surface is provided in the front end portion of the support pins as mentioned above, the pin hole 107*a*-1 can not be formed. In this case, it is possible to shift and dispose the inserting hole 107*a*-1 for the eject pin 153 in a circumferential direction from the position in the support pin 107*a* so as to bring into contact with an outer surface of the base member 10.

In the embodiment mentioned above, the description is given to the embodiment in which the male or female fastening members 11 or 12 as the second member is integrated with the base member 10 as the first member by molding. However, the method of integrally mounting the second member to the first member in accordance with the present invention includes various mounting methods other than the integral molding.

Figure 13:
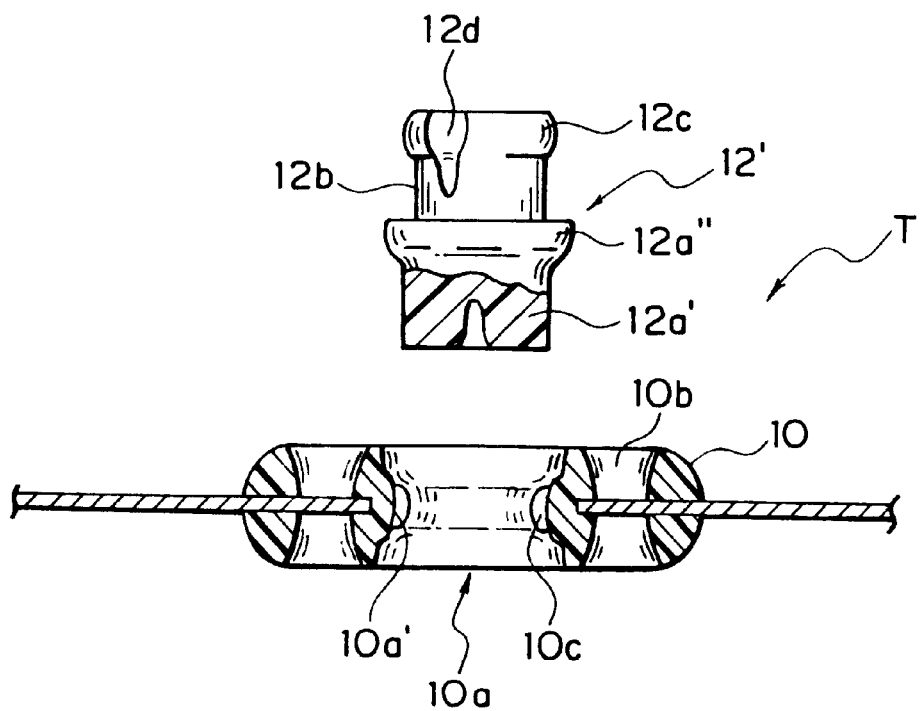
FIG. 13 is a cross sectional view, partly in side elevation, which shows an example of a shape before the second member is mounted to the independently molded first member in accordance with the present invention.
Figure 14:
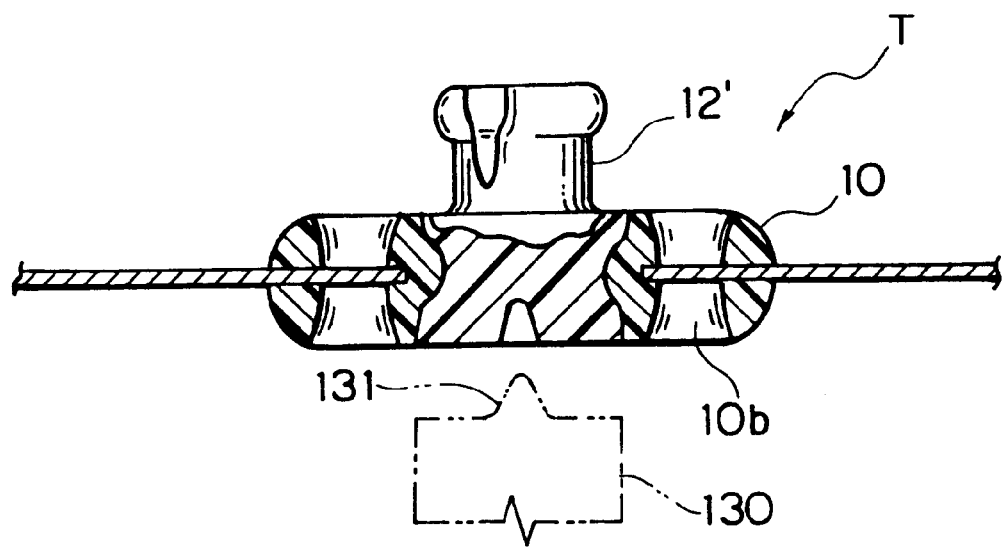
FIG. 14 is a cross sectional view showing an example of a shape and a mounting mechanism of the fastener on a tape after the first member and the second member are attached to each other due to a thermal deformation.

FIGS. 13 and 14 show an example of such other mounting method. In this example, a male fastening member 12' as the second member similar to the male fastening member and having a base portion 12*a*', a column portion 12*b* and an engaging head portion 2*c* are previously formed. A shape of the male fastening member 12' is substantially similar to the fastening member 12, however, a tapered blind hole is simultaneously formed at a center of an end surface of the base portion 12*a*'. Then, after the male fastening member 12' preliminarily formed in this manner is inserted into the opening portion 10*a* of a base member 10, a conical projecting portion 131 of a heated body 130 shown by an imaginary line in FIG. 14 is inserted into the blind hole at the center of the end surface of the male fastening member 12' so as to be pressed. Due to the pressing force and the heating, the end surface side of the male fastening member 12' is heated and deformed, and the diameter thereof is expanded so as to form an outer shape corresponding to the opening portion 10a of the base member 10. Therefore, the male fastening member 12' is engaged and integrated with the opening portion 10a together with a flange portion 12a" of its base portion 12a'.

Figure 15:
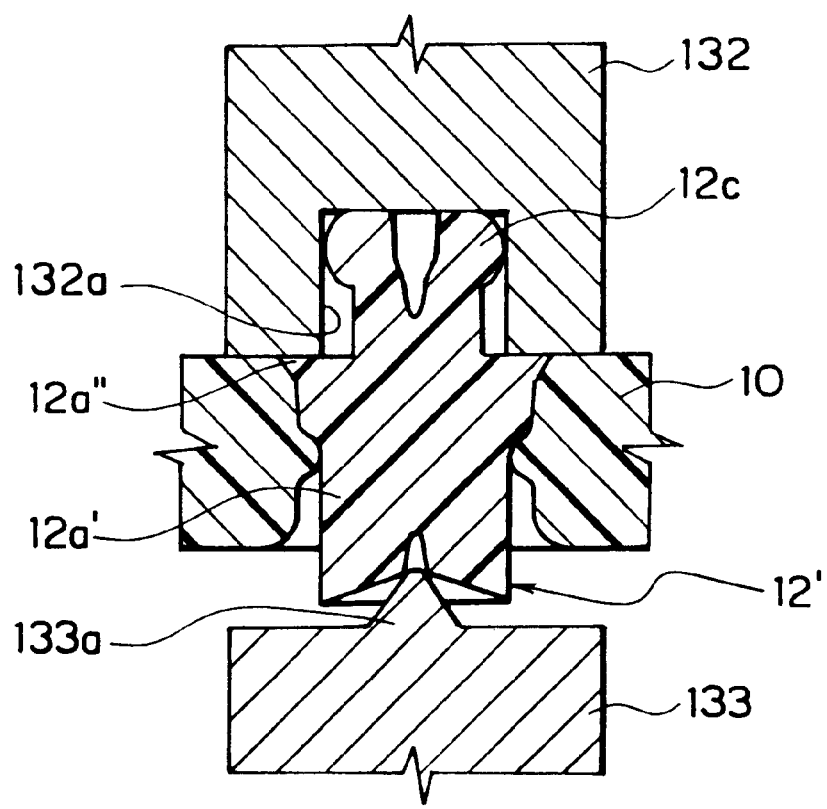
FIG. 15 is a cross sectional view showing an arrangement of each of the first and second members at a first stage of ultrasonic welding for the first member and the second member.
Figure 16:
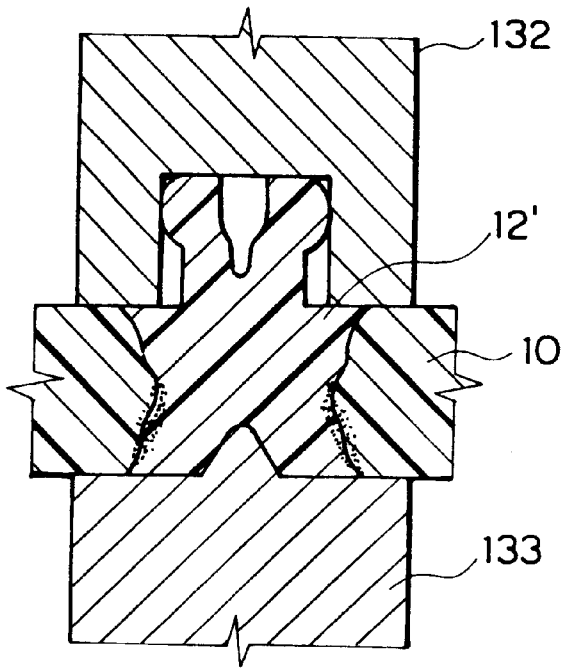
FIG. 16 is a cross sectional view showing a state of the welding.

FIGS. 15 and 16 show an example of the other mounting method by an ultrasonic wave. In this mounting method, the male fastening member 12' having the same shape as mentioned above is previously formed. Then, the male fastening member 12' is inserted into an opening portion 10a of a base member 10, and next, a column portion 12b and an engaging head portion 12c of the male fastening member 12' is fitted into an engaging-head-portion-fitting hole 132a of an anvil 132 in the manner shown in FIG. 15, thereby being brought the anvil 132 into contact with the flange portion 12a" of the base portion 12a' of the male fastening member 12. Thereafter, a conical projecting portion 133a of a horn 133 is inserted into the central blind hole in the end surface of the base portion 12a' as shown in FIG. 16 so as to oscillate ultrasonic wave, thereby deforming the base portion 12a'. Further, a boundary surface between the inner peripheral surface of the opening portion 10a of the base member 10 and an outer peripheral surface of the base portion 12a' is melted, so that both of them are integrated by welding.

Here, though it is omitted here, in addition to the mounting method mentioned above, it is possible to previously form the male fastening member 12 formed in such a shape to fit a shape of the base portion 12a into the opening portion 10a of the base member 10, and then to weld and integrate the boundary surface portion of the both by a high frequency. Or, the base portion 12a of the male fastening member 12 may be inserted into the opening portion 10a after an adhesive is applied to the peripheral surface of the base portion 12a of the male fastening member 12 or the inner peripheral surface of the opening portion 10a on the base member 10, thereby bonding and integrating by the adhesive.

Figure 17:
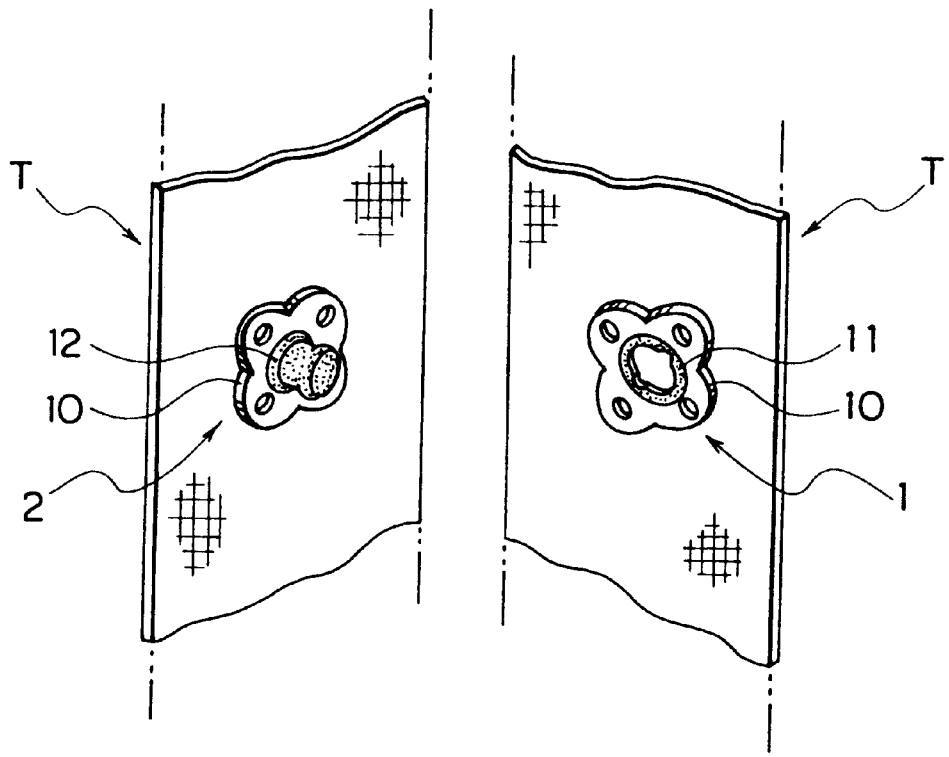
FIG. 17 is a fragmentary perspective view showing an example of female and male fasteners with tape in which a first member and a second member in accordance with the present invention are set in different colors and an elastic material is used for the second member.
Figure 18:
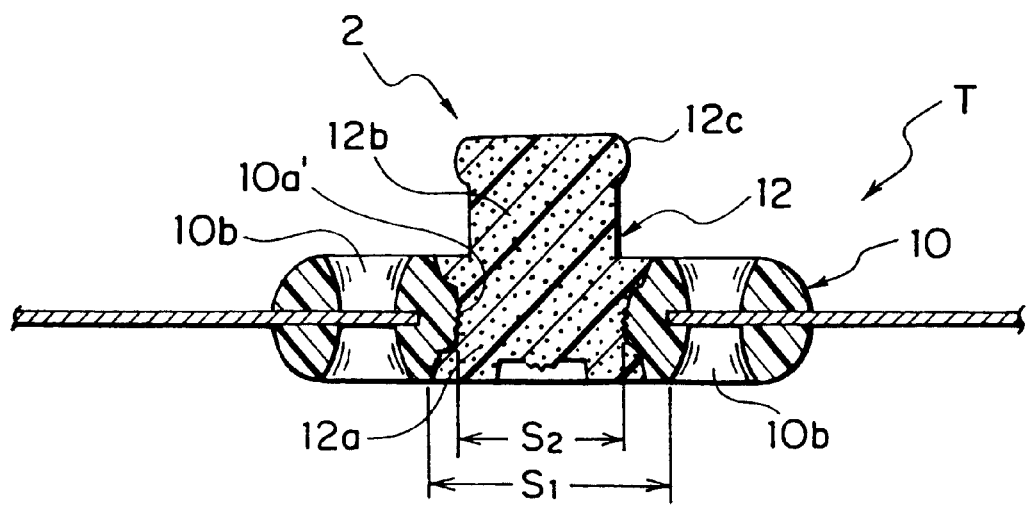
FIG. 18 is a cross sectional view of the male fastener to which a second member having an elasticity is attached.
Figure 19:
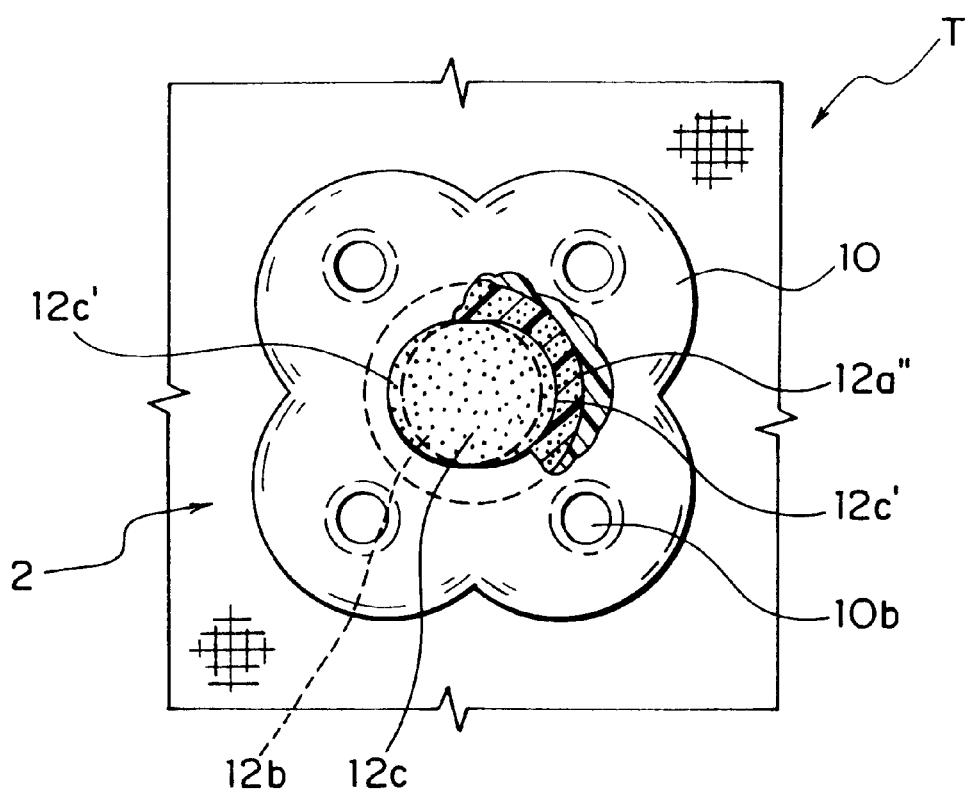
FIG. 19 is a plan view of the male fastener which is shown by partly cut.

FIGS. 17 to 19 show an embodiment of molding and integrating the first member and the second member with different materials in accordance with the present invention. In FIG. 17, materials of both of the base member 10 as the first member and the female and male fastening members 11 and 12 as the second member are differentiated, and colors of the base member 10 and the female and male fastening members 11 and 12 are also differentiated. That is, normal thermoplastic synthetic resin is used for the base member 10, while elastomer resin material having elasticity is used for each of the female fastening member 11 and the male fastening member 12. Further, a pigment having a different color or the like are mixed in the synthetic resin material of each of the base member 10, the female fastening member 11 and the male fastening member 12. In this example, the female fastening member 11 is formed in a ring shape in the same manner as the female fastening member as mentioned above, and has on the inner peripheral surface an engaging surface to be engaged with the opposing male fastening member 12.

A shape of the male fastening member 12 is different from the shape mentioned above. That is, as shown in FIGS. 18 and 19, a split groove 12d is not formed in the column portion 12b and the engaging head portion 12c standing from the base portion 12a. Accordingly, the female and male fasteners 1 and 2 in accordance with the embodiment are elastically engaged and disengaged with each other. When the split grove 12d is not provided in the column portion 12b and the engaging head portion 12c, the fastener is not caught in a thread or a hair at the time of its engaging and disengaging, so that a smooth engaging and disengaging can be performed.

In this case, since the male fastening member 12 is soft and has elasticity as mentioned above, its connection with the inner peripheral surface 10a' of the central opening portion 10a of the base member 10 becomes unstable in the engaging and disengaging operation between both female and male fasteners 1 and 2. In this case, as shown in FIG. 19, an unstable connection between the base member 10 and the male fastening member 12 can be prevented by setting a total area of bulging portions 12' in plan view each existing respectively at the right and left portions of the male engaging head portion 10c which engages with and disengages from the female fastener 1, at a predetermined size. That is, the total area of the bulging portions 12' is set to be smaller than a difference between a total area, in plan view, of a diametrically enlarged portion of the base portion 12a of the male fastening member 12, i.e. the largest area $S_1$, and an area $S_2$, in plan view, of a narrowed portion of the male fastening member 12 because of the existence of the inner peripheral surface 10a' of the central opening portion 10a of the base member 10, as shown in FIG. 18.

Further, though its illustration is omitted, in accordance with the present invention, it is possible to use material which is soft and has elasticity for the first member, in which case, its fit with the tape can be improved particularly when the tape has flexibility.

Figure 20A:
FIGS. 20A through 20D are explanatory views for a process of manufacturing female and male fasteners having a first member integrally molded with respect to a tape in accordance with another embodiment of the present invention.
Figure 20B:
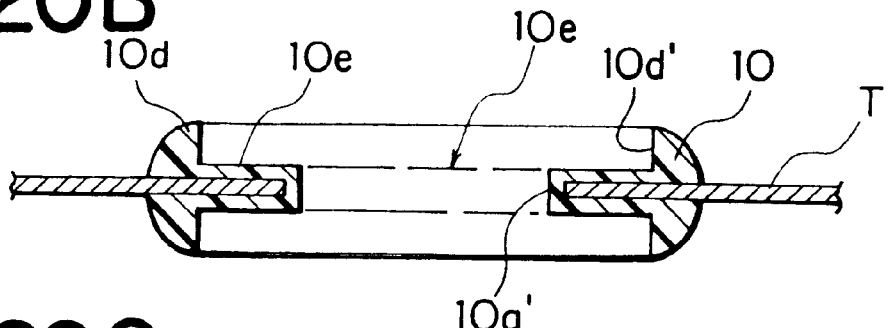

FIGS. 20A to 20D show an embodiment in which a first member as a ring-like base member 10 is a molded product for applying a rigidity sufficient to restrict corrugation in the peripheral edge of the attachment hole, which is most easily corrugated, to a minimum degree at the time of molding and integrating the second member. In accordance with this embodiment, as shown in FIG. 20B, the outer peripheral portion of the ring-like base member 10 is made thick and the portion extending from the outer peripheral portion to the central opening portion is formed thin. The thick portion 10d formed in the outer peripheral portion constitutes an outer edge portion of the fasteners 1 and 2 as a final product, and the thin portion 10e extending from the outer peripheral portion to the central opening portion becomes a frame member buried within a second member at the next process.

Figure 20C:
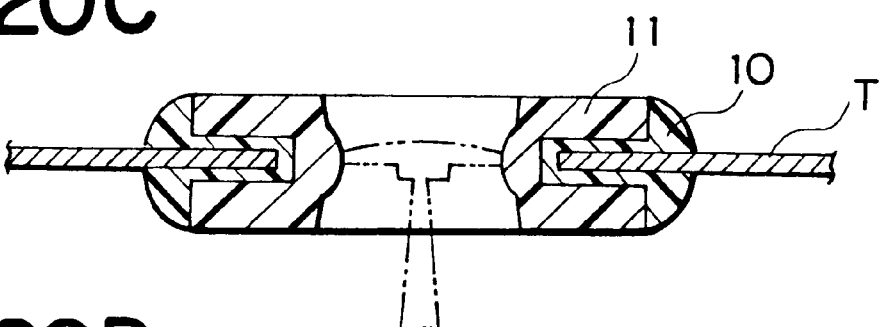
Figure 20D:
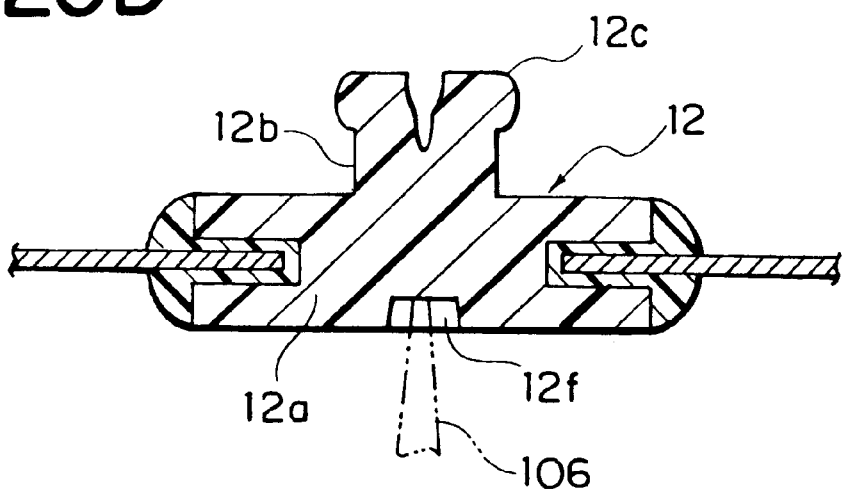

FIG. 20C shows an embodiment of the female fastener 1 in which the female fastening member 11 as a second member is integrally formed on the peripheral surface 10a' of the opening portion of the base member 10 formed and integrated with the tape T, the front and back surfaces of the thin portion 10e and the inner peripheral surface of the front and back thick portions 10d, and FIG. 20D shows an embodiment of the male fastener 2 molded and integrated in a state that the male fastening member 12 as a second member is fitted to and molded integrally with the peripheral surface 10a' of the opening portion in the base member 10 formed and integrated on the tape T, the front and back surfaces of the thin portion 10e and the inner peripheral surface of the front and back thick portions 10d. In order to manufacture this fastening device with tape, at first, as shown in FIG. 20A, the attachment hole 3 is previously formed on the tape T and the base member 10 having a shape as mentioned above is integrally formed on the tape T (see FIG. 20B).

In this molding, unlike the embodiment as mentioned it is not necessary to protrude the tape support pins within the base-member-molding cavity and direct the gate to the peripheral edge of the attachment hole 3 in parallel to the tape T. This is because the male fastening member 12 is molded and integrated so as to surround all the surface of the thin portion 10e at the next process even if a part of the tape T is exposed on one of the front and the back of the thin portion 10e. Of course, in the same manner as the embodiment mentioned above, it is possible to direct the gate position to the peripheral edge of the attachment hole 3 in parallel to the tape T. In this case, since the attachment hole 3 of the tape T properly becomes corrugated within the base member 10, the strength of adhesion with the base member 10 is secured, which is preferable.

In this manner, after the base member 10 is integrated with the peripheral edge portion of the attachment hole 3 in the tape T by molding, the female or male fastening member 11 or 12 as a second member is molded and integrated in a range from the inner peripheral surface 10a' of the central opening portion 10a of the base member 10 to an inner peripheral surface 10d' of the thick portion 10d in the same manner as mentioned above. As a result, the product shown in FIGS. 20C and 20D can be obtained. At the time of molding the female fastening member 11, in the same manner as the case of forming the base member 10 in the previous embodiment, it is possible to introduce molten resin material into the female-fastening-member-molding cavity from the gate, which is directed from the center of the base member 10 to a middle of the peripheral surface of the opening portion as shown by an imaginary line in FIG. 20C.

Further, at the time of molding the male fastening member 12, it is desirable to set the cavity for forming the male fastening member 12 to be a shape in which a deep recessed notch portion 12f is formed at the center portion of an end surface of a base portion 12a of the male fastening member 12, and dispose a gate 106 at a center of the recessed notch portion 12f, as shown by the imaginary line in FIG. 20D.

In the embodiment mentioned above, though the first member and the second member are integrally mounted in order to manufacture the fastening device with tape in accordance with the present invention, the present invention may be such a structure that an intermediate member is additionally interposed between the first and second members. The intermediate member is not limited to a case of being constituted by a single layer as mentioned below, but can be constituted by a plurality of layers.

Figure 21A:
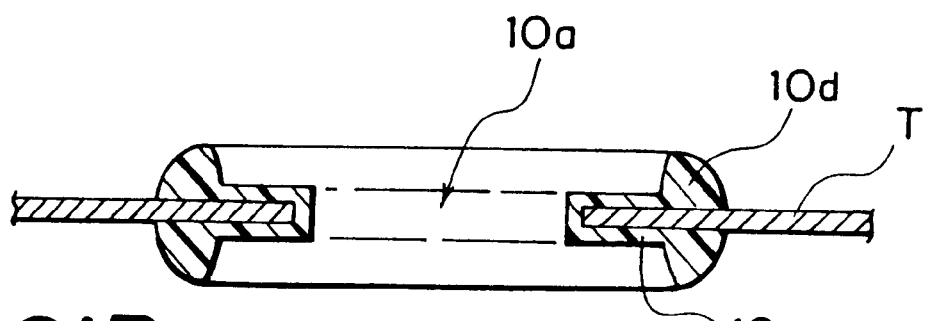
FIGS. 21A and 21B are explanatory views for a process of manufacturing a male fastener in which an intermediate member is to be interposed between a first member and a second member.
Figure 21B:
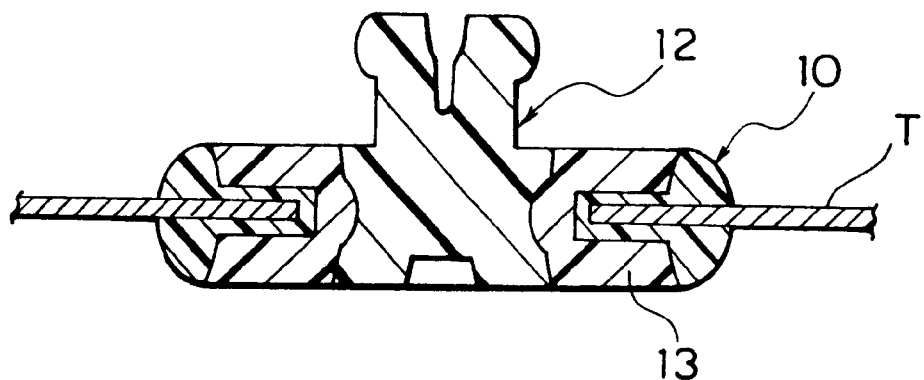

FIGS. 21A and 21B show an embodiment in which an intermediate member 13 is composed of one layer. In accordance with this embodiment, in the same manner as the embodiment as mentioned above, a ring-like base member 10 having a thick portion 10d and a thin portion 10e is integrally molded to the peripheral edge portion of the attachment hole 3 previously formed in the tape T. In the mold at this time, likewise the embodiment as mentioned above, the tape support pins are not arranged within the cavity. Further, the thin portion 10e of the base member 10 may only have a minimum thickness enough to secure such rigidity that an peripheral edge portion of the attachment hole in the tape T after molded does not largely corrugate due to the pressure of the molten resin introduced into the cavity at the time of molding the intermediate member 13. Thus, it is sufficient to make a cavity space only enough to perform the molding on the front and back surfaces of the tape T with the thin portion 10e being in said minimum thickness.

Likewise the embodiment as mentioned above, since the base member 10 as the first member is provided as a molded product for applying a rigidity sufficient to restrict the corrugation in the peripheral edge portion of the attachment hole, which is most easy to become corrugated on the tape T, not only the intermediate member 13 is easy to be molded, but also different colors can be applied to the base member 10 as the first member, the intermediate member 13 and the male fastening member 12 as the second member. Further, though its illustration is omitted, in a case of molding the intermediate member 13 smaller toward the outer peripheral thick portion 10d and molding the female fastening member as the second member near a central opening portion of the intermediate member 13 thus molded, it is possible to apply various colors to the single fastener 1 or 2, whether it is female or male, by applying the different colors to the intermediate member and the female fastening member as the second members.

Figure 22:
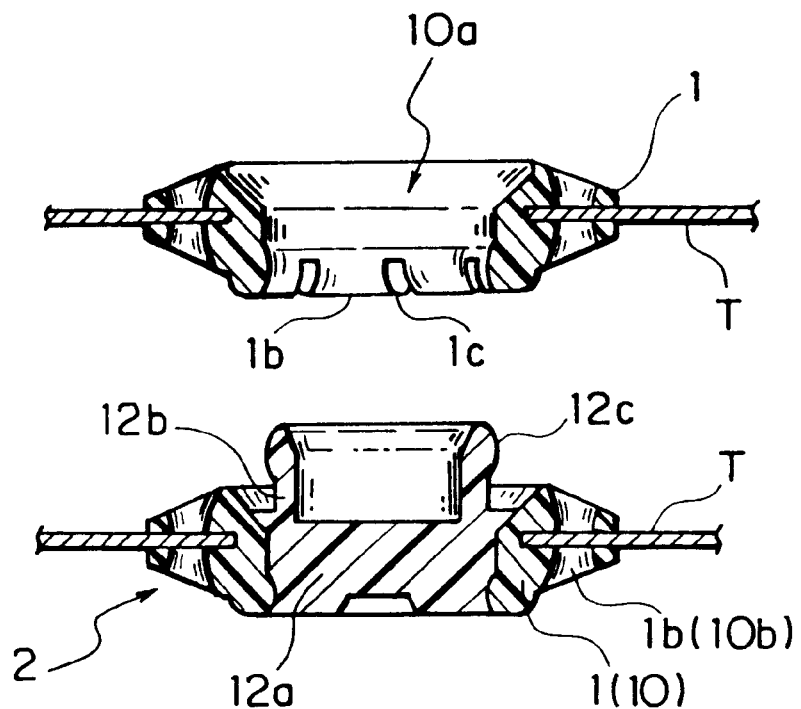
FIG. 22 is a cross sectional view showing another embodiment of female and male fasteners with tapes in accordance with the present invention.
Figure 23:
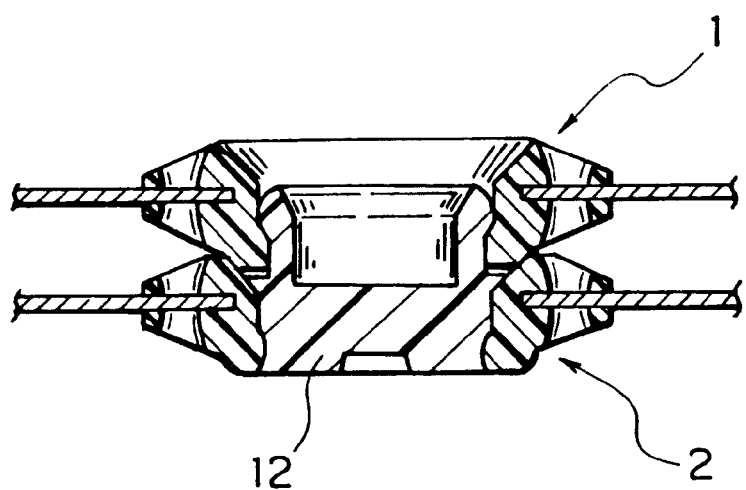
FIG. 23 is a cross sectional view showing an engaging state of the female and male fasteners.

FIGS. 22 to 24 show an embodiment of an fastener with tape having another engaging structure in accordance with the present invention. The female fastener 1 of the fastening device with tape in accordance with this embodiment can commonly serve as a first member of the present invention, likewise the embodiment as shown in FIG. 2.

In the illustrated embodiment, in a central opening portion 10a of the female fastener 1 (the base member 10), there is provided an engaging portion 1b to be engaged with and disengaged from an opposing male fastener 2 along one inner peripheral edge on one of the front and back sides of the central opening portion 10a. The engaging and disengaging portion 1b bulges out from the inner peripheral surface 10a' and toward the central direction of the central opening portion 10a, and has a plurality of notch portion 1c arranged at a predetermined interval in a peripheral direction thereof. Since the engaging portion 1b slightly deforms in an elastic manner in a radial direction because of the existence of the notch portion 1c, its engagement and disengagement with respect to an opposing engaging head portion 12c as mentioned below can be smoothly performed.

On the other hand, the opposing male fastener 2 is molded on a first member which is identical with the female fastener 1 in accordance with the present invention. That is, as is apparent from FIG. 22, the male fastening member 12 is integrally molded with the central opening portion 10a of the first member which can be a female fastener 1 in accordance with the method mentioned above. In this molding, since a part of the male fastening member 12 enters into notch portions 1c formed as mentioned above in the female fastener 1 so as to be integrated therewith, a strength of adhesion between the first member and the male fastening member 12 as the second member is increased. As a result, a desired strength of adhesion can be obtained, for example, even between the resins having small affinity.

Since the notch portions 1c are formed in the opening portion 10a of the female fastening member 11 as mentioned above so as to make it possible to elastically deform at the opening portion 1a of the female fastening member 11 in a diametrical direction thereof, a column portion 12b and the engaging head portion 12c of the male fastening member 12 may only be formed in a hollowed cylindrical shape with the engaging head portion 12c bulging outward, as shown in FIG. 22. Thus, even though a split groove 12d is not formed in the male fastening member 12 as previously mentioned, an engagement and disengagement between the female fastener 1 and the male fastener 2 can be smooth, while an engaging and disengaging force sufficient to be durable in a practical use can be secured. Further, since no split groove is formed, any thread or hair is not caught at a time of engaging and disengaging the fasteners.

Figure 25A:
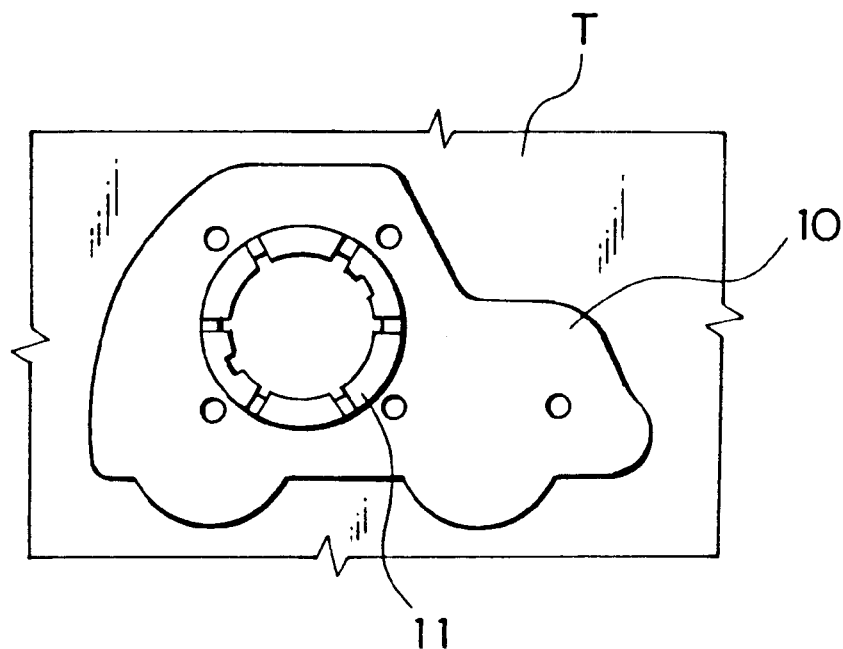
FIGS. 25A and 25B are plan views showing another example of shapes of female and male fasteners.
Figure 25B:
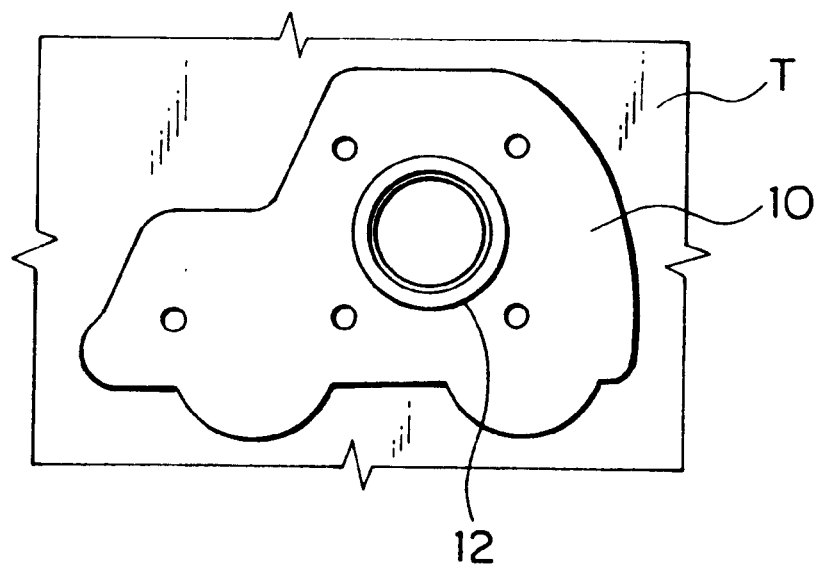

FIG. 25 shows a shape of the first member (the base member 10) of the fastening device with tape, as an article, decoratively designed in accordance with the present invention. In the illustrated embodiment, though an automotive vehicle is exemplified as a shape of the article, it should not be limited to this. In accordance with the present embodiment, FIGS. 25A and 25B show a fastener with tape having an fastener 1 or 2 obtained by the embodiment mentioned above as shown in FIGS. 22 and 23. The female and male fasteners 1 and 2 designed in this manner are particularly preferable to the clothes or bags for babies.

Figure 26:
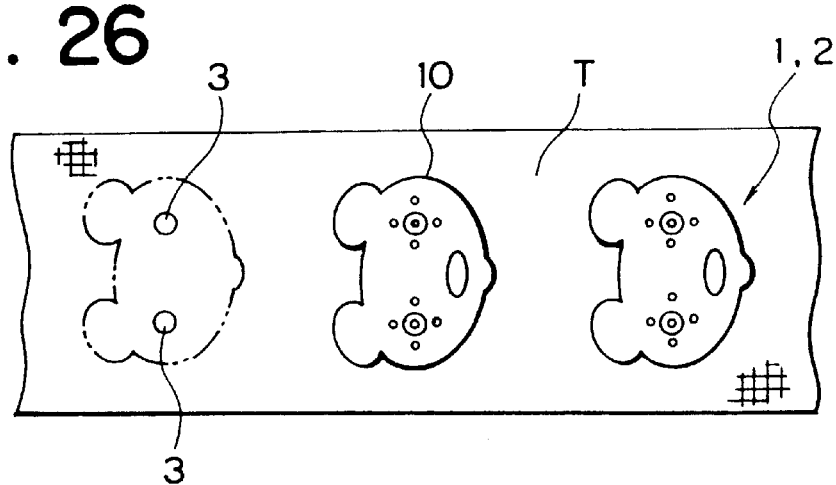
FIG. 26 is a plan view showing another example of a shape of a fastening device in accordance with the present invention.
Figure 27:
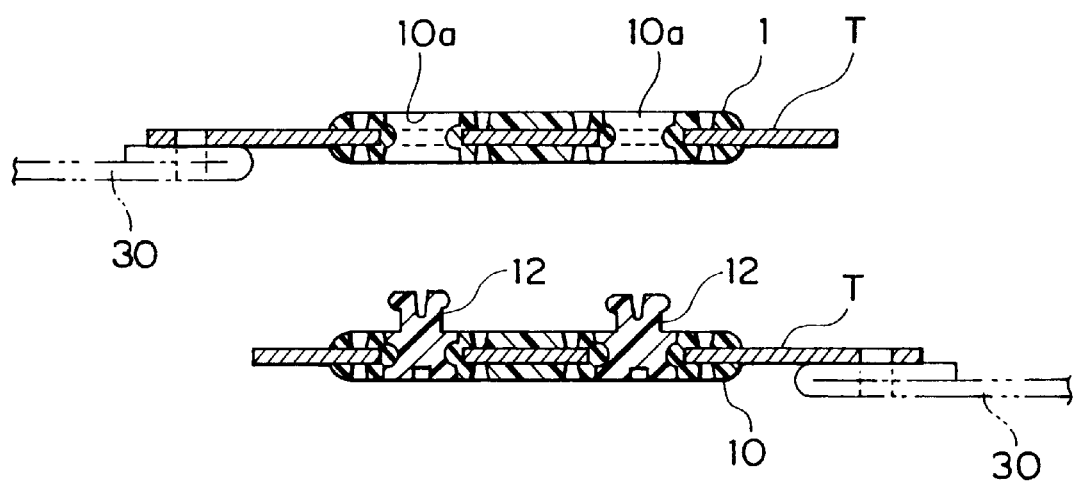
FIG. 27 is a cross sectional view showing an inner structure of the female and male fasteners.
Figure 28:
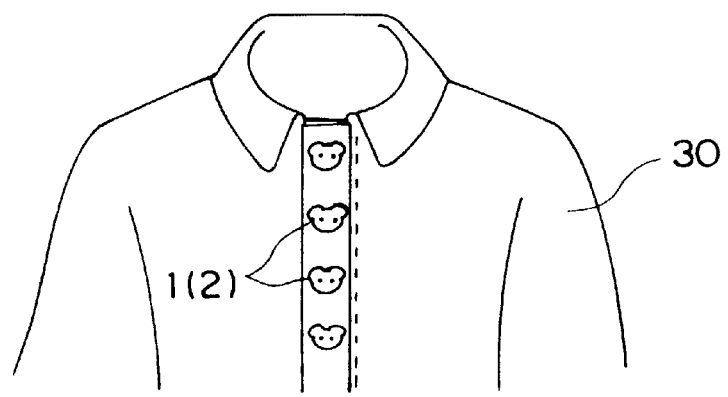
FIG. 28 is a fragmentary front view showing an example of clothes to which the fastening device is mounted.

In these drawings, the female and male fasteners 1 and 2 to be engaged and disengaged with each other are respectively mounted to the same first members 10. However, the present invention may include such a case that two or more female and/or male fasteners 1 and 2 are respectively mounted to the same first members. FIGS. 26 to 28 show the case of mounting two or more female or male fasteners 1 and 2 to the first members designed in the same decorative shapes. In accordance with this example, each article is decoratively designed to be a face of a bear, and this device can be mounted to front open portions of the clothes 30 for babies as shown in FIG. 28. In this case, since each of the female and male fasteners 1 and 2 can be engaged at two positions as shown in FIG. 27, a strength of adhesion sufficiently to be durable in a active motion of the baby can be achieved.

In the illustrated embodiment, a plurality of attachment holes 3 are formed on the same tape T in a longitudinal direction thereof at a predetermined interval and are arranged in two rows in parallel in a widthwise direction of the tape T. Then a single first member 10 which is designed in the face of a bear is integrally molded on the tape T in such a manner that the attachment holes 3 adjacent in a widthwise direction of the tape correspond to right and left eyes of a bear. After finishing the molding of the first member 10, the female or male fastening members 11 or 12 is integrally molded with opening portions 10*a* corresponding to the right and left eyes. At this time, a remarkably decorative fastener can be obtained by mixing pigment or the like in the resin material for the fastening members 11 or 12 and molding with colors different from that of the resin material of the first member 10.

Figure 29:
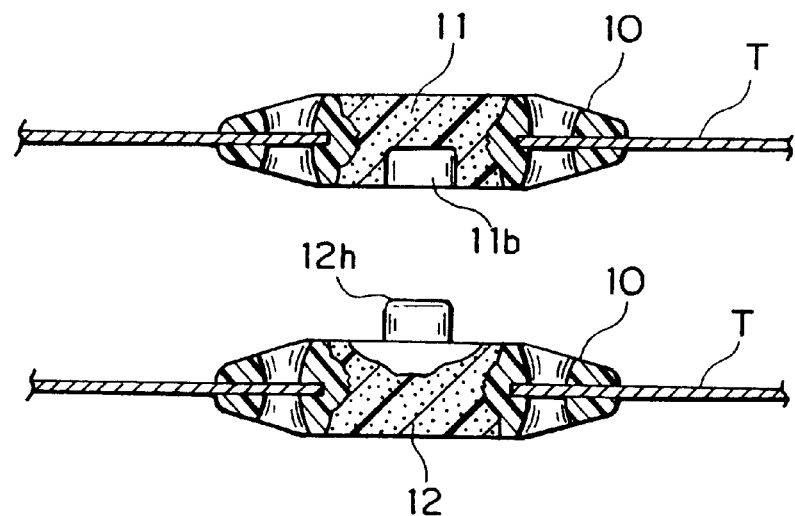
FIG. 29 is a cross sectional view of female and male fasteners using a magnetic material for a second member of the present invention.
Figure 30:
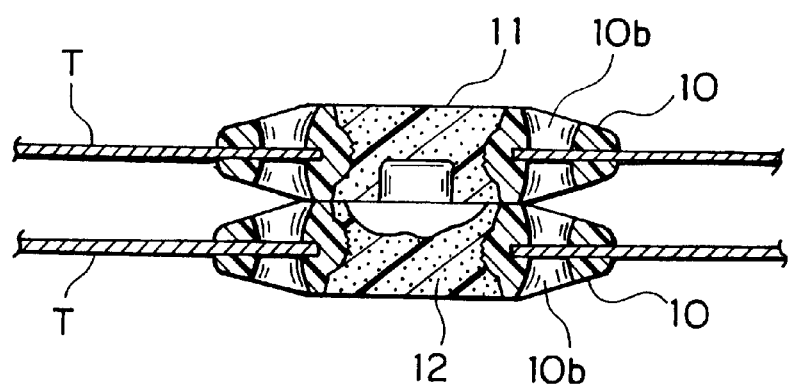
FIG. 30 is a cross sectional view showing an engaging state of the fasteners.

FIGS. 29 and 30 show an embodiment in which resin material having magnetism are used for both of the female and male fastening members 11 and 12 so that the female and male fasteners 1 and 2 can be engaged and disengaged by a magnetic force. Specifically, powder of ferrite magnet are mixed in the resin material for each of the female and male fastening members 11 and 12, which are respectively molded and integrated with a central opening portion 10*a* of the base member 10 as a first member. This can be achieved by only setting an engaging portion 11*b* of the female fastening member 11 to be a recessed notch portion formed in a simple circular cross sectional shape, and an engaging portion 12*h* of the male fastening member 12 in a cylindrical shape to be fitted to the female engaging and disengaging portion 11*b*.

Figure 31:
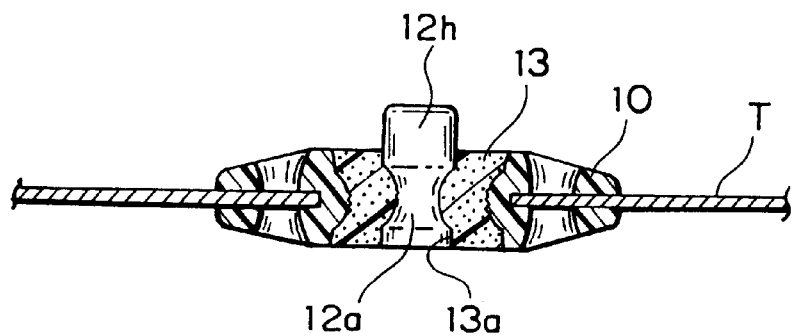
FIG. 31 is a cross sectional view of a male fastener in which an intermediate member interposed between the first member and the second member is made of a magnetic material.

Further, FIG. 31 shows an embodiment which also utilizes a magnetic force for an engaging and disengaging force of the female and male fasteners 1 and 2. In this embodiment, an intermediate member 13 is interposed between the male fastening member 12 and the base member 10. The intermediate member 13 is made of resin in which powder of the ferrite magnet are mixed, and has a ring-like shape having an opening portion 13*a* at its center, which is integrally molded with an opening portion 10*a* of the base member 10 in the same manner as that of the embodiment mentioned above. Next, the male fastening member 12 is integrally molded with the opening portion 13*a* of the intermediate member 13, thus a male fastening device with tape is completed. The male fastening member 12 is narrowed at its base portion 12*a* and has a simple cylindrical engaging 12*h*, with no engaging head portion bulging at its periphery, standing from the intermediate member 13 so as to be molded and integrated therewith. In accordance with this embodiment, a plurality of colors can be applied to a single male fastener 2 by mixing pigment having different colors in the resin materials for, particularly the first member (the base member) 10 and the intermediate member 13.

Figure 32A:
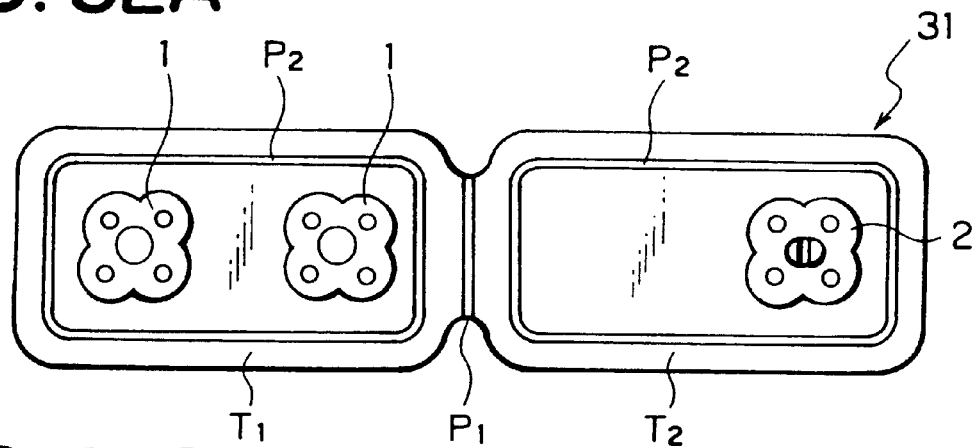
FIG. 32 is a view showing an example of a structure of a female fastener button constituting a fastening device with tape in accordance with the present invention.
Figure 32B:
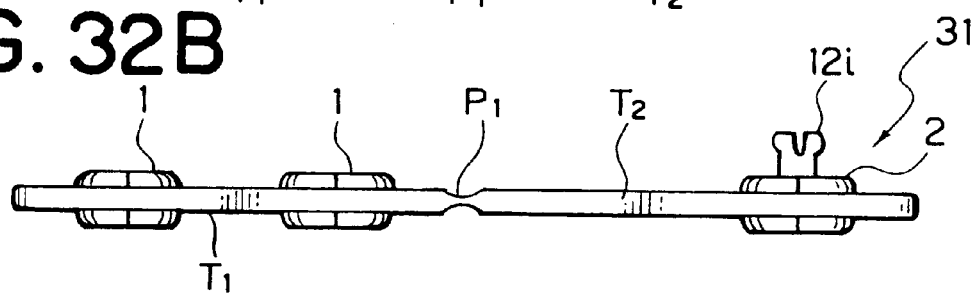
Figure 33:
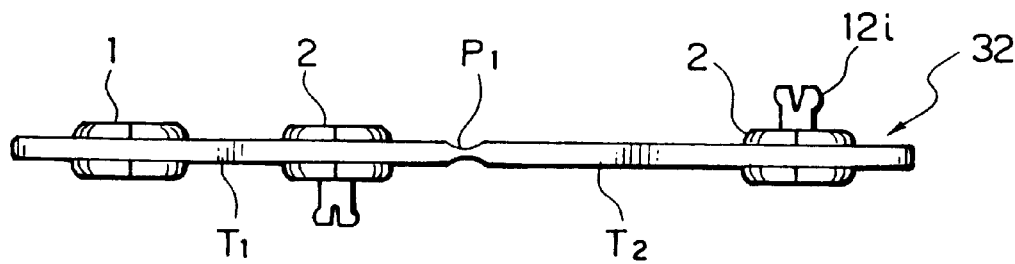
FIG. 33 is a side view of a male fastener button.

FIGS. 32 and 33 shows a case that an fastening device with tape in accordance with this invention is provided with a structure which can be freely attached to and detached from the clothes so that the tape T with device is used a single female or male button fastener 31 or 32. In the embodiment shown in FIG. 32, the fastener with tape is a female button fastener 31, in which the tape T made of natural or synthetic leather is formed in a rectangular shape. A press line P1 is formed so as to make an intermediate portion of the tape T in a longitudinal direction foldable, and a rectangular press line P2 is formed along an peripheral edge of each of left and right small pieces T1 and T2 defined by the press line P1. It is not necessary that a shape of the rectangular press line P2 is formed in a rectangular shape. Alternatively, an optional pattern can be formed by the press line P2. Then, two female fastener 1 are mounted to one of the left and right small pieces T1 and T2, and a male fastener 2 is integrally mounted to an other end portion of the other.

On the other hand, FIG. 33 shows a case that the fastener with tape is a male button fastener 32, the tape T is molded of natural or synthetic leather formed in a rectangular shape, a press line P1 is formed so as to make an intermediate portion of the tape T in a longitudinal direction foldable while a rectangular press line P2 is formed along a peripheral edge of left and right small pieces T1 and T2 defined by the press line P1, in the same manner as the female button fastener. Then, one female fastener 1 and one male fastener 2 can be respectively integrally mounted to one of the left and right small pieces T1 and T2, and one male fastener 2 is integrally mounted to an end portion of the other small piece.

Figure 34:
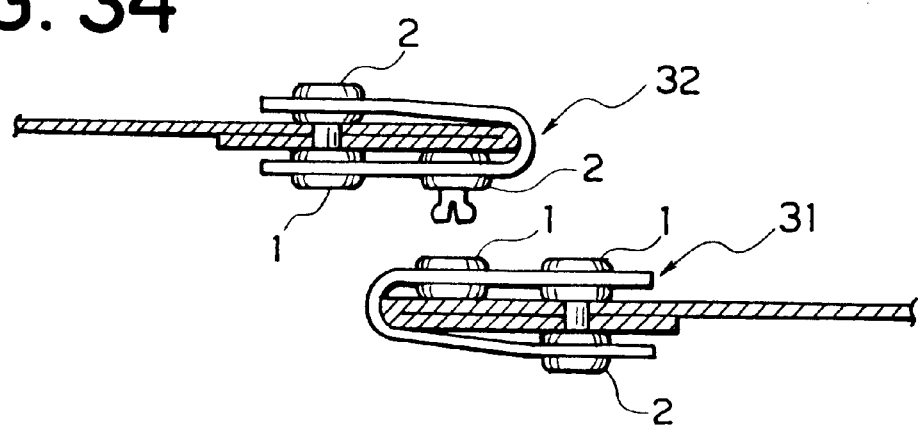
FIG. 34 is a cross sectional view showing a manner in which the fastener button is used.
Figure 35:
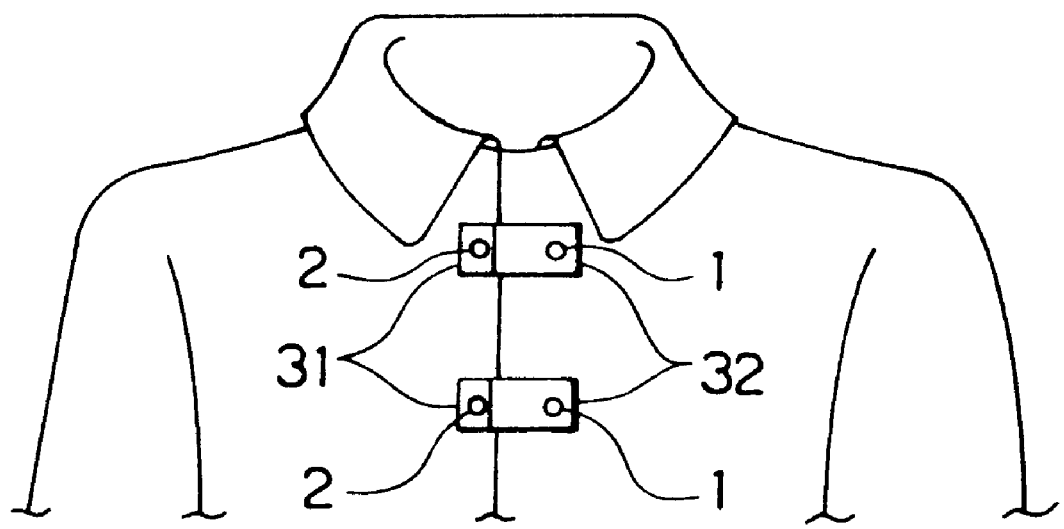
FIG. 35 is a fragmentary front view of the clothes to which the fastener button is mounted.

FIGS. 34 and 35 show a manner in which each of the female and male button fasteners 31 and 32 are attached clothes or the like, and each of the button fasteners 31 and 32 is used as a fastener device for the clothes. Now, in a case that the female or male button fasteners 31 or 32 is attached to the clothes or the like, an insertion hole through which an engaging portion 12*i* of the male fastening member 12 is to be inserted is previously formed in the button-fastener-attachment portion of the clothes or the like. When the female button fastener 31 shown in FIG. 32 is attached to the button-fastener-attachment portion for the clothes or the like, the female button fastener 31 is folded along the press line P1 as a folding line, and the engaging portion 12*i* of the male fastener 2 mounted to the end portion of the female button fastener 31 is inserted into the insertion hole so as to be engaged with a corresponding female fastener 1. When the female button fastener 31 is attached in this manner, one of two female fasteners 1 attached in parallel is exposed on one of opposite joining portions of a front opening portion of the clothes. This female fastener 1 serves as a female button fastener.

On the other hand, when the male button fastener 32 is attached to a portion of the clothes opposing to the female button fastener 31, the male button fastener 32 is folded along the press line P1 as a folding line, and the engaging portion 12*i* of the male fastener 2 mounted to the end portion of the male button fastener 32 is inserted into the insertion hole of the clothes, so as to be engaged with the corresponding female fastener 1, in the same manner as that of the female button fastener mentioned above. As a result, one of the male fasteners 2 is exposed on the other of the opposite joining portions of the front opening of the clothes. This male fastener 2 serves as a male button fastener. FIG. 35 shows a state of engaging the male fastener 2 of the male button fastener 32 with the female fastener 1 of the corresponding female button fastener 31, respectively attached to the opposite joing portions of the front open portion of the clothes. When the female and male button fasteners 31 and 32 are removed from the clothes, it is sufficient to remove the female and male fasteners 1 and 2 engaged with each of the button fasteners 31 and 32. As mentioned above, in accordance with the embodiment, it is possible to exchange the male and female button fasteners 31 and 32 for one' taste or against its breakage.

Then, as is understood from FIGS. 32 and 33, it is possible to easily attach the female and male fasteners 1 and 2 on the same tape in an optional arrangement, in such a manner as that the engaging portion 12*i* of the male fastener 2 protrude from the front and back surfaces of the tape T. That is, in the fastening device with tape in accordance with the present invention, if the base member 10 as a first member is molded so as to have a function of a female fastener 1, it is possible to integrally mold the base members 10 on the tape T at the same pitch in a longitudinal direction of the tape T, so that the female fasteners 1 as base members 10 can be optionally molded at their opening portions 10*a* with the male fastening members 12 as second members or the female fastening members 11 further having another engaging portions. Such options can be made possible only by the present invention.

Figure 36A:
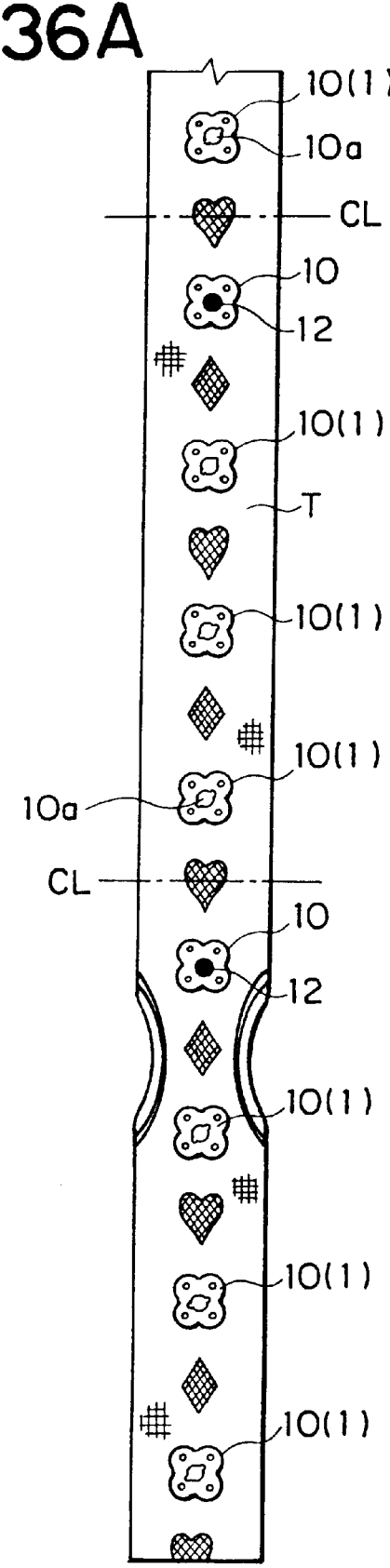
FIG. 36 is an explanatory view for a process of manufacturing an adhesive tape with respect to various kinds of articles by the fastening device with tape in accordance with the present invention.
Figure 36B:
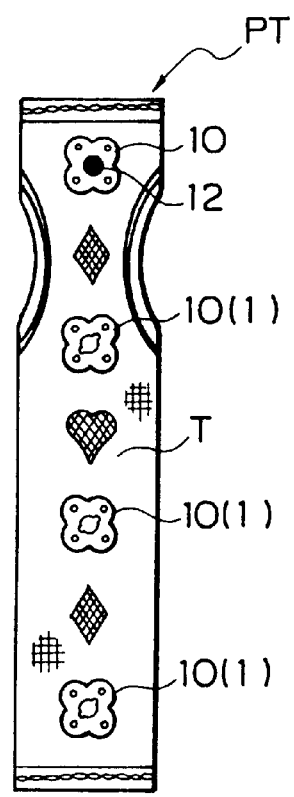
Figure 37:
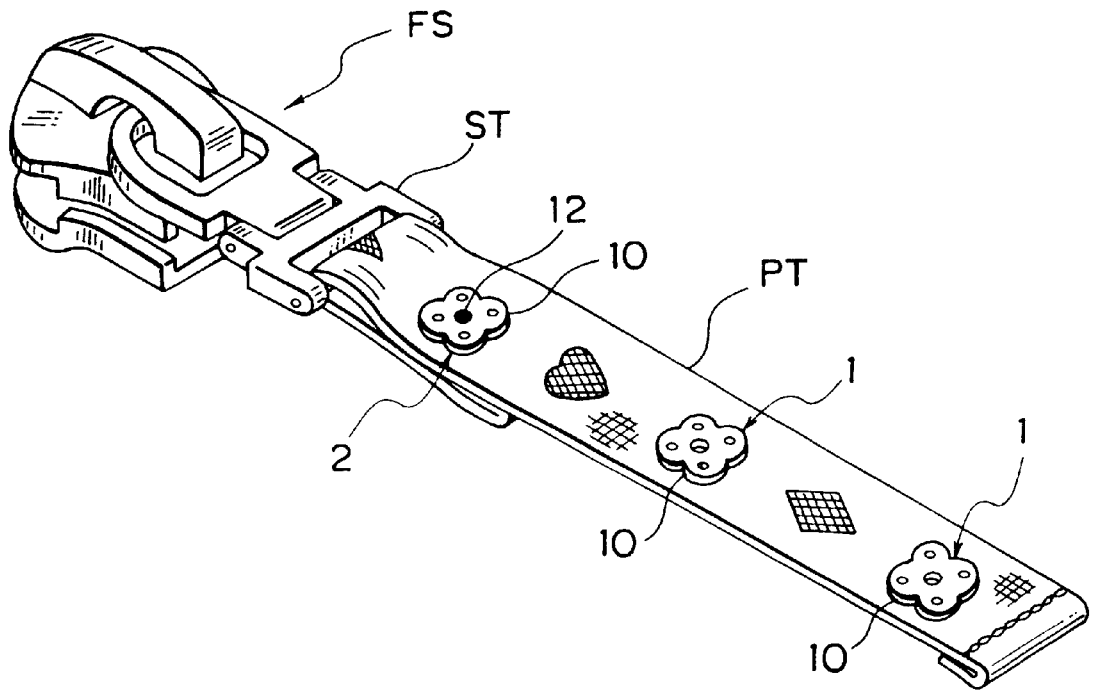
FIG. 37 is a perspective view of a slider for slide fastener in which the tape is used as a pull for the slider.
Figure 38:
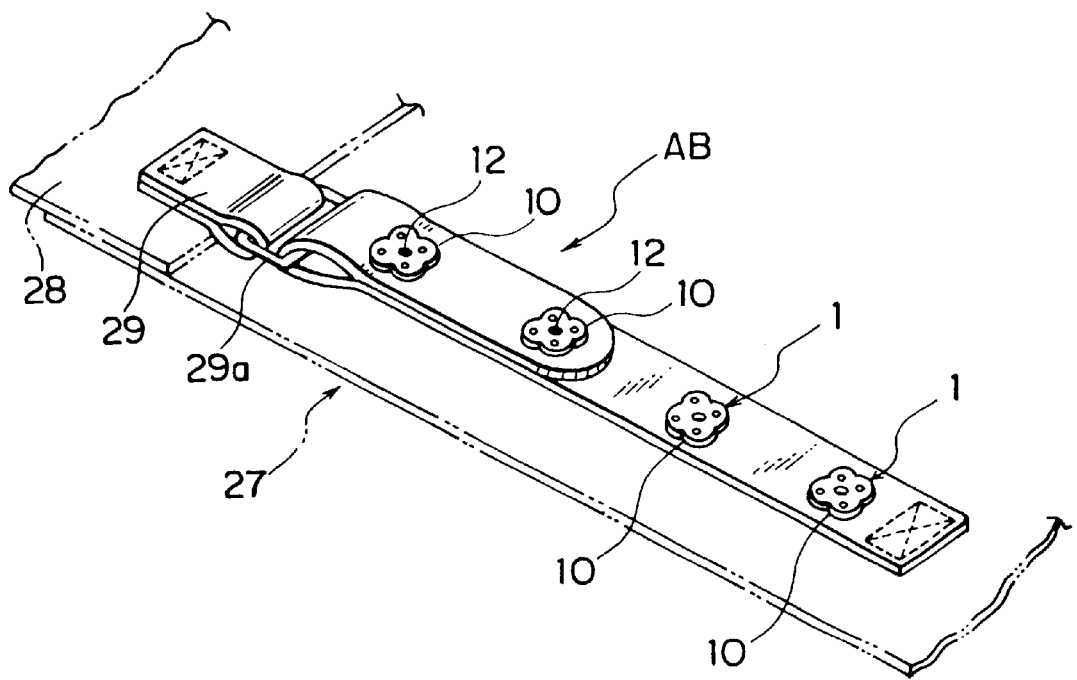
FIG. 38 is a perspective view showing a manner in which the tape is used as a longitudinally adjustable fastening band for various kinds of bags.

FIGS. 36 and 37 shows an example in which the fastening device with tape in accordance with the present invention is used as a pull of a slider of a slide fastener, and FIG. 38 shows an example in which the fastening device with tape in accordance with the present invention is used a freely-adjustable fastening band AB to be used for bags. These examples indicate that the fastening device with tape in accordance with the present invention can be manufactured efficiently for various uses, as in the same manner as shown in FIGS. 32 and 33. In this case, though its illustration is omitted, the fastening device with tape having a shape shown in FIG. 36 can be also used as a hanging device for a bag or the like, for example, when being attached to a hand portion of the bags in the same manner as a pull for the slider.

Specifically, when a pull PT for a slider of a slide fastener as shown in FIG. 36 is manufactured with a fastening device with tape in accordance with the present invention, at first the base members 10 as first members are integrally molded at all of a plurality of attachment holes formed in the long-sized tape T at a predetermined pitch, and thereafter, a male fastening member 12 is integrally molded to an opening portion 10*a* of one base member 10 in the end portion side among a desired number (four in the illustrated embodiment) of base members 10. The fastener with the long-sized tape manufactured in the above manner is cut along a cutting line CL as shown by an imaginary line in FIG. 36A. Prior to this cutting, as shown in FIG. 36A, it is possible to previously apply a thermal treatment to a tape portion between the male fastener 2 in the end portion side and a female fastener 1 adjacent thereto so as to contract a width of the tape portion. Then, a treatment such as sewing or the like is applied to the cut end portion so as to obtain a tape having a shape as shown in FIG. 36B.

The end portion of the tape T to which the male fastener 2 of the tape T is attached is inserted into a pull ring ST of a slider FS so as to be folded back, and the male fastener 2 is engaged with the opposing female fastener 1 so as to form a handle PT, as shown in FIG. 37.

FIG. 38 shows an example in which the fastening device with tape in accordance with the present invention is applied as a fastening band AB which is freely adjustable for fixedly closing an opening portion of a main body of a bag or the like with its opening and closing cover. Specifically, an end of the tape T with a male fastener 2 manufactured in the same manner as the example as mentioned above is attached the bag main body 27 by sewing or the like. An end portion of a band 29 having a connection ring 29*a* at one end thereof is attached to an opening and closing top cover 28 of the opening portion of the bag main body 27 by sewing or the like. When closing the opening portion of the bag main body 27 with the opening and closing top cover 28, a free end of the tape T is inserted into the connection ring 29*a* at a side of the opening and closing top cover 28 so as to be folded back, and the male fastener 2 in the end portion of the tape T is engaged with a corresponding female fastener 1 attached to the tape T. Since a plurality of female fasteners 1 are attached on the tape T, it is possible to engage the male fastener 2 with an optional one of the female fasteners 1 depending on an amount of the contents received in the bag.

FIG. 39 shows rompers 33 to which the fastening device with tape in accordance with the present invention is applied. The rompers 33 has a front body and a leg portion which are continuously opened and closed in a range from a neck portion to right and left knee portions thereof as shown in the drawing. In general, the male and female snap fasteners are attached along the front open portion thereof so as to join the right and left portions. Each interval between the snap fasteners is frequently changed in accordance with their mounting portions, and in most cases, an arrangement of the male and female fasteners is not uniform.

Since the fastening device with tape in accordance with the present invention is structured, as mentioned above, such that not only the kinds of the fasteners 1 and 2 but also their arrangement order and arrangement interval can be optionally set, the rompers 33 excellent in use can be obtained. FIG. 40A shows an example of an fastener Ta with tape in which the female fasteners 1 and the male fasteners 2 are arranged on the same tape and are divided into groups in a longitudinal direction thereof, one of the intervals being made different. FIG. 40B shows an example of a fastener Tb with tape in which the male fasteners 2 all of which are the same kind on the are arranged on the same tape at the same arrangement interval as mentioned above. FIG. 40C shows an example of an fastener with tape in which the female fasteners 1 all of which are the same kind are arranged on the same tape at the arrangement interval as mentioned above. These fasteners Ta to Tc with tapes are excellent in engaging and disengaging operation as when they are attached along the front open portion of the rompers 33 as shown in FIG. 39 and can constitute an engaging and disengaging portion gentle for a sensitive skin of babies.

Figure 41A:
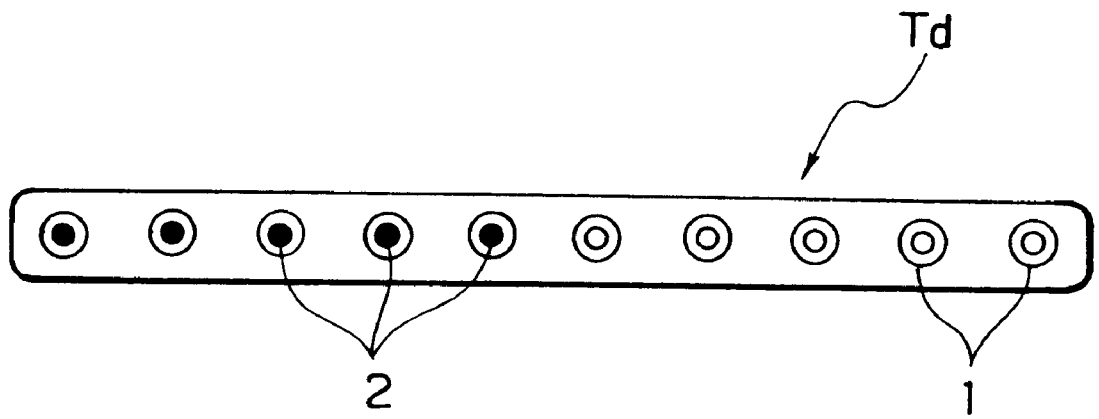
FIGS. 41A and 41B are explanatory views showing another example of the fastening device with tape in accordance with the present invention when applied to the rompers.
Figure 41B:
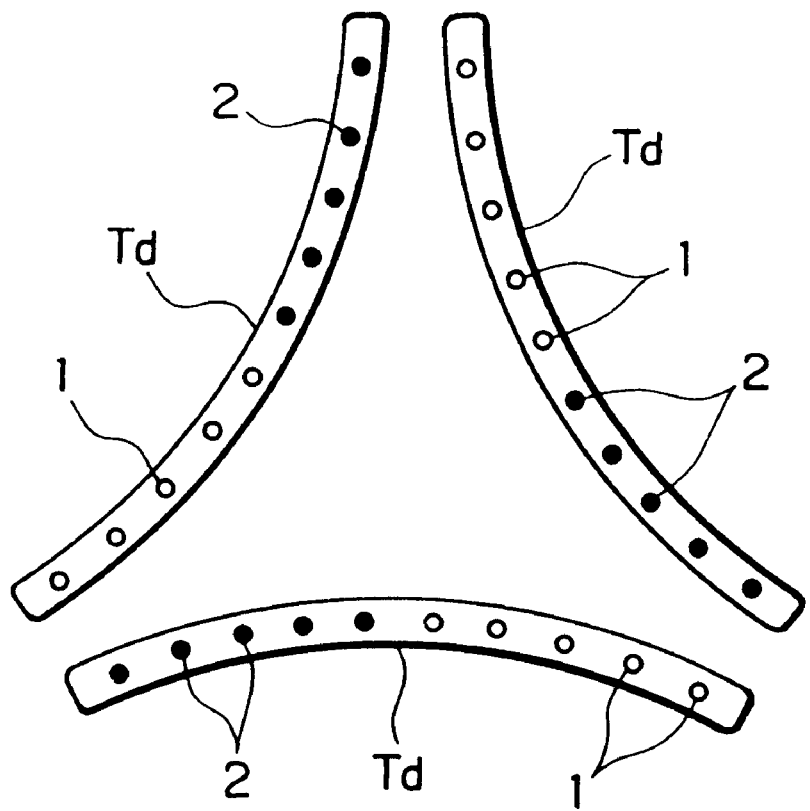

Further, FIG. 41A shows an example of a fastener T4 with tape in which five female fastening members 1 are arranged on a half portion of the tape T in a longitudinal direction thereof as being integral thereto, while five male fasteners 2 are arranged on the remaining half portion of the tape T as being integral thereto. The fastening devices with this structure can sufficiently serve as buttons for opening and closing the rompers 33 only by attaching three fasteners Td with tape, as illustrated in FIG. 44B, along the front opening portion of the rompers 33 by sewing or the like.

Figure 42:
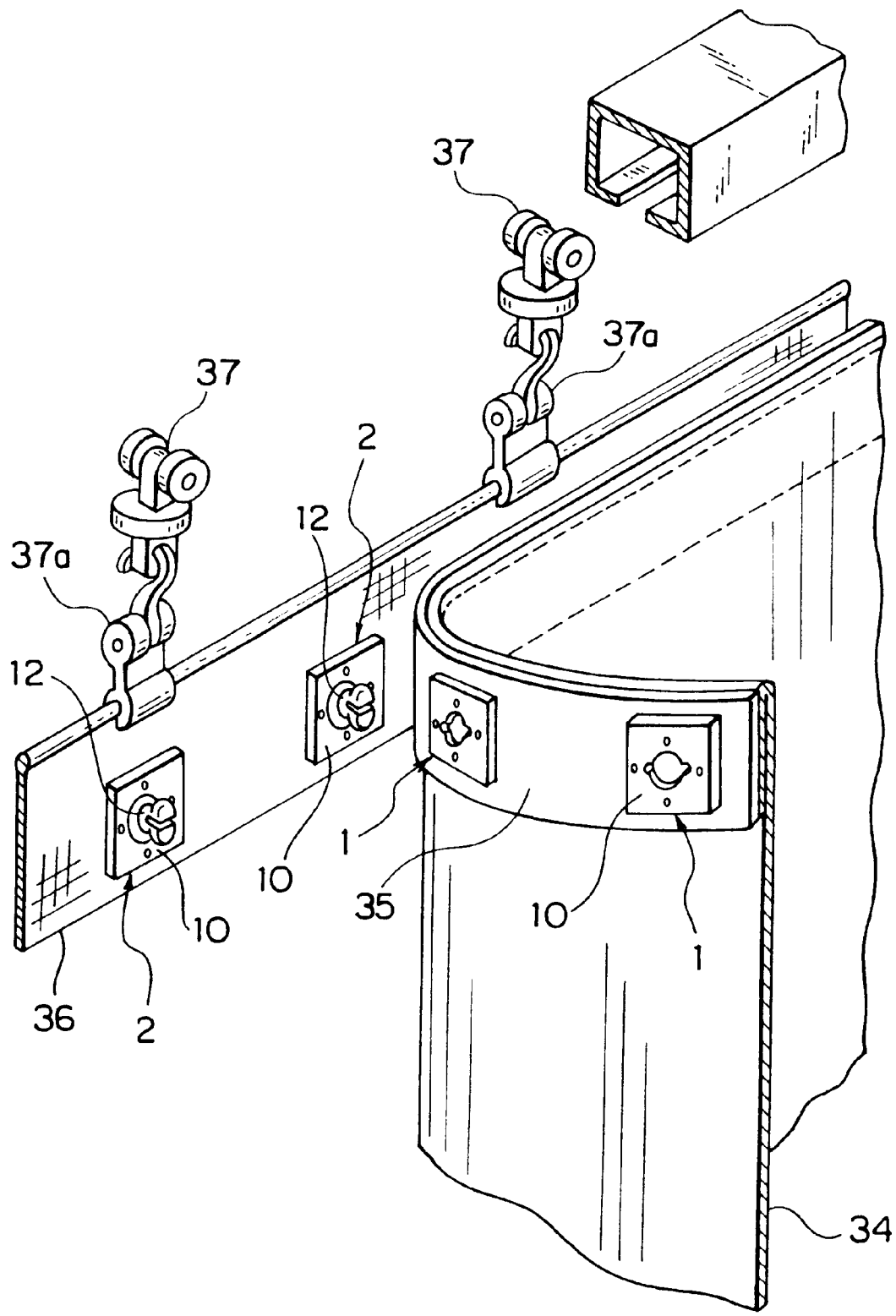
FIG. 42 is a fragmentary perspective view showing an example in which the fastening device with tape is applied to a header tape for a curtain and a hanging tape.

FIG. 42 shows an example in which the fastening device with tape in accordance with the present invention is used as a header tape 35 to be attached along an upper end edge of a curtain 34 as it is and the fastening device with tape in accordance with the present invention is set as a curtain hanging tape 36. In accordance with the illustrated example, a base member 10 as a first member of the present invention has a rectangular configuration, and has an opening portion at the center portion thereof so as to function also as a female fastener. For the fastener as a header tape 35, the base member 10 is used as the female fastener to which a male fastening member 12 is integrally molded to the base member 10 of the curtain hanging tape 36 so as to form the male fastener 2. Further, in accordance with the present invention, a attaching members 37a made of synthetic resin, which comprises a hook for hooking to a curtain runner 37, are integrally molded at a desired interval along and to one side edge of the curtain hanging tape 36 extending in a longitudinal direction thereof the attaching member 37a may be made of metal material.

Figure 43:
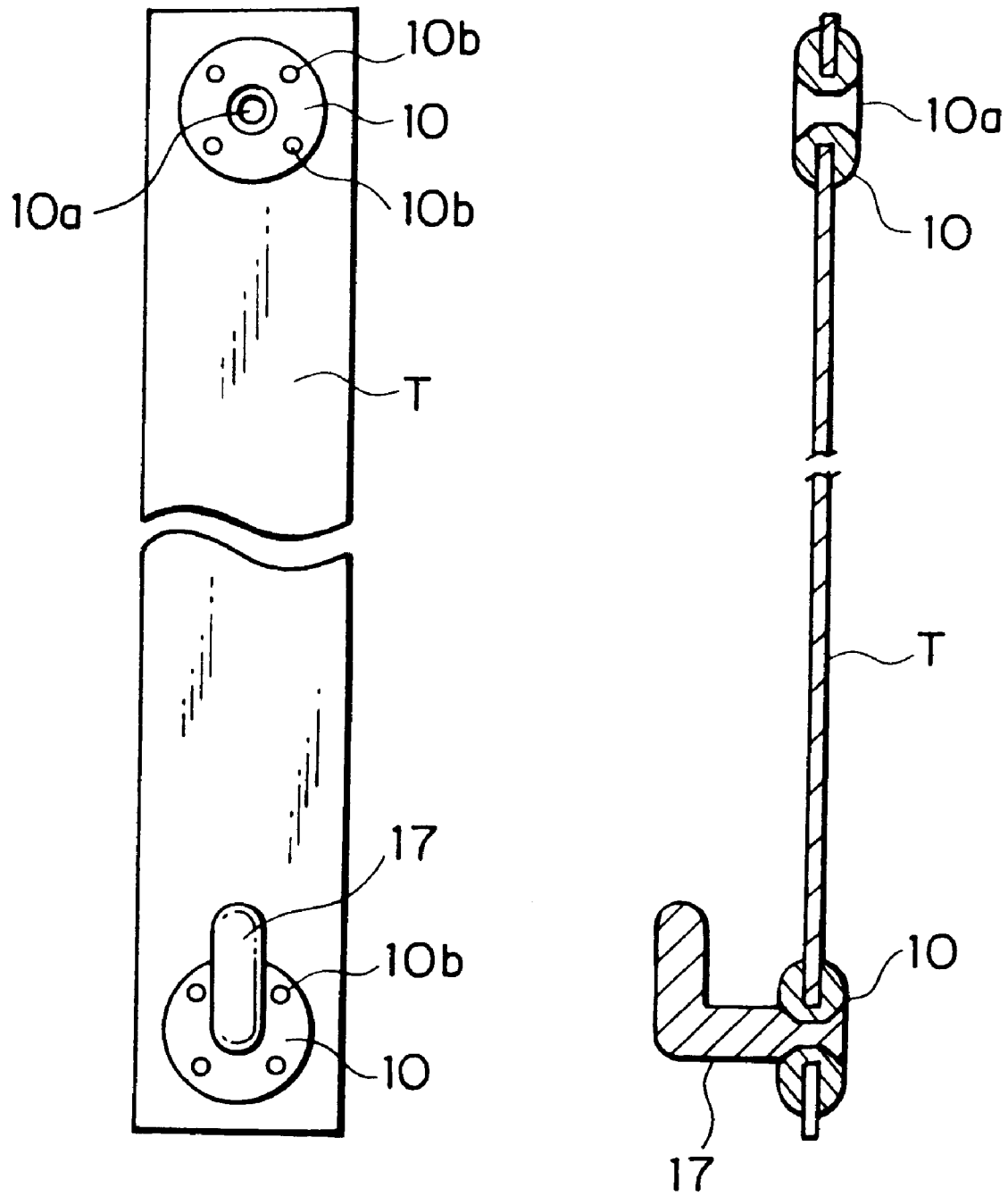
FIG. 43 is a explanatory view showing a construction of an article hanging device to which the fastening device in accordance with the present invention is applied.
Figure 44:
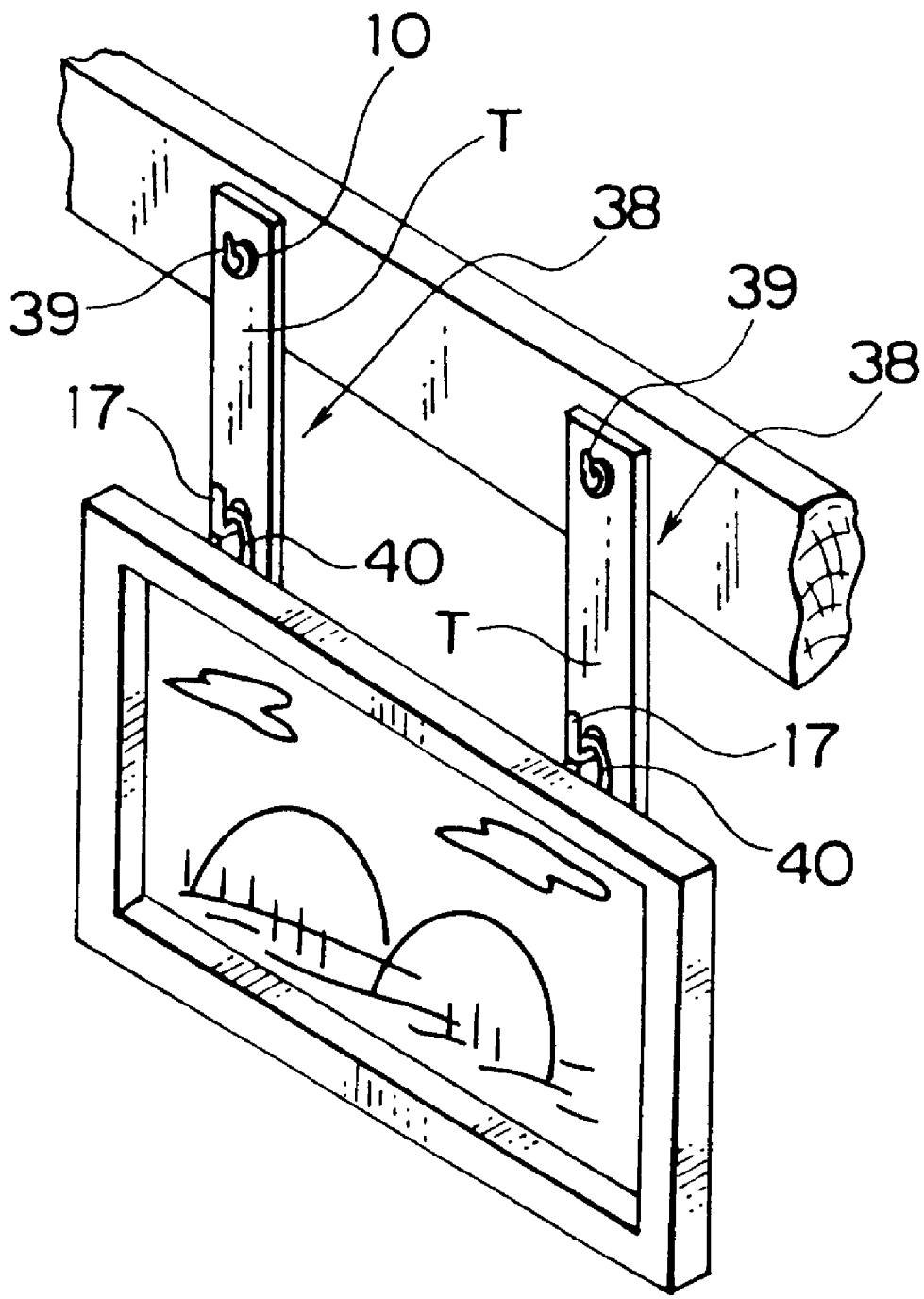
FIG. 44 is a perspective view showing a manner in which the article-hanging device is used.

FIG. 43 shows an example in which a second member in accordance with the present invention is formed in a hook shape. In this case, ring-like base members 10 having an opening portion 10a at a center portion thereof is integrally molded at both ends of the fastening device with tape in accordance with the present invention. Further, a hook-like male fastening member 17 is integrally molded to the opening portion 10a of one of the base members 10. FIG. 44 shows a manner in which the fastening device with tape having such a structure as mentioned above is used as a hanging tape 38 for a picture. In this case, a hook member 39 attached on a lintel or a long closet is inserted into the opening portion 10a of the base member 10 molded to an upper end of the hanging tape 38, and a hanging ring 40 for a picture or he like is hooked by a hook-like portion of the male fastener 12 having the male fastening member 17 and formed at a lower end of the tape 38, thereby hanging the picture.

Figure 45:
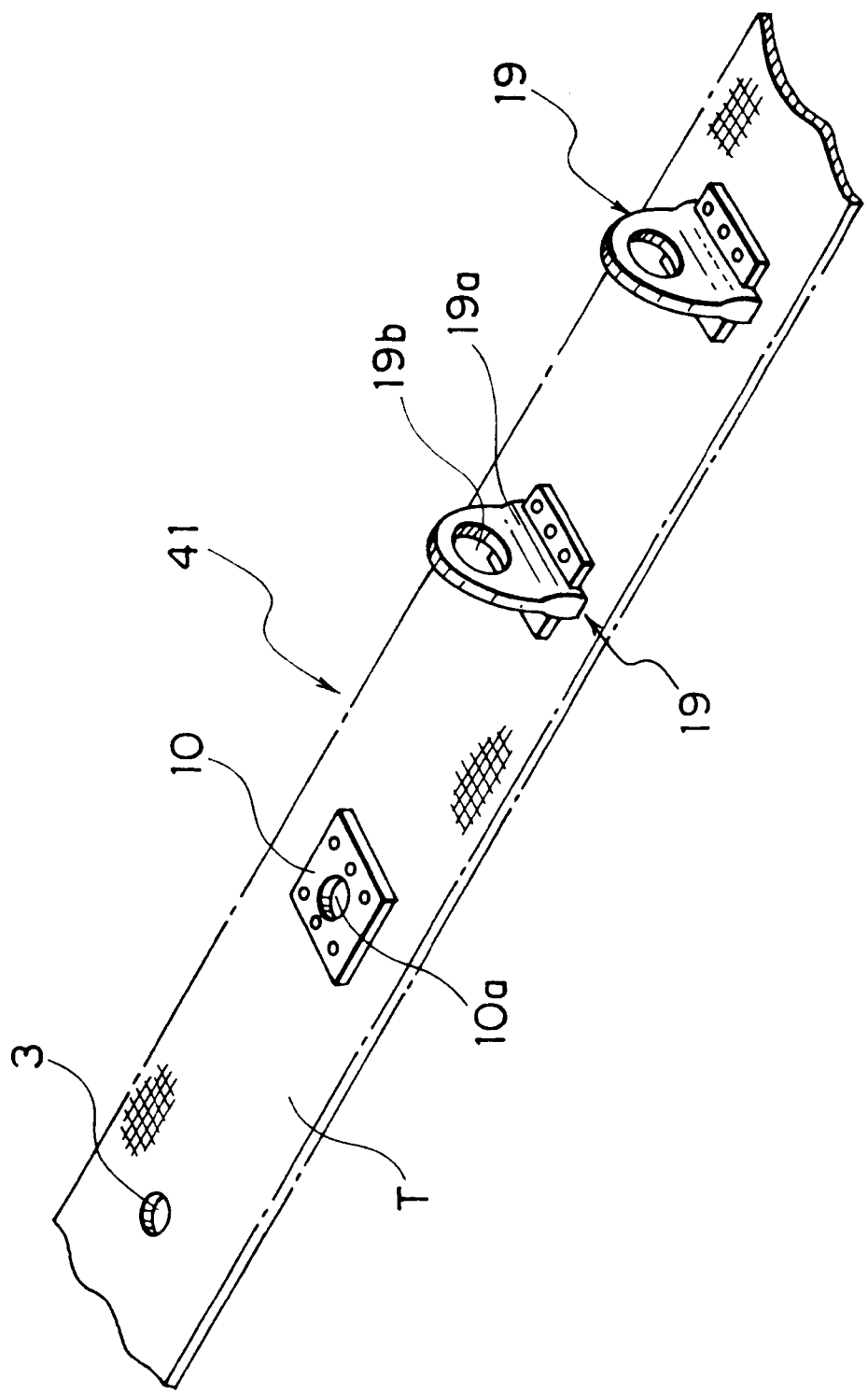
FIG. 45 is a perspective view showing, in a manufacturing order, an example of a construction of a curtain-opening-and-closing device to which the fastening device in accordance with the present invention is applied.
Figure 46:
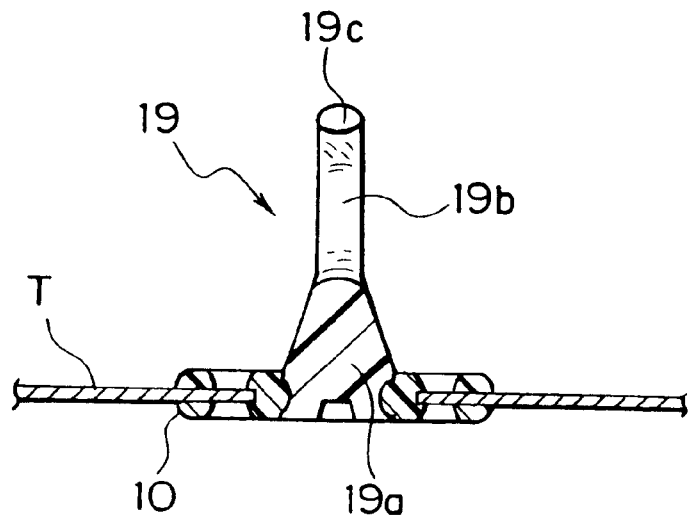
FIG. 46 is a view, partly in cross section, of the curtain-opening-and-closing device.
Figure 47:
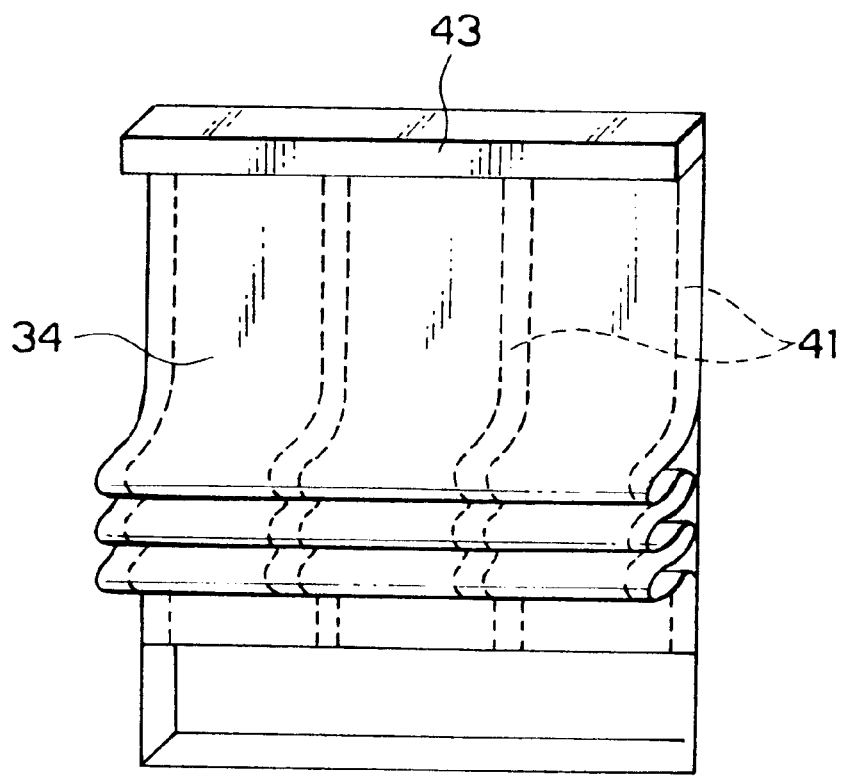
FIG. 47 is a perspective view showing a manner in which the curtain-opening-and-closing device is used.

FIGS. 45 and 46 show an example of a curtain opening and closing tape 41 in which a string-passing member 19 having a ring portion 19c as a second member in accordance with the present invention is integrally molded with an opening portion 10a of a base member 10 as a first member molded on a tape T. In order to manufacture the curtain opening and closing tape 41, firstly the base member 10 in a rectangular shape having an opening portion 10a at a center portion thereof is attached to an attachment hole 3 which is previously formed in the tape T by integral molding as shown in an upper left side of FIG. 45, and then the string-passing member 19 is molded to the opening portion 10a of the base member 10. The string-passing member 19 comprises, as is apparent from FIGS. 45 and 46, a plate-like small piece having a base member 19a integrally molded to an inner peripheral surface of the opening portion 10a, a ring portion 19c standing outwardly from the opening portion 10a and having a string-passing hole 19b opening in a longitudinal direction of the tape.

A plurality of curtain opening and closing tapes 41 each provided with such a structure as mentioned above are arranged in parallel on a back surface of the curtain 34 in a vertical direction by sewing or the like, with the ring portion 19c being exposed outside. A string member 42 is inserted toward each of the string-passing holes 19b of the ring portion 19c so as to suspend an upper end of each of the string members 42 from a portion near to right and left end edge portions of the curtain 34 via a guide member 44 comprising a ring or a pulley fixed along a curtain box 43 or the like as shown in FIG. 45. A stopper 42a is attached to a lower end of the string member 42, thereby preventing a suspending end of the string 42 from being pulled out from the string passing hole 19b of each of the ring portions 19c when the suspending end is pulled.

Figure 48:
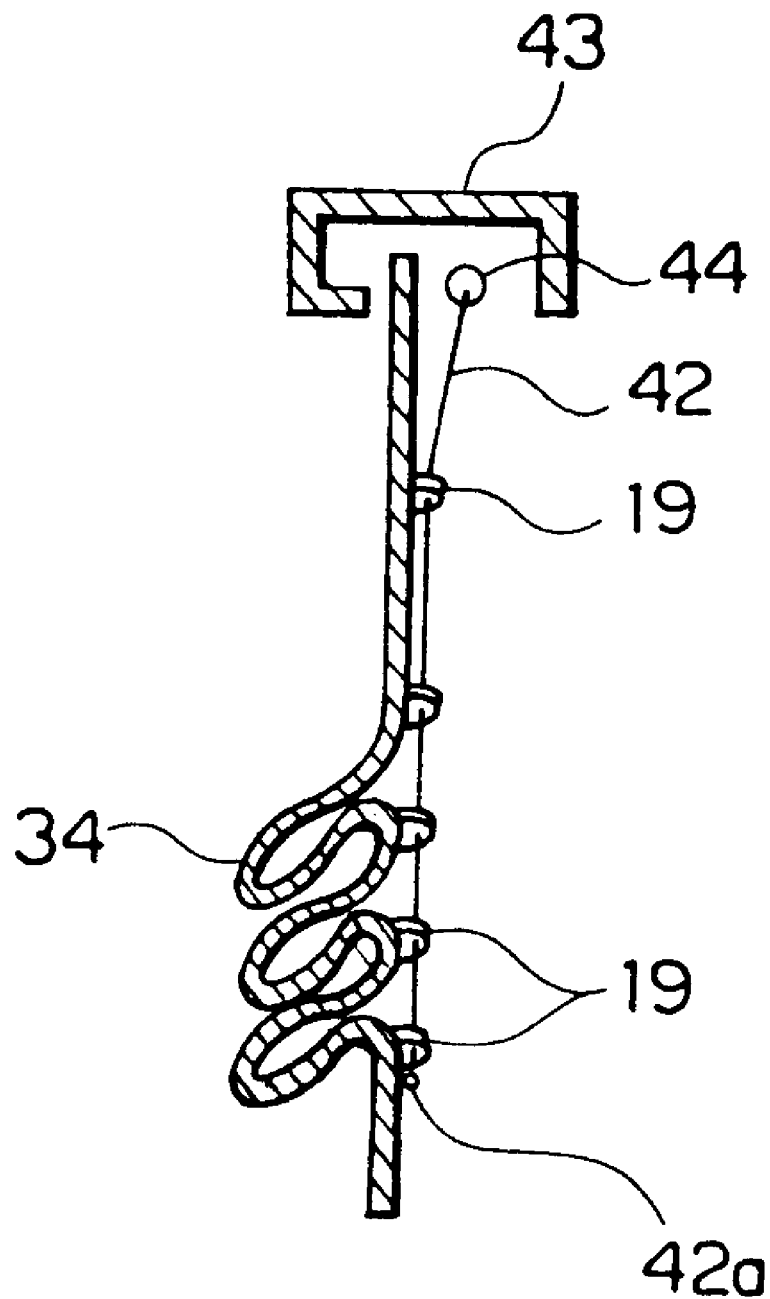
FIG. 48 is a side cross sectional view of FIG. 47.

When the suspending end of each of the string members 42 is pulled downward, the curtain 34 is pulled up from its lower end portion while forming pleats, as shown in FIG. 48. In this state, when the suspending end of the string member 40 is released, the suspending end is taken up in a direction of the stopper 42a due to a weight of the curtain 34, so that the curtain 41 is closed. In the illustrated embodiment, though the tape with the fastener in accordance with the present invention is used as a curtain opening and closing tape 41, it may be used as an opening and closing tape for a sccate type bag when it is attached in the same manner to an opening portion of the sccate type bag. The illustrated embodiment only shows a typical embodiment of the opening and closing tape.

Figures 49A, 49B:
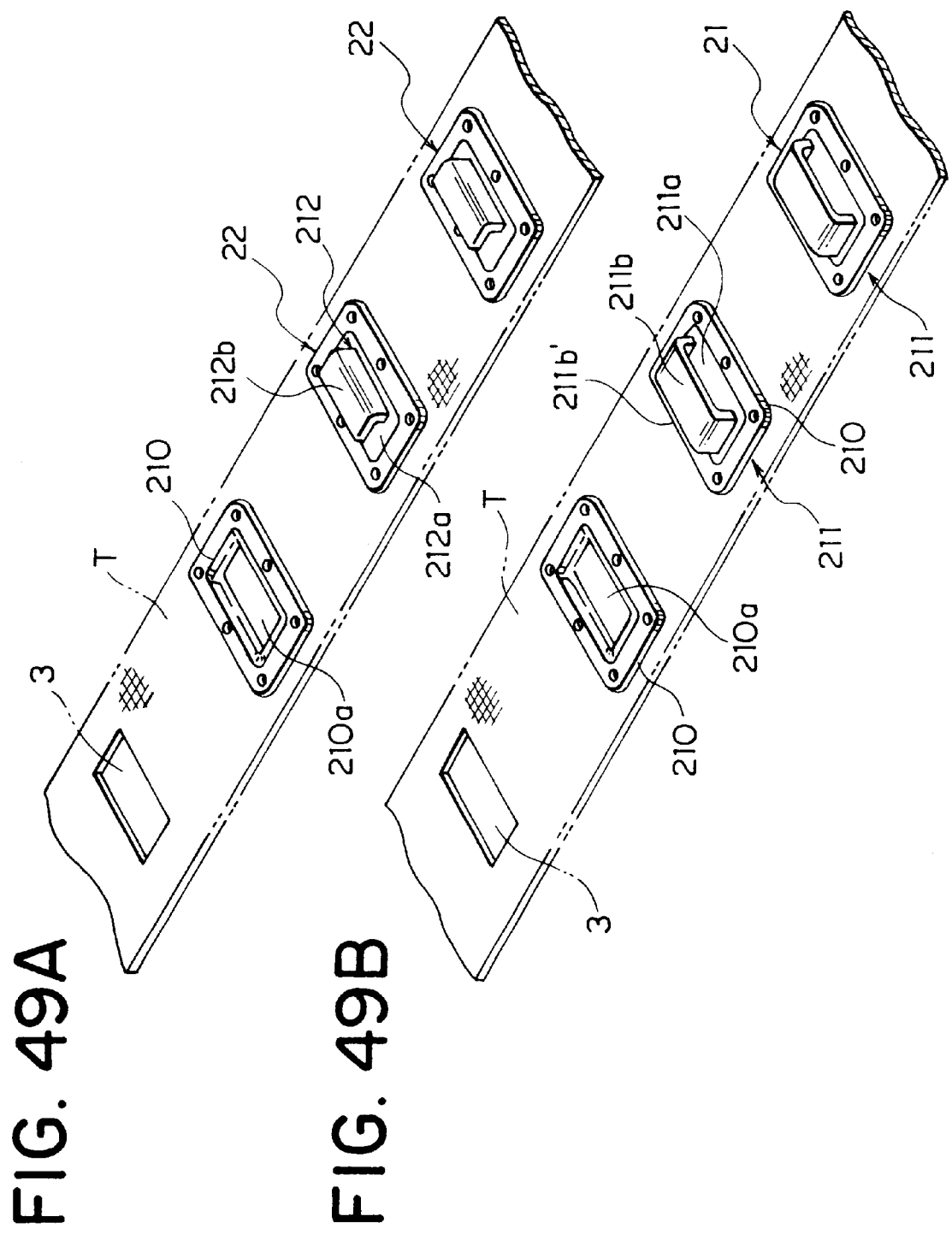
FIG. 49 is a fragmentary perspective view showing another embodiment of the fastening device with tape in accordance with the present invention.
Figure 50:
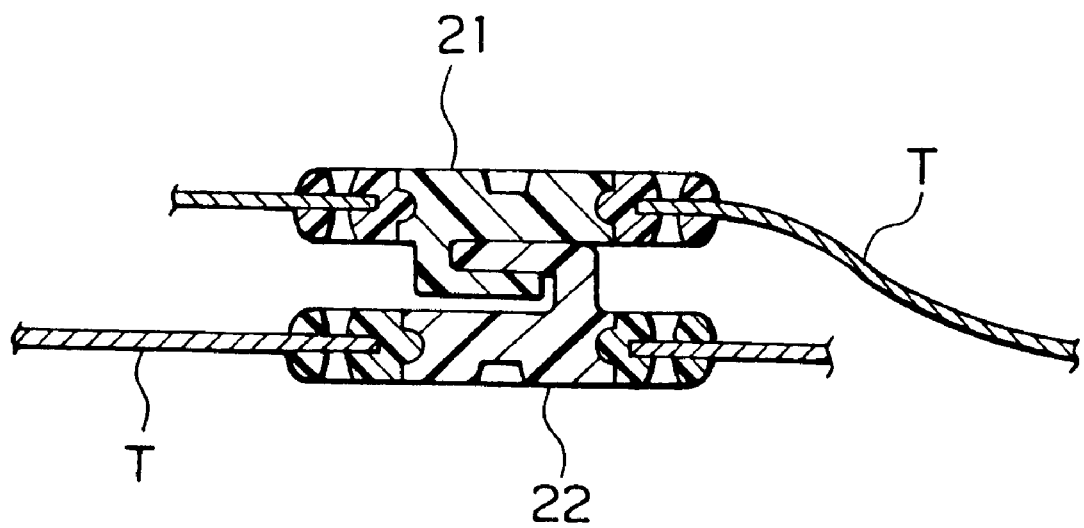
FIG. 50 is a cross sectional view of the fastening device in an engaging and disengaging state.

FIGS. 49 and 50 show an example of a tape T to which an fastener having a shape different from that of the fasteners in accordance with the embodiments as mentioned above is adhered. In a female fastener 21 in accordance with the embodiment as shown in FIG. 49B, there are a base member 210 as a first member formed in a rectangular frame shape and a female fastening member 211 as a second member with its base portion 211a being integrally molded with a central opening portion 210a of the base member 210. The female fastening member 211 has, as is apparent from FIGS. 49 and 50, structured such as shape that a female engaging portion 211b projecting from one surface of a base portion 211a formed in a rectangular shape is in a gate-like shape as seen in a longitudinal direction of the tape T and has a side wall 211b' at its back portion.

The male fastener 22 has a male fastening member 212 as a second member integrally molded at its base portion 212a with a central opening portion 210a of the base member 210 formed in the rectangular frame shape. The male fastening member 211 has, as is clearly shown FIG. 49A, such a shape that a male engaging and disengaging portion 211b projecting from one surface of the base portion 212a in a normal rectangular shape and constituting a hook portion forms an inverted L shape as seen from a side portion of the tape T.

In the female fastener 21 and the male fastener 22 having the above shapes, the hook portion of the male engaging portion 212b engages with and disengages from the gate-shaped portion of the female engaging portion 211b, as shown in FIG. 50. The female engaging portion 211b and the male engaging and disengaging portion 212b of the fastening device with tape in accordance with the embodiment is preferably made of hard material and set its projecting height to be as low as possible. The device can be used as the fastener for underwear, brassiere, baby clothes or the like.

Only typical embodiments in accordance with the present invention are only described above, and it is sufficiently understood from the description as mentioned above that various modifications can be made within a scope of claims of the present invention.

What is claimed:

1. A method of manufacturing a fastening device with tape for fixing a fastener to an attachment hole of the tape having at least one attachment hole, comprising steps of:
   (a) holding an entire peripheral edge portion of the attachment hole and integrally molding a synthetic resin first member having an opening portion at a center thereof on front and back surfaces of the tape; and
   (b) integrally attaching a synthetic resin second member to an opening portion of the first member, the second member having an engaging portion to be engaged with and disengaged from an opposing fastening device.

2. A method of manufacturing a fastening device with tape according to claim 1, further including a step of molding the first member thin at a predetermined area extending in a diametrical direction along the peripheral edge portion of the attachment hole of the tape to form a thin portion, and a step of molding a thick portion continuous to an outer periphery of the thin portion.

3. A method of manufacturing a fastening device with tape according to claim 1, further including steps of:
   positioning the attachment hole of the tape within a first-member-molding cavity having a plurality of nipping members which nip the peripheral edge portion of the attachment hole of the tape from front and back side thereof;
   nipping the peripheral edge portion of the attachment hole by the nipping members; and
   introducing molten resin within the cavity.

4. A method of manufacturing a fastening device with tape according to claim 1, further including steps of:
   introducing molten resin to a center portion of the attachment hole;
   guiding the molten resin introduced to the center portion to a guide passage extending in a radial manner or a straight manner; and
   introducing the molten resin guided by the guide passage toward the peripheral edge portion of the attachment hole of the tape, substantially parallel to the tape.

5. A method of manufacturing a fastening device with tape according to claim 3, wherein each of the nipping members has a front end nipping portion and a corrugation control portion, and the method further including a step of positioning the front end nipping portion at an intermediate position between a peripheral edge of the attachment hole of the tape and an outer peripheral edge of the first member after molded or at a position toward the outer peripheral edge from the intermediate position and nipping the tape, and a step of opposing the corrugation control portions to each other, the corrugation control portions being tapered in such a manner as to gradually increase a gap with respect to the tape toward a center of the attachment hole from the front end nipping portion.

6. A method of manufacturing a fastening device with tape according to claim 1, further including a step of integrally molding the second member along a peripheral edge of the opening portion in the first member.

7. A method of manufacturing a fastening device with tape according to claim 1, further including a step of:
   molding the second member independently;
   inserting the second member into the opening portion of the first member; and
   integrally bonding the second member and the opening portion by an adhesive.

8. A method of manufacturing a fastening device with tape according to claim 1, further including the steps of:
   preliminarily molding the second member independently;
   inserting a preliminarily molded product into the opening portion of the first member; and
   pressing and heating the preliminarily molded product by a heating body so as to deform a part of the second member and to be rotatably engaged with the opening portion.

9. A method of manufacturing a fastening device with tape according to claim 1, further including steps of:
   preliminarily molding the second member;
   inserting the preliminarily molded product into the opening portion of the first member; and
   integrally welding the preliminarily molded product and the opening portion.

10. A method of manufacturing a fastening device with tape according to claim 1, further including steps of:
    preliminarily molding the second member independently;
    inserting the preliminarily molded product into the opening portion of the first member;
    pressing a high-temperature member to the preliminarily molded product; and
    welding and deforming a part of the preliminarily molded product by the pressing so as to integrally weld to the opening portion.

11. A method of manufacturing a fastening device with tape according to claim 1, further including the steps of:
    preliminarily molding the second member independently;
    inserting the preliminarily molded product into the opening portion of the first member; and
    pressing, melting and deforming a part of the preliminarily molded product by ultrasonic or high-frequency heating means so as to integrally weld to the opening portion.

12. A method of manufacturing a fastening device with tape according to claim 1 or 2, further including a step of integrally molding an intermediate member having an opening portion at a center portion thereof along the opening portion of the first member, prior to molding the second member.

13. A method of manufacturing a fastening device with tape according to claim 1 or 2, further including a step of integrally molding an intermediate member constituted of two or more layers and having an opening portion at a center portion thereof, between the first member and the second member.

14. A method of manufacturing a fastening device with tape according to claim 1, further including a step of making a material of at least the second member softer than a material of any other members.

15. A method of manufacturing a fastening device with tape according to claim 1, wherein the second member is a male fastening member of a snap fastener, which protrudes from a surface of the tape and is engaged with and disengaged from a female engaging portion of a female fastening member of the snap fastener, and the method further includes a step of setting the male fastening member to be made of a material having a melting point higher than the first member.

16. A method of manufacturing a fastening device with tape according to claim 12, further including a step of applying an optional color to each of the first member, the second member and at least one intermediate member.

17. A method of manufacturing a fastening device with tape according to claim 13, further including a step of applying an optional color to each of the first member, the second member and at least one intermediate member.

18. A method of manufacturing a fastening device with tape according to claim 4, including a plurality of nipping members, wherein each of the nipping members has a front end nipping portion and a corrugation control portion, and the method further including a step of positioning the front end nipping portion at an intermediate position between a peripheral edge of the attachment hole of the tape and an outer peripheral edge of the first member after molded or at a position toward the outer peripheral edge from the intermediate position and nipping the tape, and a step of opposing the corrugation control portions to each other, the corrugation control portions being tapered in such a manner as to gradually increase a gap with respect to the tape toward a center of the attachment hole from the front end nipping portion.

* * * * *